United States Patent
Lee et al.

(10) Patent No.: US 10,523,256 B2
(45) Date of Patent: Dec. 31, 2019

(54) DEVICE COVER FOR ACCESSORY ATTACHMENT

(71) Applicant: HTC Corporation, Taoyuan (TW)

(72) Inventors: Hsin-Hao Lee, Taoyuan (TW); Cheng-Lin Wang, Taoyuan (TW); Ernest Euan Tien, Taoyuan (TW); Yin-Chou Chen, Taoyuan (TW); Tsung-Peng Lin, Taoyuan (TW); Cheng-Yen Lee, Taoyuan (TW); Yu-Hui Lin, Taoyuan (TW); Chang-Hua Wei, Taoyuan (TW); Jen-Yang Chang, Taoyuan (TW); Shih-Hsiu Lee, Taoyuan (TW); Jui Hsiang Lin, Taoyuan (TW); Hung Chuan Wen, Taoyuan (TW); Yen-Cheng Lin, Taoyuan (TW); Yen-Yi Lee, Taoyuan (TW); Ting-An Chien, Taoyuan (TW); Hsin-Hui Huang, Taoyuan (TW); Sheng Cherng Lin, Taoyuan (TW); Yung-Lung Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/164,813

(22) Filed: Oct. 19, 2018

(65) Prior Publication Data

US 2019/0052297 A1 Feb. 14, 2019

Related U.S. Application Data

(62) Division of application No. 15/595,967, filed on May 16, 2017, now Pat. No. 10,148,306, which is a
(Continued)

(51) Int. Cl.
*H04B 1/3888* (2015.01)
*H04B 1/3877* (2015.01)
(Continued)

(52) U.S. Cl.
CPC ......... *H04B 1/3888* (2013.01); *H04B 1/3877* (2013.01); *H04M 1/04* (2013.01);
(Continued)

(58) Field of Classification Search
CPC ..... H04B 1/3888; H04B 1/3883; H04M 1/04; H04M 1/72527; H04M 1/0202; H05K 5/0086; H05K 5/03; H05K 9/0043
(Continued)

(56) References Cited

U.S. PATENT DOCUMENTS

| | | |
|---|---|---|
| 6,097,810 A | 8/2000 | Hirai et al. |
| 9,314,078 B1 | 4/2016 | Haymond et al. |

(Continued)

FOREIGN PATENT DOCUMENTS

| | | |
|---|---|---|
| CN | 2867758 | 2/2007 |
| CN | 104320932 | 1/2015 |

OTHER PUBLICATIONS

"Office Action of China Counterpart Application", dated Oct. 29, 2018, p. 1-p. 8.
(Continued)

*Primary Examiner* — Inder P Mehra
(74) *Attorney, Agent, or Firm* — JCIPRNET

(57) ABSTRACT

Aspects of the technology relate to a cover (e.g., for a handheld electronic device). The cover may include a cover body configured for securement to a handheld electronic device and comprising an accessory attachment area, wherein the accessory attachment area includes a plurality of receivers, and wherein the accessory attachment area is configured for coupling with an accessory in at least one of
(Continued)

a plurality of orientations. In some aspects, each receiver further includes a space recessed into the cover body that is bounded, at least partially, by a recess wall, wherein each receiver includes an engagement surface configured for abutting engagement with a projection associated with an accessory when the projection is disposed in a secured configuration within a respective space. An electrical device cover and various attachment devices are also provided.

23 Claims, 48 Drawing Sheets

Related U.S. Application Data division of application No. 15/182,517, filed on Jun. 14, 2016, now Pat. No. 9,685,986.

(60) Provisional application No. 62/251,636, filed on Nov. 5, 2015, provisional application No. 62/281,743, filed on Jan. 22, 2016.

(51) Int. Cl.
| | |
|---|---|
| *H04M 19/04* | (2006.01) |
| *H04M 1/18* | (2006.01) |
| *H04M 1/21* | (2006.01) |
| *H04M 1/04* | (2006.01) |
| *H04M 1/725* | (2006.01) |

(52) U.S. Cl.
CPC ............ *H04M 1/185* (2013.01); *H04M 1/21* (2013.01); *H04M 1/725* (2013.01); *H04M 1/72527* (2013.01); *H04M 19/04* (2013.01)

(58) Field of Classification Search
USPC ........... 455/575.8, 88; 379/428.04, 56.1, 437
See application file for complete search history.

(56) References Cited

U.S. PATENT DOCUMENTS

| | | |
|---|---|---|
| 2004/0087335 A1 | 5/2004 | Peiker |
| 2007/0002455 A1 | 1/2007 | Berge et al. |
| 2008/0070500 A1* | 3/2008 | Rapp .................. H04N 5/2251 455/41.1 |
| 2008/0191551 A1 | 8/2008 | Belanger et al. |
| 2010/0000845 A1 | 1/2010 | Zou et al. |
| 2011/0075178 A1 | 3/2011 | Nishikawa |
| 2011/0075330 A1 | 3/2011 | Kuo |
| 2014/0085815 A1* | 3/2014 | Filipovic .............. H04B 1/3888 361/679.56 |
| 2014/0204529 A1* | 7/2014 | White .................. G06F 1/1675 361/679.55 |
| 2014/0375186 A1* | 12/2014 | Tarnow ............... H04M 1/0202 312/223.1 |
| 2015/0148103 A1 | 5/2015 | Samsilova |
| 2015/0163338 A1* | 6/2015 | Salo .................... H04M 1/0283 455/557 |
| 2015/0244126 A1 | 8/2015 | Carnevali |
| 2015/0245384 A1* | 8/2015 | Nambord ............. H04B 5/0031 455/41.1 |
| 2015/0316954 A1 | 11/2015 | Madison et al. |
| 2016/0058143 A1* | 3/2016 | Tien ...................... A45C 11/00 224/191 |
| 2016/0308569 A1 | 10/2016 | Wei |
| 2018/0173275 A1 | 6/2018 | Barnett et al. |

OTHER PUBLICATIONS

"Office Action of U.S. Appl. No. 16/164,830", dated Dec. 11, 2018, pp. 1-21.
"Office Action of U.S. Appl. No. 16/164,814", dated Apr. 22, 2019, pp. 1-24.
"Office Action of U.S. Appl. No. 16/164,830", dated May 24, 2019, pp. 1-21.
"Search Report of Europe Counterpart Application", dated Apr. 9, 2019, p. 1-p. 14.

* cited by examiner

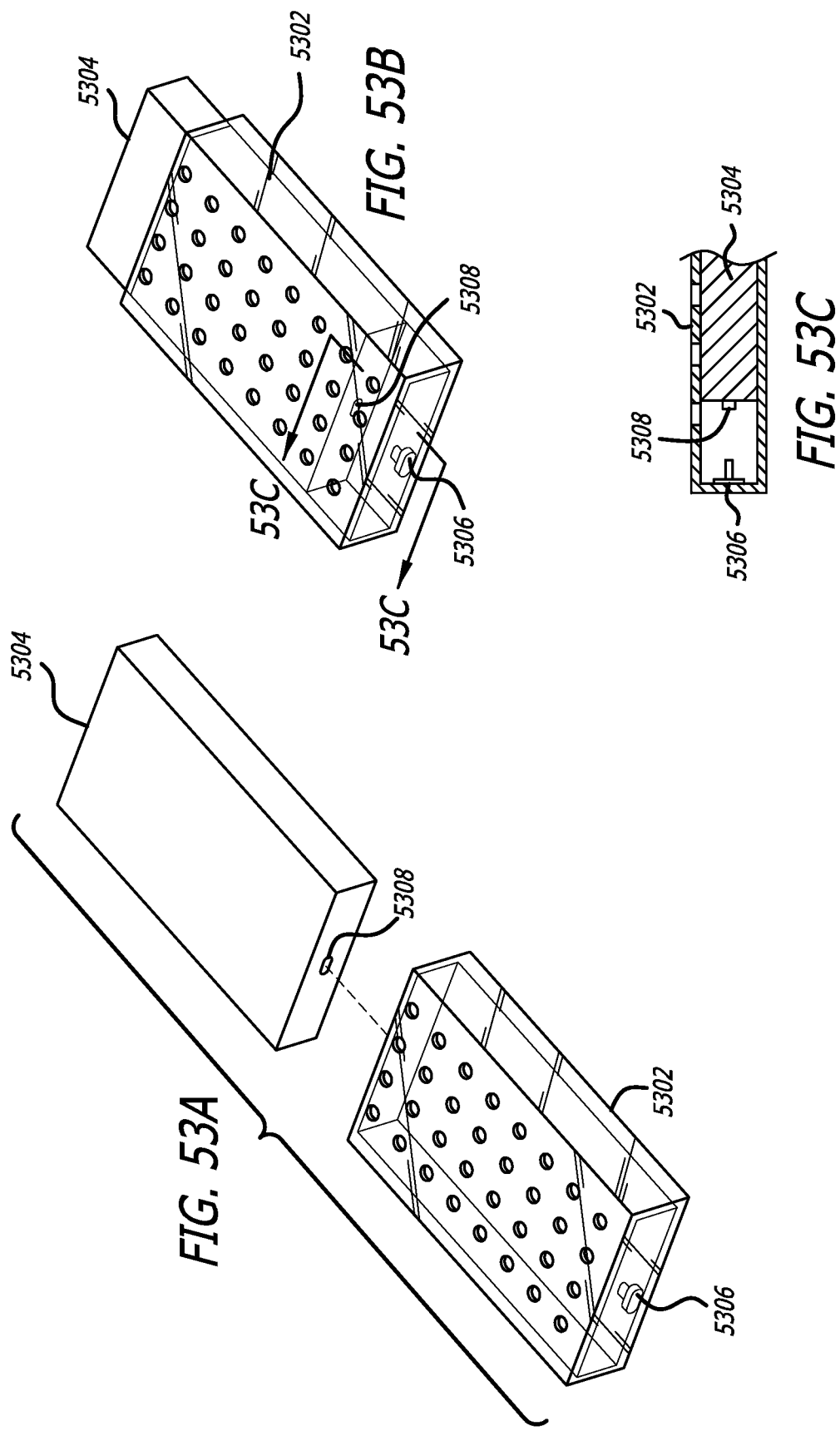

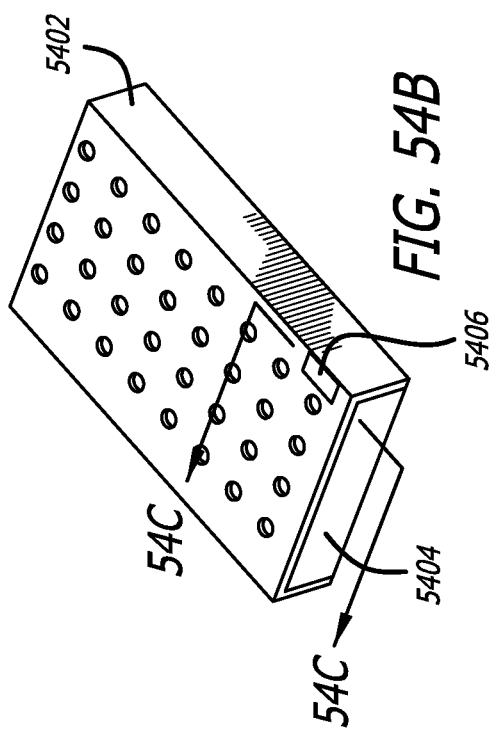
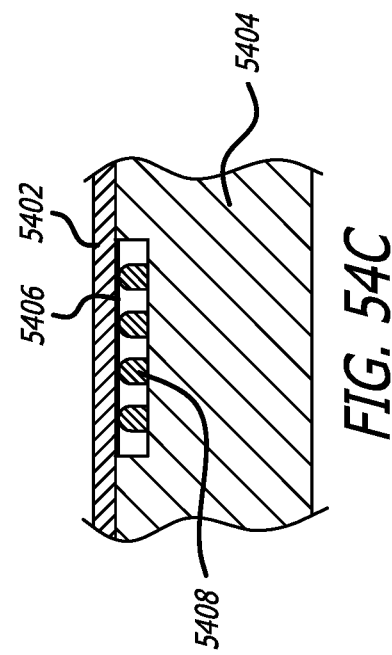
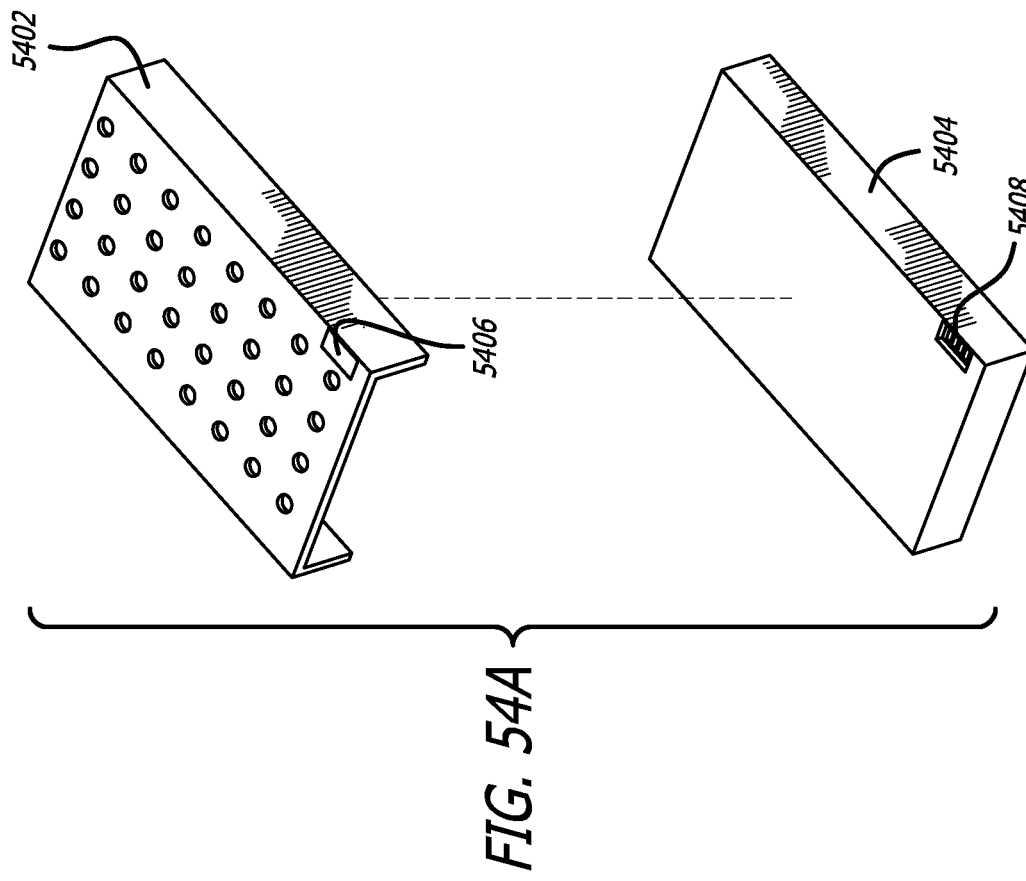

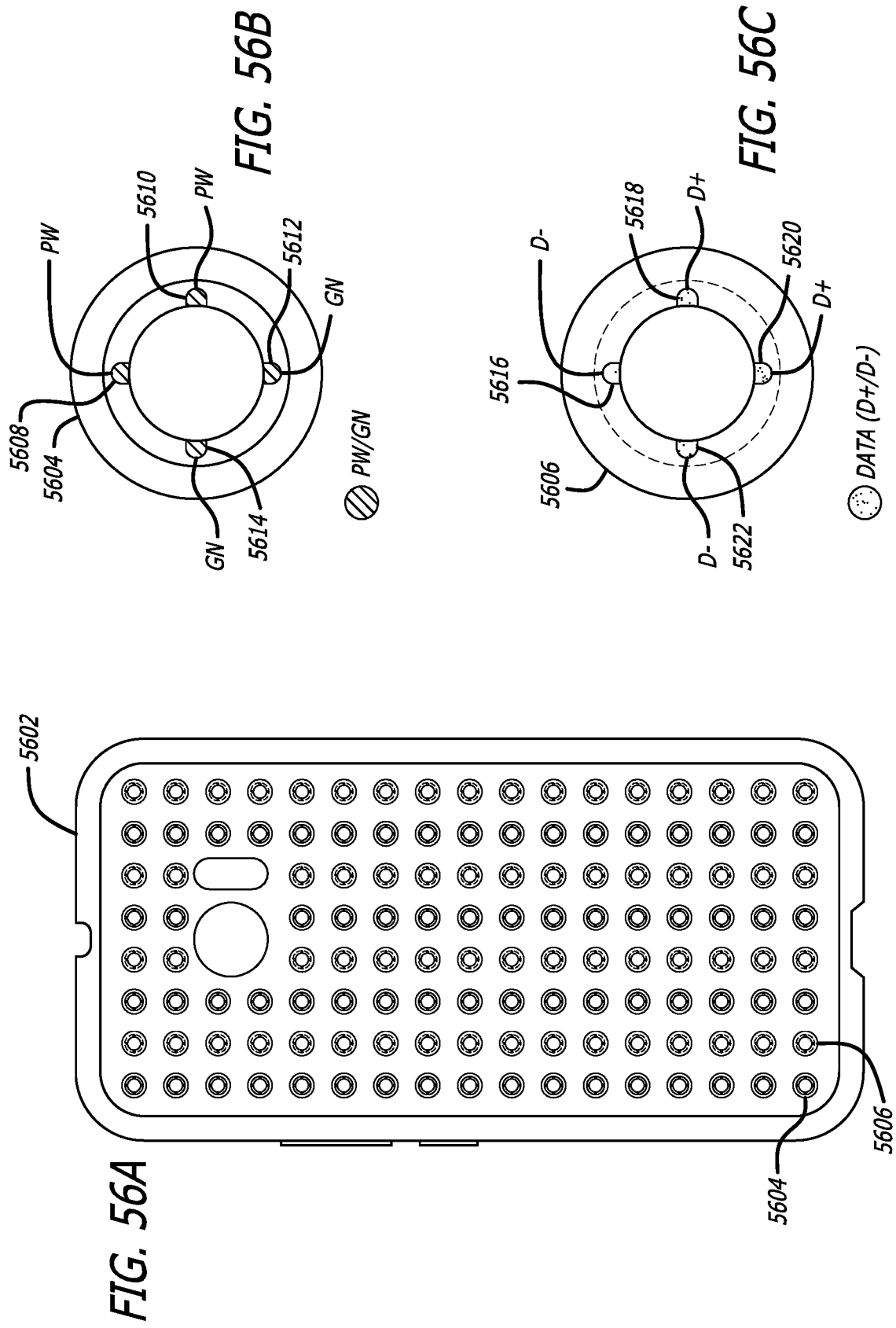

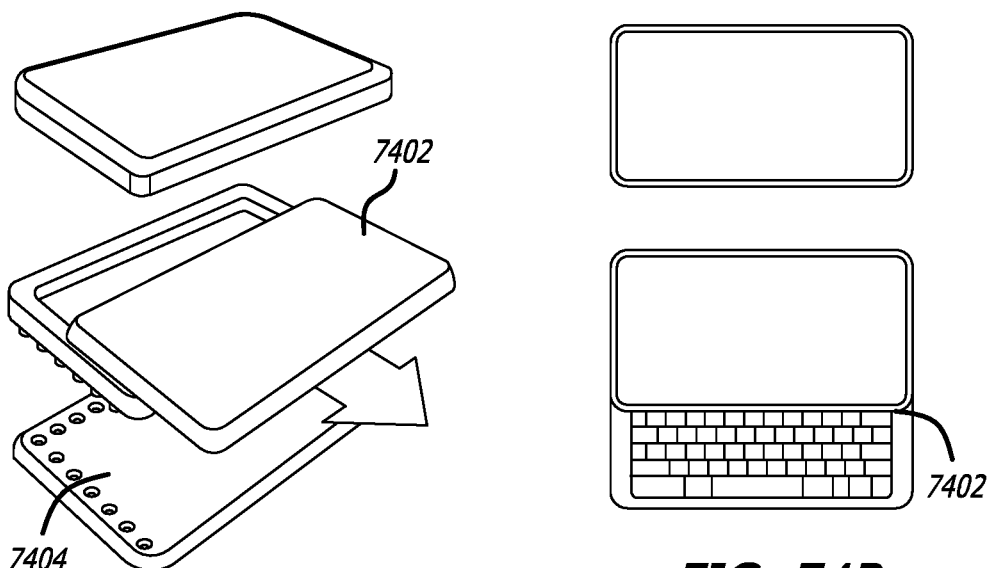
FIG. 74A
FIG. 74B
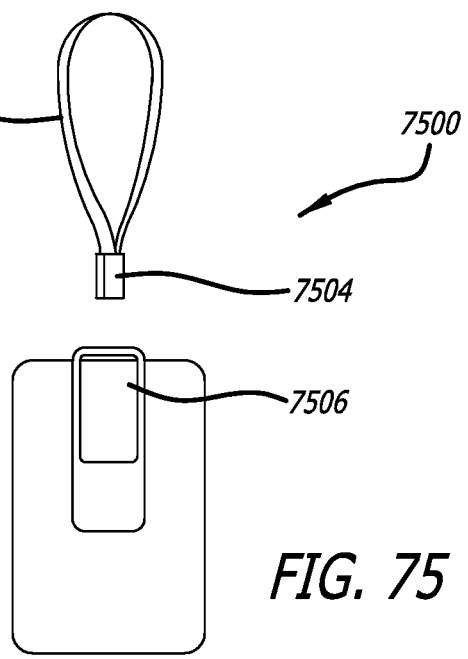
FIG. 75

DEVICE COVER FOR ACCESSORY ATTACHMENT

CROSS-REFERENCE TO RELATED APPLICATIONS

This application is a divisional application of and claims the priority benefit of U.S. application Ser. No. 15/595,967, filed on May 16, 2017, now allowed. The prior U.S. application Ser. No. 15/595,967 is a divisional application of and claims the priority benefit of U.S. application Ser. No. 15/182,517, filed Jun. 14, 2016, now patented. The prior U.S. application Ser. No. 15/182,517 claims the priority benefits of U.S. Provisional Application No. 62/251,636, filed Nov. 5, 2015 and U.S. Provisional Application No. 62/281,743, filed Jan. 22, 2016. The entirety of each of the above-mentioned patent applications is hereby incorporated by reference herein and made a part of this specification.

BACKGROUND

1. Technical Field

The subject technology relates to a cover for a handheld electronic device and in particular, an attachment-enabled cover configured for coupling with a variety of accessories.

2. Introduction

The proliferation of portable electronic devices has created a demand for various types of protective covers and accessories. While some conventional device covers provide protective functionality (e.g., if the user drops the device or spills liquid on the device), they do not augment the physical or electrical functionality of the enclosed device.

SUMMARY

This application describes various embodiments that relate to a system, method, and apparatus for releasably attaching an accessory to a cover for an electronic device.

This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. Any "embodiment" may also be considered simply an example of a concept or a combination of individual concepts that may be mixed and matched in any manner. Thus, any feature from one described embodiment may be used and combined with any other described embodiment.

In one aspect, the concepts disclosed herein relate to a cover for a handheld electronic device. The cover is configured to couple with an accessory for the handheld electronic device. The cover may include a cover body having an attachment area, the attachment area including a plurality of receivers, and wherein each respective receiver of the plurality of receivers is formed or defined by a space recessed into the cover body that is bounded, at least partially, by a recess wall. In some aspects, the attachment area has a first position at which the accessory is coupleable to the cover body via a first set of receivers of the plurality of receivers and a second position at which the accessory is coupleable to the cover body via a second set of receivers of the plurality of receivers. The first set of receivers may include at least one receiver different from the second set of receivers.

In another aspect, the concepts disclosed herein relate to a cover assembly for a handheld electronic device, the cover assembly including a cover body including an attachment area, the attachment area having a plurality of receivers. Each respective receiver of the plurality of receivers may include a space recessed into the cover body that is bounded, at least partially, by a recess wall. In some aspects, the cover assembly may further include an accessory having a plurality of projections, the accessory configured to be coupled to the attachment area at a first position via a first set of receivers of the plurality of receivers and a first set of projections of the plurality of projections. The accessory may be further configured to be coupled to the attachment area at a second position via a second set of receivers of the plurality of receivers and a second set of projections of the plurality of projections, and wherein the first set of receivers comprises at least one receiver different from the second set of receivers.

In another aspect, the disclosure relates to a cover system including a cover body configured to be attached to a handheld electronic device, the cover body including an attachment area, the attachment area having a plurality of receivers. Each respective receiver of the plurality of receivers may include a space recessed into the cover body that is bounded, at least partially, by a recess wall. In some aspects, the cover system may further include an accessory including a plurality of projections, wherein the accessory is configured to be coupled to the attachment area at a first position via a first set of receivers and a first set of projections, and wherein the accessory is further configured to be coupled to the attachment area at a second position via a second set of receivers and a second set of projections. The first set of receivers may include at least one receiver different from the second set of receivers.

In yet another aspect, the disclosure relates to an accessory for a handheld electronic device, the handheld electronic device configured for coupling with a cover, the cover having a plurality of receivers. The accessory may include a plurality of projections arranged in a pattern corresponding to an arrangement of the plurality of receivers. The plurality of projections may be configured to facilitate a coupling with the cover at a first position via a first set of receivers, and wherein the plurality of projections is further configured to facilitate a coupling with the cover at a second position via a second set of receivers. The first set of receivers may include at least one receiver different from the second set of receivers.

In some aspects, the disclosure relates to a handheld electronic device cover, the cover including a cover body configured for securement to a handheld electronic device and having an accessory attachment area, the accessory attachment area including a plurality of receiver. The accessory attachment area may be configured for coupling with an accessory in at least one of a plurality of orientations. In some aspects, each receiver includes a space recessed into the cover body that is bounded, at least partially, by a recess wall, and each receiver includes an engagement surface configured for abutting engagement with a projection associated with an accessory when the projection is disposed in a secured configuration within a respective space.

In some aspects, the plurality of receivers is arranged in a matrix of rows and columns.

In some aspects, the accessory is configured to engage one or more receivers in the matrix. The accessory may be configured to engage each of the receivers in the matrix. The accessory may also be configured to engage each receiver along a perimeter of the matrix. The projection may be substantially circular and has a protrusion configured to engage the engagement surface. In some aspects, the projection is formed by two or more substantially equal portions. The projection may also be formed by two substantially semicircular portions. In some aspects, the projection is formed by three substantially equal portions. The protrusion may extend from one or more of the substantially equal portions. In some aspects, the projection has a substantially hollow center portion configured to receive a secure pin. One projection may be configured to be received in two adjacent receivers. The cover body may have a second layer disposed over the accessory attachment area; the second layer having a plurality of apertures formed therein corresponding to the plurality of receivers.

In some aspects, the second layer is slidably coupled with the cover body, and the second layer is configured for sliding into alignment with the plurality of apertures and the plurality of receivers allowing engagement of the projections with the receivers. In some aspects, the second layer is biased toward partial alignment between the plurality of apertures and the plurality of receivers. The projection may have a substantially hollow center portion and is formed from a rigid material. In some aspects, the projection is formed from a deformable material. The projection may have a center portion formed of a rigid material, and the deformable material disposed around the rigid material. In some aspects, the rigid material has a substantially hollow center.

In another aspect of the technology, the cover includes a cover body configured for securement to a handheld electronic device and including an accessory attachment area, the accessory attachment area including a plurality of receivers. The accessory attachment area may be configured for coupling with a plurality of device accessories. In some aspects, each receiver includes a space recessed into the cover body that is bounded, at least partially, by a recess wall, and each receiver includes an engagement surface configured for abutting engagement with a projection associated with an accessory when the projection is disposed in a secured configuration within a respective space.

In some aspects, the accessory attachment area is configured for coupling with a kickstand, the kickstand transitionable between an extended position extending away from the accessory attachment area and an unextended position substantially flush with the accessory attachment area. In some aspects, the accessory attachment area is configured for coupling with a bicycle mount. The bicycle mount may be configured for coupling with a handle of the bicycle. In some aspects, the accessory attachment area is configured for coupling with a pivotal cover. The pivotal cover may be transitionable between an open position having the pivotal cover disposed away from a top surface of the cover body and a closed position having the pivotal cover disposed over the top surface.

In some aspects, the accessory attachment area is configured for coupling with an adjustable mount configured to secure the cover body to an object, allowing the cover body to be adjusted in angle and orientation while mounted to the object. In other aspects, the accessory attachment area is configured for mounting with a suction mount.

In some aspects, the technology relates to a handheld electronic device cover, the cover including a cover body configured for securement to a handheld electronic device and including an accessory attachment area. The accessory attachment area may include a plurality of receivers, and wherein the accessory attachment area is configured for concurrently coupling with a plurality of device accessories. Each receiver may include a space recessed into the cover body that is bounded, at least partially, by a recess wall. In some aspects, each receiver includes an engagement surface configured for abutting engagement with a projection associated with an accessory when the projection is disposed in a secured configuration within a respective space.

In some aspects, the subject technology relates to a securement device for releasably coupling an accessory to a handheld electronic device cover, the securement device including a plurality of elongate projections, wherein each projection of the plurality of elongate projections is transitionable between a secured configuration and a released configuration within a respective space recessed into a handheld electronic device cover. Each elongate projection may have a protrusion including an interference surface abuttingly engageable with a receiver in the secured configuration.

In some aspects, the protrusion is substantially circular and has an interface surface disposed around the diameter of the protrusion. In some aspects, the projection is formed by two or more protrusions of substantially equal size. The projection may be formed by two substantially semicircular protrusion portions. In some aspects, the projection is formed by four protrusion portions of substantially equal size.

In some aspects, the projection has a substantially hollow center portion configured to receive a secure pin. The secure pin may prevent transitioning the projection between the secured configuration and the released configuration.

In yet another aspect, the subject technology relates to a device cover, including a cover body configured for mechanical securement to an electronic device and including an accessory attachment area, wherein the accessory attachment area is configured for coupling with at least one accessory. An electrical connector may be configured for coupling with a power port of the electronic device. In some embodiments, the electrical connector is configured to facilitate power transfer between the electronic device and one or more device accessories coupled to the accessory attachment area.

In some aspects, the electrical connector is further configured to facilitate data transfer between the electronic device and the one or more device accessories. The accessory attachment area may include a plurality of receivers configured for facilitating a coupling between the accessory attachment area and the at least one accessory. In some aspects, at least one of the receivers comprises a plurality of first electrical contacts coupled with the electrical connector, wherein the first electrical contacts facilitate power transfer between the electronic device and the one or more device accessories. The subject technology may include a plurality of second electrical contacts coupled with the electrical connector, wherein the second electrical contacts facilitate data transfer between the electronic device and the one or more device accessories.

In another aspect, the subject technology relates to a device cover including an accessory attachment area that includes a first row of receivers and a second row of receivers, and wherein each receiver from among the first row of receivers includes a plurality of first electrical contacts coupled with the electrical connector, and wherein the first electrical contacts facilitate power transfer between the electronic device and the one or more device accessories. In some aspects, each receiver from among the second row of receivers includes a plurality of second electrical contacts couple with the electrical connector, wherein the second electrical contacts facilitate data transfer between the electronic device and the one or more accessories.

In some aspects, each receiver includes a space recessed into the cover body that is bounded, at least partially, by a recess wall. Each receiver may include an engagement surface configured for abutting engagement with a projection associated with an accessory when the projection is disposed in a secured configuration within a respective space. In some aspects, the electrical connector comprises a pogo pin connector. In some aspects, the electrical connector comprises a Universal Serial Bus (USB) connector. In some aspects, the accessory attachment area is further configured for coupling with an accessory in at least one of a plurality of orientations.

In some aspects, a cover body of the subject technology includes a first layer and a second layer, the cover body configured for securement to an electronic device, and wherein the cover body comprises an accessory attachment area configured for coupling with a plurality of device accessories. An electrical connector may be configured for coupling with a power port of the electronic device, and wherein the electrical connector is configured to facilitate power transfer between the electronic device and one or more device accessories coupled to the accessory attachment area.

In some aspects, the electrical connector is further configured to facilitate data transfer between the electronic device and at least one of the plurality of accessories. In some aspects, the first layer and the second layer are configured to form a plurality of receivers within the accessory attachment area, and wherein each of the receivers is configured for facilitating a coupling between the accessory attachment area and the at least one accessory.

In some aspects, at least one of the receivers includes a plurality of first electrical contacts disposed within the first layer, and wherein the first electrical contacts are coupled with the electrical connector and configured to facilitate power transfer between the electronic device and the one or more device accessories. In some aspects, at least one of the receivers includes a plurality of second electrical contacts disposed within the second layer, and wherein the second electrical contacts are coupled with the electrical connector and configured to facilitate data transfer between the electronic device and the one or more device accessories. Each receiver may include a space recessed into the cover body that is bounded, at least partially, by a recess wall. Each receiver includes an engagement surface configured for abutting engagement with a projection associated with an accessory when the projection is disposed in a secured configuration within a respective space. In some aspects, the electrical connector comprises a pogo pin connector. In some aspects, the electrical connector comprises a Universal Serial Bus (USB) connector. The accessory attachment area may be further configured for coupling with an accessory in at least one of a plurality of orientations.

In another aspect, the subject technology relates to a cover body configured for securement to an electronic device, wherein the cover body includes an accessory attachment area configured for coupling with a plurality of device accessories, and an electrical connector configured for coupling with a power port of the electronic device. In some aspects, the electrical connector may be configured to facilitate an electrical coupling between the electronic device and at least one accessory mechanically coupled to the accessory attachment area.

In another aspect, the subject technology relates to a securement device for releasably coupling an accessory to a handheld electronic device cover, the securement device including a plurality of elongate projections. Each projection may be transitionable between a securing configuration and a released configuration within a respective space recessed into a handheld electronic device cover. At least one elongate projection may include a plurality of electrical contacts for electrically coupling the accessory with an electrical connector of the handheld electronic device cover.

In some aspects, the plurality of contacts is configured for facilitating power transfer between the cover and the accessory. In some aspects, the plurality of contacts may be configured for facilitating data transfer between the cover and the accessory. In some aspects, the two or more electrical contacts are configured for facilitating power transfer between the cover and the accessory. The accessory may include an energy storage device, and wherein at least two of the plurality of electrical contacts are configured for facilitating power transfer from the energy storage device to a handheld electronic device via the cover and the accessory.

In some aspects, each elongate projection includes an interference surface abuttingly engageable with a receiver located within a respective space of the cover in the securing configuration. In some aspects, each of the projections is transitionable between a securing configuration and a released configuration within a respective space recessed into a handheld electronic device cover. At least one elongate projection may include a plurality of electrical contacts for electrically coupling the accessory with an electrical connector of the handheld electronic device cover.

In some aspects, at least one elongate projection may include one or more electrical contacts configured for electrically coupling with first electrical contacts disposed within a first layer of the handheld electronic device cover. In some aspects, the first electrical contacts are configured for facilitating power transfer between the accessory and the handheld electronic device via the first layer of the handheld electronic device cover. In some aspects, at least one elongate projection may include one or more electrical contacts configured for electrically coupling with second electrical contacts disposed within a second layer of the handheld electronic device cover. In some aspects, the second electrical contacts are configured for facilitating data transfer between the accessory and the handheld electronic device via the second layer of the handheld electronic device cover. In some aspects, at least one elongate projection comprises a plurality of electrical contacts configured for providing power and data to the handheld electronic device.

To those skilled in the art from the following detailed description, various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIGS. 53A-53C illustrate another example of a cover configured to be mechanically and electrically coupled to a handheld electronic device.

FIGS. 54A-54C illustrate another example of a cover configured to be mechanically and electrically coupled to a handheld electronic device.

FIGS. 56A-56D illustrate another example of a cover configured to be mechanically and electrically coupled to an accessory.

FIGS. 74A and 74B illustrate a handheld electronic device mechanically and electrically coupled to a keyboard accessory.

FIG. 75 illustrates an example lanyard accessory configured for coupling with a cover, according to some aspects of the present disclosure.

DETAILED DESCRIPTION

Figure 1A:
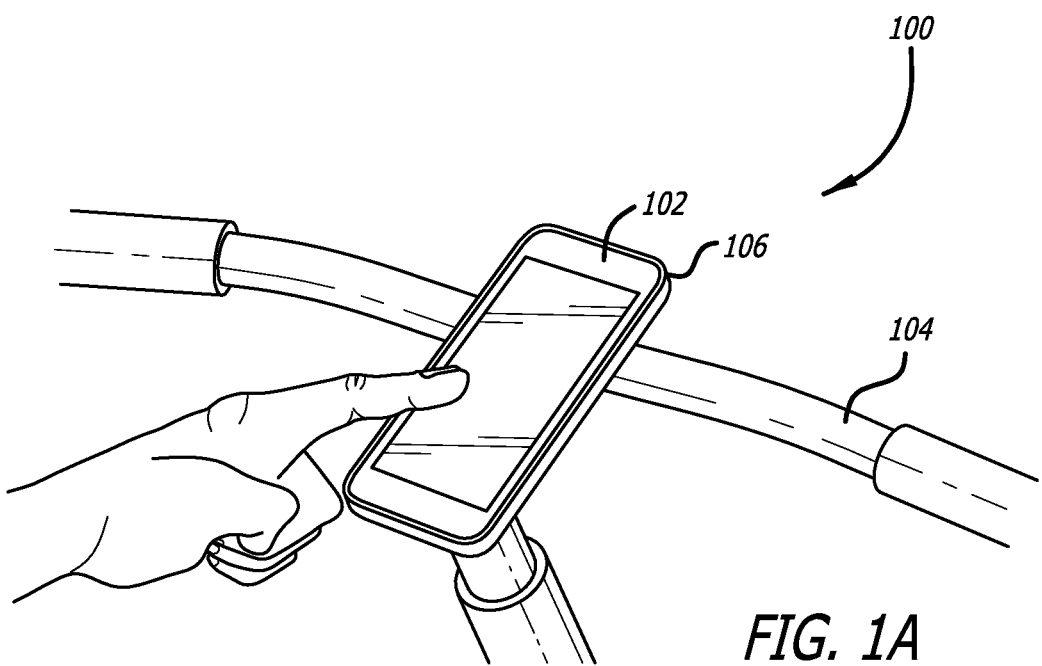
FIG. 1A illustrates an example environment of a cover in accordance with the present disclosure.

As used herein, "mobile device," "portable electronic device," and "handheld electronic device" (i.e., handheld device) may refer to various types of portable processor-based devices, including but not limited to: notebook computers, digital assistants (e.g., personal digital assistants or 'PDAs'), media players (e.g., MP3 players), mobile telephones, smart phones, mobile game players, digital cameras, portable recorders, tablet computers, portable e-ink readers, all-in-one portable computers, and/or portable television/s, etc.

As discussed above, conventional device covers provide a protective barrier between an external surface of the enclosed electronic device and the surrounding environment. In some instances, conventional device covers utilize protective films or plastic wrappers, for example, to provide protection to a display, or provide matting or anti-glare features. Conventional device covers may also provide plugs or covering for device inputs (e.g., touch-displays, actuatable buttons, or scroll wheels, etc.). However, such conventional device covers provide little beyond physical protection of the enclosed host device. For example, conventional covers do nothing to expand the mechanical utility and/or electrical functionality of the enclosed device.

Aspects of the subject technology address the above limitations by providing device covers and accessories that expand device functionality.

Cover/Attach Cover/Mechanical Cover:

In some aspects, the present disclosure relates to a cover (e.g., "a protective cover," "a back cover," "mechanical cover," "a handheld electronic device cover," "attach cover," or "device cover") configured to facilitate the attachment of various accessories. Attachable accessories (e.g., "accessory device," "accessories," "device accessories," "attachment accessory," or "accessory attachments") may be used to expand the utility of the corresponding mobile device. The cover may include a surface (e.g., an accessory attachment area) on which the various device accessories may be coupled. The accessory attachment area may include an arrangement of connection points (e.g., catch receivers or receivers) that facilitate the mechanical coupling of the cover with various accessories. Although the number and configuration of accessories may vary, the cover may be configured to support the attachment of a single accessory, or the simultaneous attachment of two or more accessories.

It is understood that the cover may be constructed of various materials, or a combination of materials, including but not limited to: plastics, thermoplastics, thermoplastic polyurethane (TPU), polycarbonate, polyvinyl carbonate (PVC), and/or silicon, etc. The cover may be formed from a variety of materials including, for example, but not limited to soft, hard, rigid, flexible, compliant, etc. Some examples of material types include but are not limited to paper, plastic, metal, rubber, silicone, fabric, foams, leather, ceramics, films, and the like. The material generally depends on the desired needs of the outer covering. It should be appreciated that the outer covering is not limited to a single material and may include a combination of materials. The exact combination may depend on the needs of the outer covering. Examples of trade-offs include rigid/flexible, soft/hard, soft1/soft2, plastic/metal, silicon/plastic, etc. In one particular embodiment, the outer covering is formed from flexible and/or compliant materials such as rubber, silicone, fabrics (e.g., neoprene), and various films. Additionally, the cover may be constructed as a contiguous structure, or may function as a coupling of two or more separate but attachable portions. As discussed in further detail below, the cover may also include one or more layers, for example, that are fitted together to form one or more receivers, including a space recessed into the cover body, and that is configured to receive at least one projection associated with attaching an accessory.

In some aspects discussed herein, the cover is configured to enclose an associated handheld device (e.g., a smartphone) through the abutment of one or more edges of the cover with one or more edges of the enclosed device. However, it is understood that other coupling methods may be employed without departing from the scope of the subject technology. For example, a cover may be coupled to or around an electronic device through the use of friction coupling, i.e., whereby contact one or more cover surfaces create a frictional interference with one or more surfaces of the respective device. The contact may be a point, line or area contact so that the cover is coupled with the electronic device.

Accessory/Mechanical Accessories/Mechanical Device Accessories:

Aspects of the technology also relate to an accessory with a securement device for coupling an accessory to the cover. The securement device may be a plurality of projections. In some aspects, the device accessory is fastened to the securement device. In turn, coupling the accessory to the cover is accomplished by attaching the securement device with the cover, e.g., using one or more elongate projections as securement device configured for insertion into a respective receiver in the cover. In some aspects, mating of a projection into a respective receiver (i.e., a space of a receiver) may be controlled using a release button of the securement device.

As discussed in further detail below, various device accessories (e.g., a "kickstand," "bike mount," or "selfie-stick," etc.), may be attached to the cover to expand device utility, for example, by securing the device to various surfaces, and/or by appending useful devices.

Cover/Electrical Cover/Electrical Attach Cover:

Other aspects of the technology relate to a cover that may be an electrical cover (e.g., "electrical cover," "attachable electrical cover,") configured to facilitate a transfer of power and/or data between an enclosed device and one or more accessories. The electrical cover may include a cover body configured for securement to an electronic device (e.g., an electronic accessory), as well as an electrical connector configured for coupling with a power port of the host electronic device.

Depending on implementation, the electrical connector may be a flexible wire or bus that may be plugged into a power/data port of the host device, such as a Universal Serial Bus (USB) port. Alternatively the electrical connector may include a rigid plug that is integrated into the cover body and configured for insertion into the power/data port, for example, upon securement of the cover to the host device.

As discussed in further detail below, the electrical attach cover is configured to facilitate power transfer between an electronic device enclosed by the electrical attach cover, and a device accessory, thus permitting a communicative coupling with a variety of electronic device accessories, including but not limited to: batteries, various data storage device/s, and/or wireless radios, etc.

Accessories/Electrical Accessories/Electrical Device Accessories:

Some aspects of the technology relate to accessories/electrical accessories/electrical device accessories configured for expanding the electronic and/or information processing capabilities of a host device enclosed by the cover. Depending on the desired implementation, the electrical accessories may be electrically and mechanically coupled with the cover, e.g., via electrical contacts disposed on one or more of the projections.

As discussed in further detail below, electrical device/accessories may include one or more power storage devices, memory devices, USB communication devices and/or wireless communication devices, such as Bluetooth® radios, WiFi, Wi-Fi direct devices, etc.

It will be appreciated that the disclosed systems and methods are novel, as are applications thereof of the components, systems, methods, and/or algorithms employed and included therein. It should be appreciated that embodiments of the presently described inventive body of work may be implemented in numerous ways, including as processes, apparatus, systems, devices, methods, computer readable media, computational algorithms, embedded or distributed software and/or as a combination thereof. Several illustrative embodiments are described below.

FIG. 1A shows example environment 100, including a cover 106 in accordance with the present disclosure. Environment 100 further illustrates a mobile device 102, and a bicycle handlebar 104. As depicted, the mobile device 102 is at least partially enclosed by the cover 106, as well as including accessory attachment (not shown) to facilitate coupling with the bicycle handlebar 104.

Figure 1B:
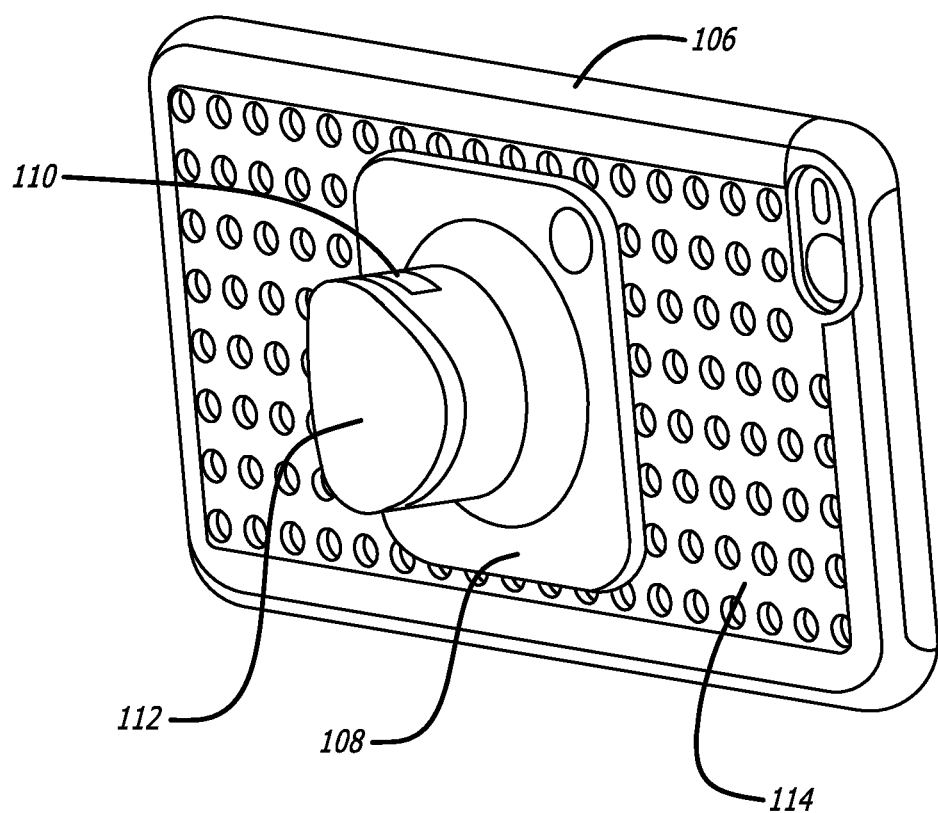
FIG. 1B illustrates a back-side view of a cover in accordance with FIG. 1.

FIG. 1B shows a back (or rear) isometric view of the cover 106 having a handlebar attachment accessory 108. As illustrated, the back side of the cover 106 is a surface of the cover 106 that is opposite to an inside surface (not shown) of the cover that would contact the enclosed electronic device.

The handlebar attachment accessory 108 may have a strap receiving slot 110 configured to receive a strap disposed around the handlebars 104 or any other tubular member. In some aspects, the handlebar attachment accessory 108 may also have a concave or contoured surface 112, for example, to facilitate a secure engagement with a tubular member, such as the handlebars 104.

The cover 106 (shown in FIG. 2 as the cover body 200), provides an accessory attachment area 114 providing coupling with one or more accessories. As may be appreciated in FIGS. 1A and 1B, the cover 106 may be coupled with various accessories, such as a mount for receiving the bicycle handlebar 104, thereby securing the mobile device 102 to the bicycle handlebar 104.

While the illustrated embodiment is drawn to the bicycle handlebar 104, it is within the scope of this disclosure for the cover 106 to be mounted to other objects or surfaces including, but not limited to: motor vehicles (e.g., a vehicle dash, vehicle windshield), clothing or accessories (e.g., a backpack, shoulder strap), surfboards, arm bands, carabineers, attachment of a stylus or pen, etc.

The cover 106 may be configured to cover a portion of one or more external surfaces of the mobile device 102 for ornamental and/or protective purposes. Additionally, the cover 106 can be configured to act as an electronic accessory to the mobile device 102, i.e., a supplementary system that improves the functional capabilities of the mobile device 102. In most cases, the cover 106 is a distinct element, which is not part of the originally designed mobile device 102.

Instead, the cover 106 is an add-on or an accoutrement of the mobile device 102. The cover 106 may be configured to help protect the mobile device 102 (i.e., it may serve as an armor or shock protection that helps prevent structural and/or surface damage to the mobile device 102). Additionally or alternatively, the cover 106 may provide ornamentation to the mobile device 102 (i.e., it may help define the overall ornamental appearance of the electronic device). The cover 106 can also permit personalized ornamentation. The cover 106 may also provide tactility in order to improve the feel and grip to the mobile device 102.

The cover 106 can at least partially conforms to the outer shape of the mobile device 102. For example, by providing an internal shape/inner surface and/or being flexible enough to follow the contour of the mobile device 102. The external shape of the outer covering may be widely varied. It may be designed for ornamental, protection, and/or ergonomic reasons. Generally, however, it tends to follow the general shape of the mobile device 102.

The cover 106 may for example be laid, set, wrapped, spread upon, about or over a portion of the mobile device 102. The mobile device 102 may include a front cover and a back cover defining the front and back surfaces, respectively, of mobile device 102. The front cover may have a display for displaying image and the back side is a side that is facing different direction than the front side with the display. The front and back cover may toward opposite or different direction. The cover 106 may be configured to cover a surface of the mobile device 102 including a portion of a single side, multiple sides, and/or all sides of the mobile device 102. For example, the cover 106 may be a film/layer/cover that is applied to a single surface of the mobile device 102 (e.g., a portion or all of the back side).

The cover 106 may also be a flexible covering that includes a cavity for receiving the mobile device 102 or a flexible covering that wraps/stretches around some portion of the mobile device 102. The outer covering may be referred to (among others) as a case, shield, container, jacket, vest, skin, protector, and the like of the mobile device 102.

The cover 106 generally includes a body or member that couples to the mobile device 102. The body or member may also be removable or detachable from the mobile device 102. The body or member 202 may be carried by the mobile device 102, but is not part of the mobile device 102. The configuration of the body or member may be widely varied, but is typically configured to cover the outer surface(s) of the mobile device 102. The body or member 202 may be universal in its application (not specific to a particular device) or it may be dedicated to a particular device. In either case, the body or member can be configured to follow the outer contour or shape of the surfaces of the mobile device 102. In one example, the body or member forms a surface layer that attaches to the outer surface of the mobile device 102. In another example, the body or member forms an enclosure that includes surfaces (e.g., walls) that surround the outer surfaces of the mobile device 102.

The cover 106 may be adhered to or around the mobile device 102 using a variety of techniques including but not limited to: adhesive, friction, static, elasticity, suction, fasteners, snaps, connectors, and the like. In some examples, the cover 106 forms an enclosure that includes a void, cavity, opening, pocket or compartment for receiving a mobile device 102 therein (i.e., the mobile device 102 can be placed into the void). In another example, the cover 106 may be press fit onto the mobile device 102. In yet other examples, the cover 106 is a surface (e.g., platform, film) that is attached to a surface of the mobile device 102 (e.g., adhesive backed surface or surface with static electricity properties or a surface with suction cups). In yet other examples, the cover 106 is stretched around the mobile device 102 (e.g., the outer covering is flexible and conforms to the outer shape of the mobile device 102). In other examples, the cover 106 may trap or surround the mobile device 102 between multiple sections (i.e., lower and upper half). In accordance with one embodiment, the cover 106 may be formed from a soft, flexible and/or compliant material that can be wrapped around the various surfaces of the mobile device 102. For example, the material may allow the covering to stretch over the mobile device 102 (e.g., form fitting). By way of example, the cover 106 may be foamed from a stretchable material that includes a small opening that can be stretched to accommodate the larger mobile device 102 as it is inserted into the cover's 106 outer covering.

Once the mobile device 102 is inserted, the material conforms to the shape of the mobile device 102, which provides a tight fit around the surfaces of the mobile device 102. The cover 106 may, for example, surround multiple side surfaces if not all of the side surfaces of the mobile device 102. In one particular example, the material may be silicone. These types of coverings are sometimes referred to as "skins" as they create a new outer layer analogous to skin.

Figure 2:
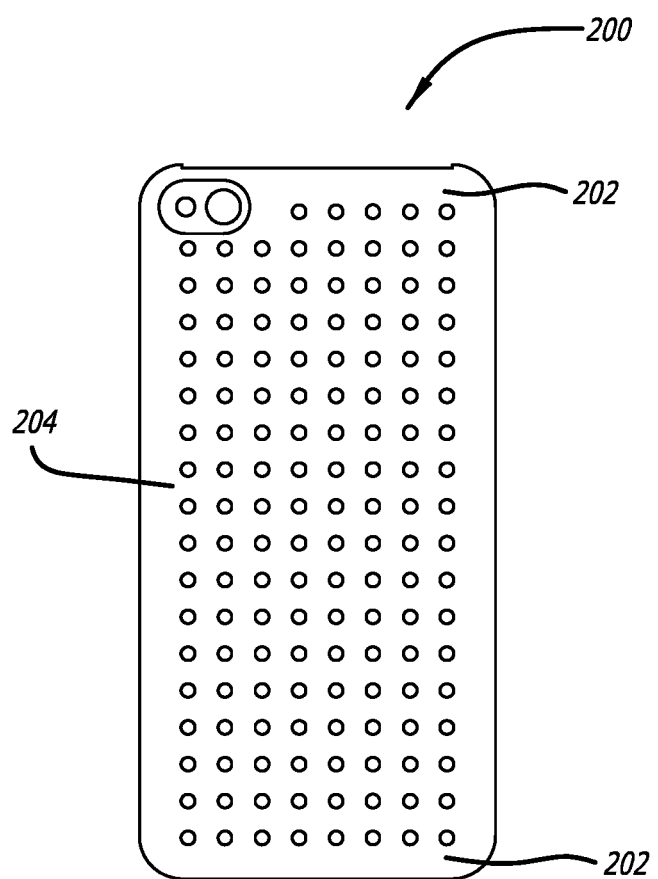
FIG. 2 illustrates a back-side view of a cover configured to enclose a host electronic device.
Figure 3:
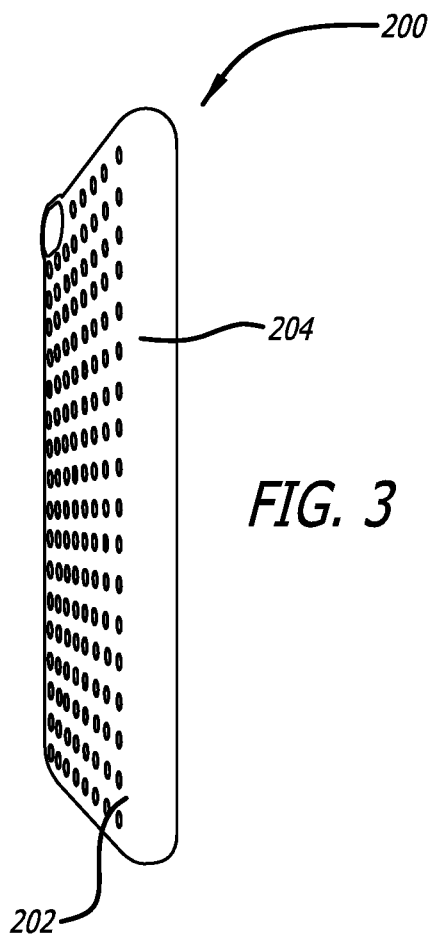
FIG. 3 illustrates a side-view of a cover, according to some aspects of the disclosure.

FIGS. 2 and 3 show a cover body 200 including a plurality of receivers 202 disposed on an accessory attachment area 204. The accessory attachment area 204 may be an outer back surface of the cover body 200. The receivers 202 may be arranged in a matrix (or lattice configuration) of rows and columns, wherein each of the individual receivers are separated in a regular spacing pattern. The receivers 202 may also be configured in a random distribution, or an isle or artwork. As discussed in further detail below, each receiver of a plurality receivers 202 may receive a projection (shown in FIGS. 5, 11, and 12), thereby coupling the cover body 200 with a device accessory. The cover body may comprise a base and at least one sidewall extending away from the base, the at least one sidewall being shaped to substantially conform to a handheld electronic device and the at least one sidewall comprising the attachment area with the plurality of receivers. The receivers may be arranged in 2 dimensional lattice such as bravais lattice, rhombic lattice, hexagonal lattice, parallelogrammic lattice or rectangular lattice. As for the shape of the receiver, the shape may be square, circular, rectangular, honey comb, or any kind of polygon.

It is appreciated that receivers 202 on the cover body 200 may be arranged in other patterns (e.g., not a matrix or lattice pattern). For example, the receivers 202 may be irregularly spaced, without departing from the scope of the subject technology.

Figure 4:
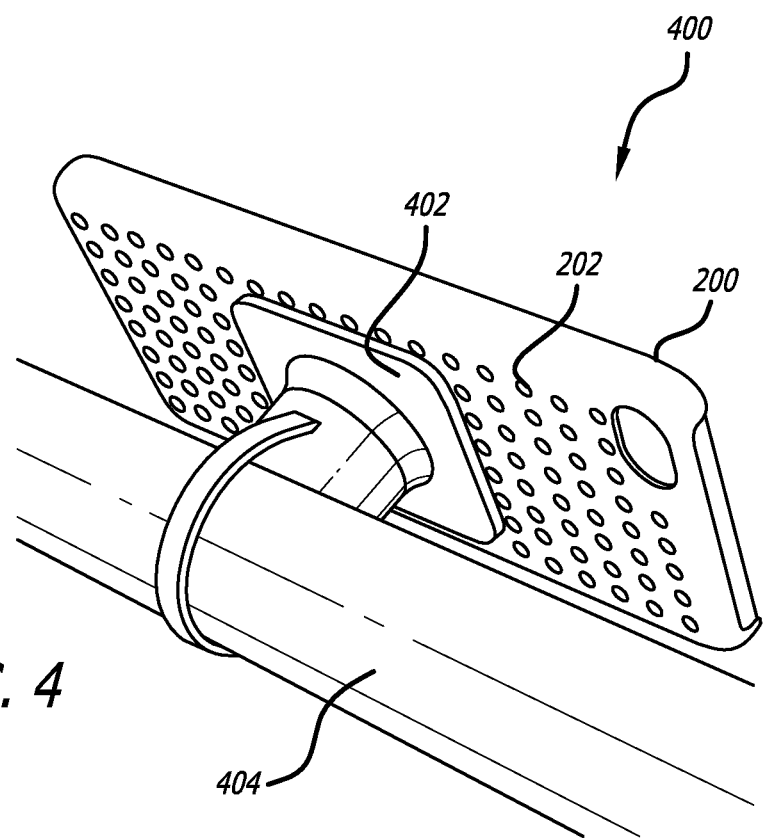
FIG. 4 illustrates an example of a cover used with a device mount, according to some aspects of the disclosure.

FIG. 4 illustrates an example of a mounted device cover 400. In the implementation of FIG. 4, a cover body 200 is mounted to support 404 via an adjustable mount 402. The adjustable mount 402 may be coupled with the cover body 200 with one or more projections engaged with one or more receivers 202 disposed on an accessory attachment area 204.

The mounted device cover 400 may allow 360-degree movement of the cover body 200 relative to support 404 via the adjustable mount 402. The adjustable mount 402 allows a user to adjust the positioning of the cover body 200 to a preferred orientation.

Figure 5:
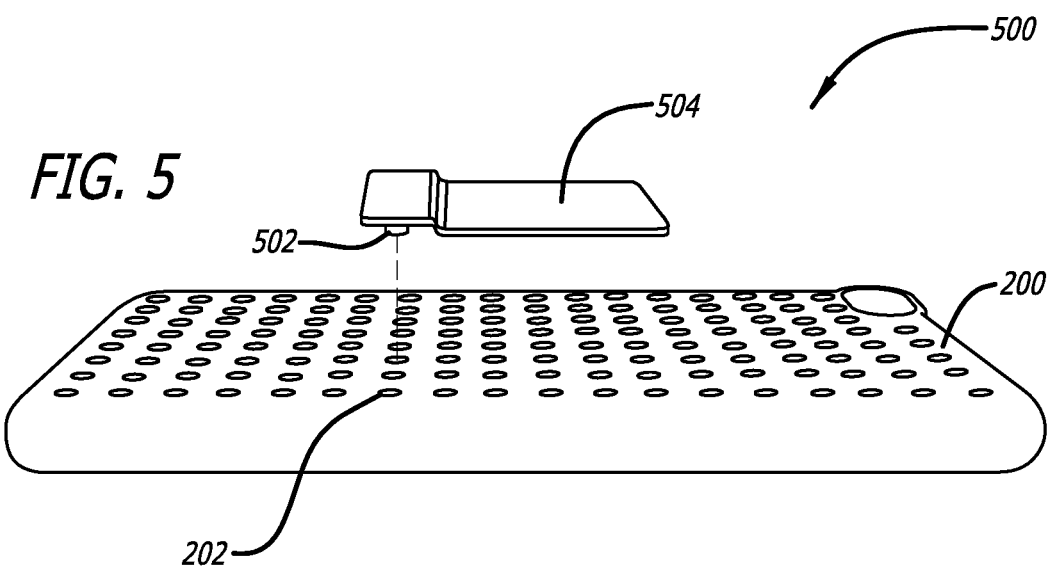
FIG. 5 illustrates an example of a cover used with a kickstand attachment device, according to some aspects of the disclosure.

FIG. 5 shows an exploded view of a cover 500 configured to couple with a kickstand accessory 504. The cover 500 includes a cover body 200 configurable with the kickstand accessory 504. The kickstand accessory 504 includes at least one projection 502 configured to be received in one or more receiver 202. The kickstand may have a first end and a second end. The plurality of projections 502 is placed on the first end for attaching the kickstand on the cover 200. The second end may be extended away from the cover 200 to form a supporting structure via the plurality of receivers and the plurality of projections for the handheld electronic device and the cover 200. The kickstand accessory 504 may be coupled at any desired orientation to support the cover 500 in a portrait position, a landscape position, or any position therebetween.

Figure 6:
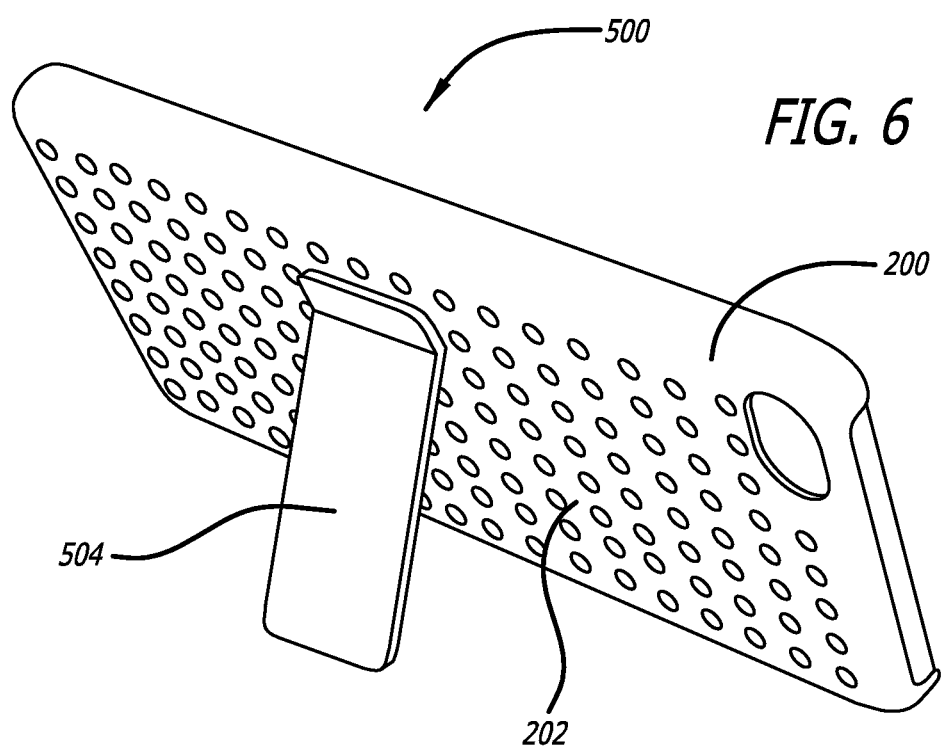
FIG. 6 illustrates a back-side view of a deployed kickstand attachment, as attached to the cover.

FIG. 6 shows an assembled view of a cover 500 coupled with the kickstand accessory 504. A projection 502 is received in one of receivers 202 on an accessory attachment area 204 of a cover body 200. The kickstand accessory 504 may be transitioned to extend away from the cover body 200 (as shown) and support the cover 500, or be transitioned substantially flush against the cover body 200 (as shown in FIG. 5). The kickstand accessory 504 may be substantially flush against the cover body 200 when not in use to reduce the profile of the cover 500. As used herein, 'substantially flush' may refer to a configuration whereby the kickstand accessory 504 is positioned adjacent to the accessory along the entirety of a contacting surface of the kickstand accessory 504.

Figure 7:
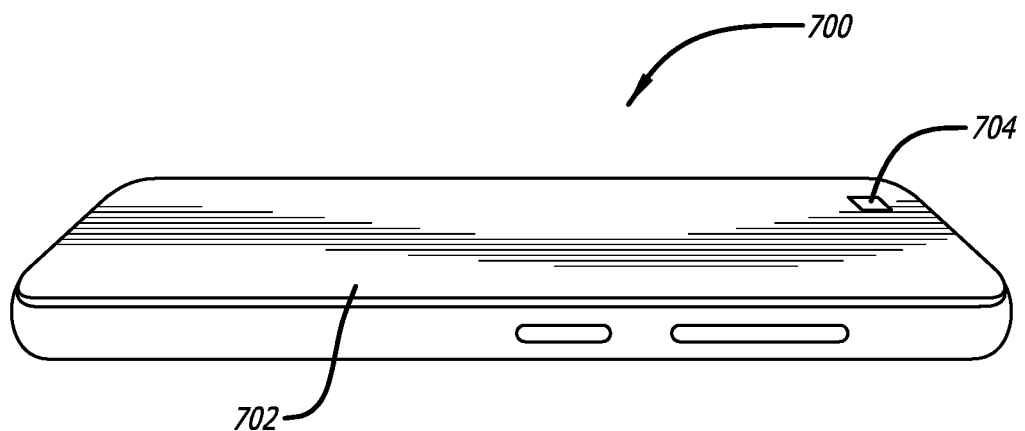
FIG. 7 illustrates a top-side view of a cover in a flip-cover implementation, according to some aspects of the present technology.

FIG. 7 shows an isometric view of a handheld electronic device 700 having flip cover 702. The flip cover 702 has a cover portion and a coupling portion. The cover portion of the flip cover 702 as showed in the FIG. 7 with arrow showing 702 covers at least a portion of the front surface of an electronic device, such as a surface of the electronic device that includes a display. The coupling portion as showed in the FIG. 8 with the arrow showing 702 is coupled to the cover via the receivers 202 on the cover body 200. The flip cover 702 may be transparent or semitransparent so that information such as time, battery life, incoming call information, music information, camera interface may be projected through the flip cover 702. The flip cover 702 may have one or more apertures 704 therein to provide access to predetermined screen features, such as time, battery life, incoming call information, etc. In at least one embodiment, an apertures 704 formed in the flip cover 702 include a clear viewing surface such as glass, plastic, acrylic, or the like.

Figure 8:
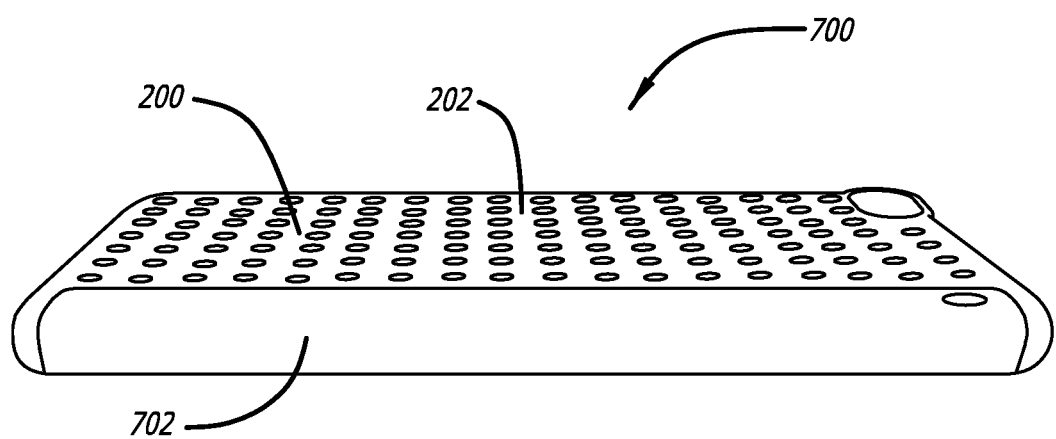
FIG. 8 illustrates a bottom-side view of the cover in the flip-cover implementation, according to some aspects of the present disclosure.

FIG. 8 shows a rear isometric view of a handheld electronic device 700 having a flip cover 702. In the illustration of FIG. 8 the flip cover 702 also covers a portion of a back surface of the electronic device, e.g., a surface that is opposite the front surface containing the display, as indicated above with respect to FIG. 7. The flip cover 702 may be coupled with the cover body 200 via the coupling portion and the receivers around an edge of the cover body 200.

Figure 9:
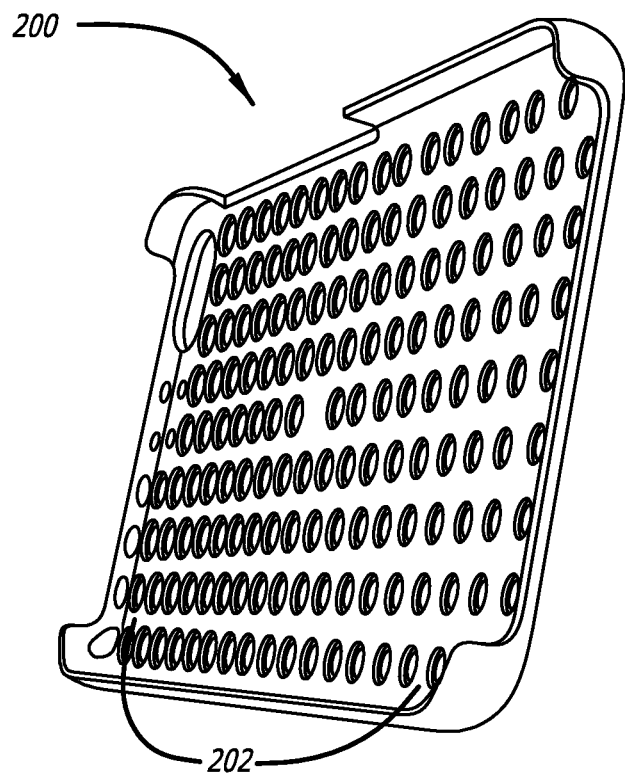
FIG. 9 illustrates an interior perspective view of a cover, according to some aspects of the present disclosure.

FIG. 9 shows an interior view of a cover body 200. The cover body 200 has receivers 202 formed therein. The receivers 202 may be formed in a matrix of rows and columns (e.g., a lattice pattern) allowing a device/accessories to be coupled with the cover body 200 at one or more locations, positions, and/or orientations. While a lattice pattern is shown, any pattern or even a random distribution of receivers 202 may also be applied.

Figure 10:
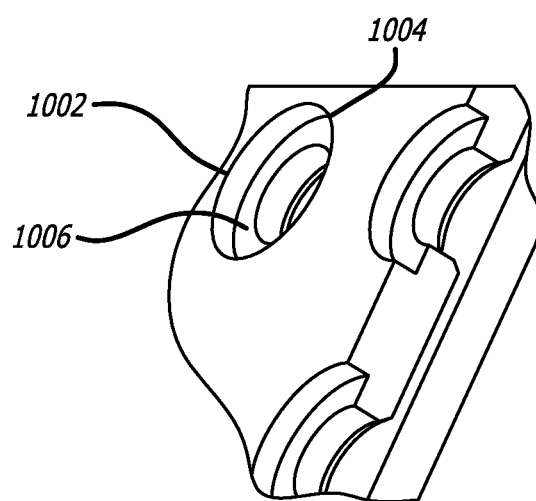
FIG. 10 illustrates a cut away perspective of receivers embedded in a cover, according to some aspects of the present disclosure.

FIG. 10 shows a detailed view of one of the receivers 202. The receiver 1002 may have a space recessed into a cover body that is bounded, at least partially, by a recess wall 1004. The receiver 1002 includes an engagement surface 1006 configured for forming an abutting engagement with a projection associated with an accessory (e.g., kickstand accessory 504). While a circular receiver 1002 shape is shown in FIG. 10, the shape of the receiver 1002 may be square, rectangle, triangle, octagon, irregular, and so forth.

The particular shape of the receiver 1002 may vary. The receiver may be a through hole, blind hole, interrupt holes, taper hole, taper holes with different taper angles at different section of the receiver. The arrangement of the receivers may be combination of the different type of holes.

Figure 11:
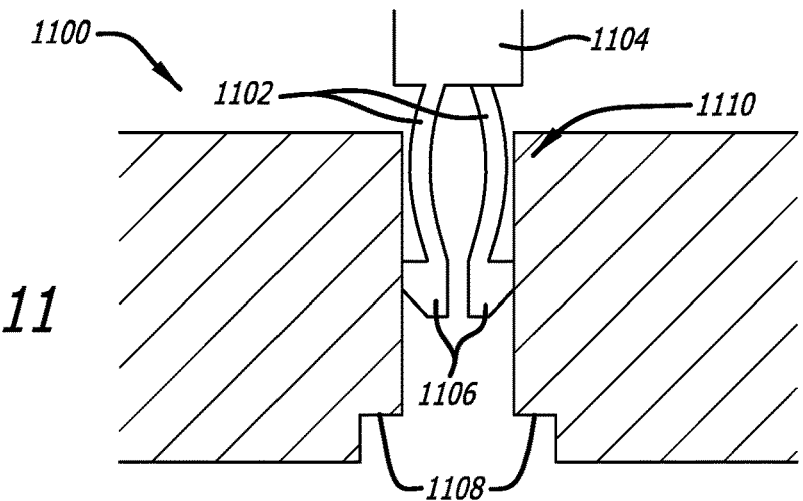
FIG. 11 illustrates a coupling of a projection and a receiver, according to some aspects of the present disclosure.

FIG. 11 shows example an environment 1100 illustrating an engagement between a projection 1104 and a receiver 1110. As illustrated, the receiver 1110 is formed by a space recessed into the cover body that is bounded, at least partially, by a recess wall that includes an engagement surface 1108. In the illustrated example, the projection 1104 includes elongate mechanisms or member 1102 and protrusions 1106. Correspondingly, the receiver 1110 includes an engagement surface 1108 configured for abutting engagement with each protrusions 1106. The receiver may have a first end and a second end formed by the recess wall. The first end and second end may be shaped differently for better securement of the projection into the receiver. The aperture or opening of the first end may be smaller than the aperture or opening of the second end as showed in FIG. 11. When the projection 1104 is pressed through, coupled or engaged to the receiver 1110, the elongate mechanisms is compressed through the first end. As the projection is pressed to reach the second end which having a bigger aperture or larger diameter than the first end, the elongate mechanism may be recovered or decompressed to couple to the receiver 1110. The engagement surface 1108 and the recess wall may face a different direction. The protrusion 1106 is locked, coupled, or contacted with the engagement surface 1108 so that the protrusion is securely placed in the receiver. The contact may be a point, line or area contact so that the protrusion is securely coupled with the receiver.

As discussed above, the receivers (e.g., receiver 1110) may be disposed in a cover body in various locations or arrangements. In some aspects, the receiver is configured such that an inserted projection (e.g., projection 1104) extends away from a back-side of the cover body, e.g., wherein the back-side is opposite an interior cover surface of the cover. As further illustrated in the example environment 1100, the engagement surface (e.g., engagement surface 1108) may be configured to provide a surface that faces in a direction different from a surface defining the recess wall. By way of example, the engagement surface 1108 may face or substantially face toward a direction of an enclosed electronic device (not illustrated in FIG. 11).

Figure 12A:
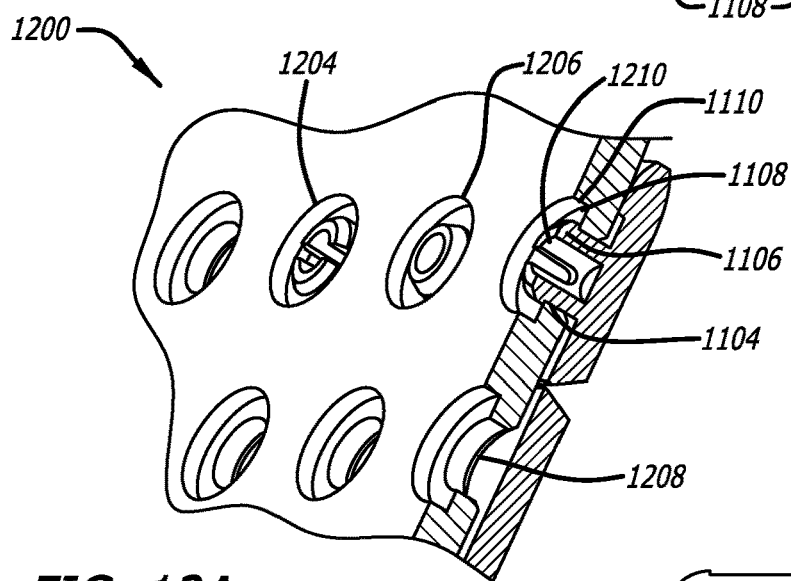
FIG. 12A illustrates a coupling of various projections with corresponding receivers, according to some aspects of the present disclosure.

FIG. 12A shows a detailed view of a plurality of projections received within a plurality of receivers (receiver 1204, receiver 1206, receiver 1208, and receiver 1210). The cover body section 1200 may accommodate various receivers engaged with a projection. As may be appreciated in the cross section of the receiver 1210 receiving the projection 1104, the engagement surface 1108 is abutting engaged with the protrusion 1106. The plurality of projections on the accessory may be arranged differently in consideration of accessory securement. As an example of the arrangement of the plurality of projections, the projections in the receivers 1210 and 1204 have the protrusions to securely coupled to the receivers, whereas the projection in receiver 1206 lack the protrusion to lock on the receiver 1206. The additional projection without the protrusion in the receiver 1206 may be used for security of a lateral movement or an angular movement with other projection. As for the projection with protrusion as in the receivers 1204 and 1210 may be used for limiting the lateral, angular, axial, or perpendicular movement. The number of the projection with protrusion may be configured to fit the ease of the attachment or detachment. As the number of the projections with protrusions increases, it is expected that the accessary is more secure on the cover. The placement of the projections may be a consideration, too. As shown in FIG. 12A, the receiver 1208 does not have a corresponding projection from the accessory to be inserted into. The projection may be placed on the accessory to accommodate the weight distribution of the accessory or the security requirement.

Figure 12B:
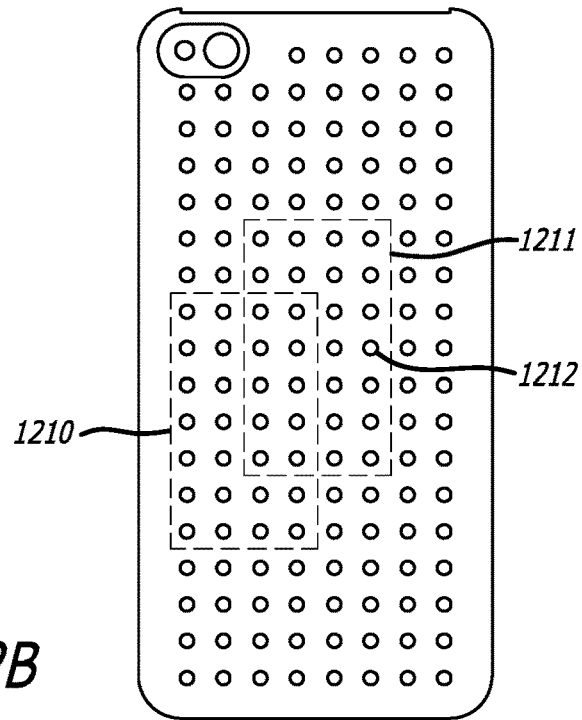
FIG. 12B illustrates an accessory may be coupled to a cover at various positions.

In some aspects, the number of the projections on the accessory may be less than the number of receivers on the cover. In other words, the number of receivers is more than the number of projections so that the accessory may be moved from a different location on the cover or having a second accessory attached to the cover at the same time. The accessory may attach to a different location or an orientation on the cover by using the same projection on the accessory to different receivers on the cover. For example, as shown in FIG. 12B the accessory may be moved from a first position to a second position by attaching a first set of receivers 1210 at the first position and attaching a second set of receivers 1211 at the second position. The first set of receivers 1210 is different from the second set of receivers 1211 by at least one receiver 1212. As the accessory moves further away from an original position, the first set of receivers used for attaching the cover and accessory has more different receivers used. There may be a second accessory attached to the cover. The first accessory may attach to a first side of the cover and the second accessory may attach to a second side of the cover using a different set of receivers.

Figure 13:
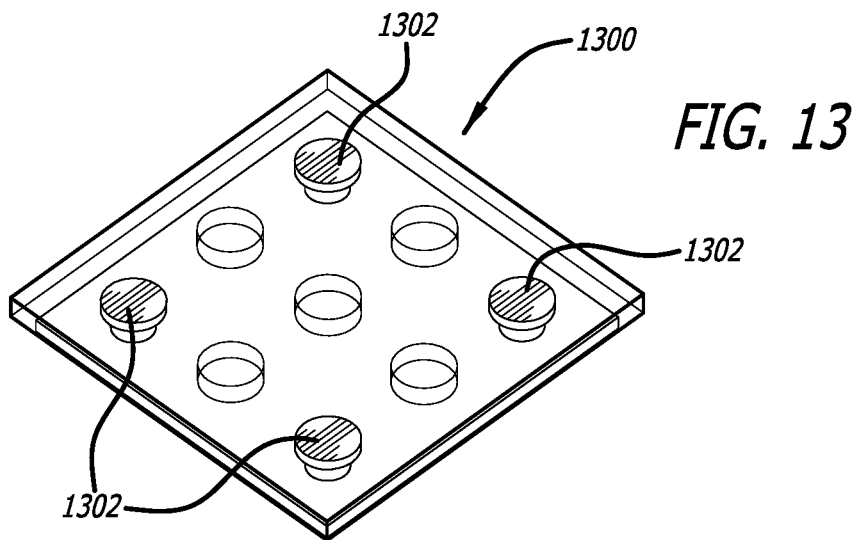
FIGS. 13, 14 and 15 illustrate various arrangements of projections in accordance with some aspects of the technology.
Figure 14:
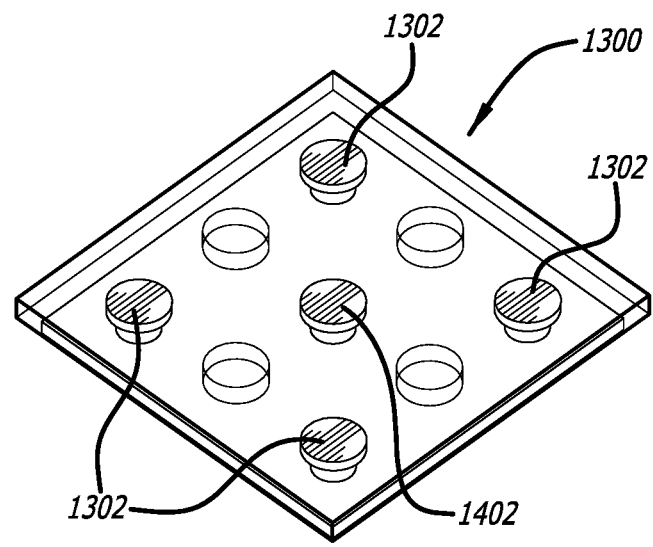
Figure 15:
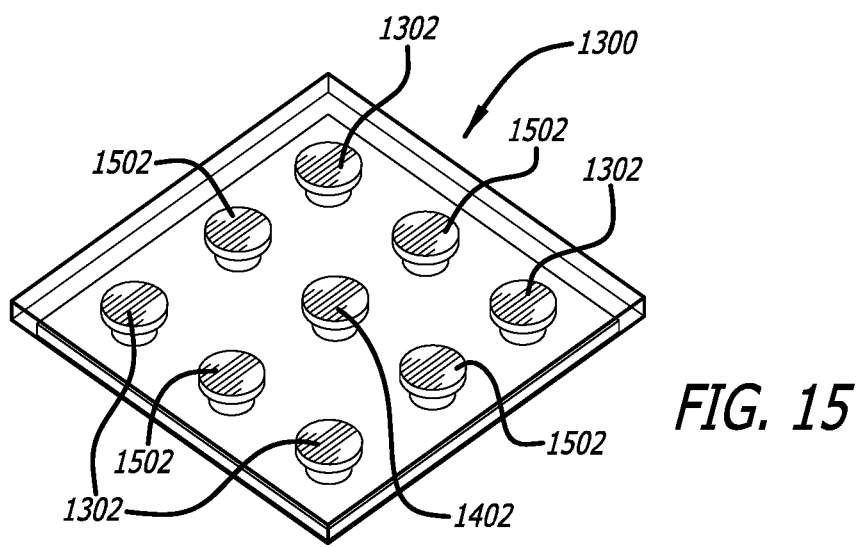
Figure 16:
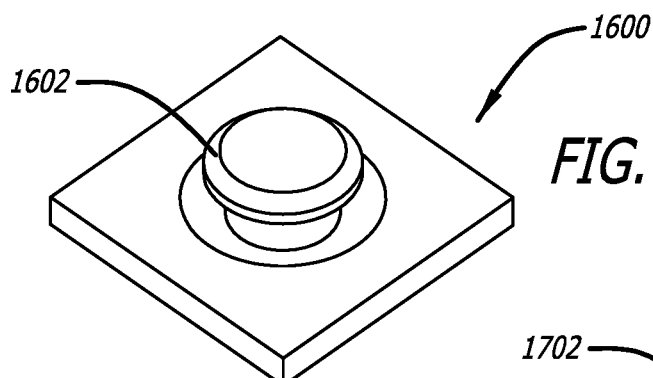
FIG. 16 illustrates a first example of a projection in accordance with the present disclosure.

FIGS. 13-15 show various engagement arrangements for a matrix of receivers. The matrix of receivers 1300 may be secured to a cover with a projection 1302 at four corners. As may be appreciated in FIG. 14, an additional center projection 1402 may be employed in addition to the projection 1302 at each of the four corners. As may be appreciated in FIG. 15, the remaining receivers of matrix of the receivers 1300 may be secured with the additional projections 1502. The shown arrangements are merely illustrative, and it is within the scope of the disclosure to implement any arrangement of the projections within matrix of the receivers 1300.

FIGS. 16-20 show various projection embodiments. As may be appreciated in FIG. 16, a projection 1600 is substantially circular and has a protrusion 1602 extending around the circumference of the projection 1600. As used herein, "substantially circular" may mean that the projection 1600 may have a circular or semi-circular shape, such as an oval or oblong shape or any other shape. The shape of the projections may correspond to the shape of the receivers on the cover. The shape of the protrusion 1602 may be different from the shape of the projection. The shape of the protrusion 1602 may correspond to the shape of the engagement surface mentioned above. As showed in FIG. 16, the shape of the projection 1600 is the same circular shape as that of the protrusion 1602. It will be apparent to those of skill in the art that other projection geometries may be implemented, without departing from the scope of the technology. By way of example, any of the projections implemented herein (e.g., projection 1600) may include symmetrical shapes (e.g., a square or rectangular shape), as well as non-symmetrical shapes.

Figure 17:
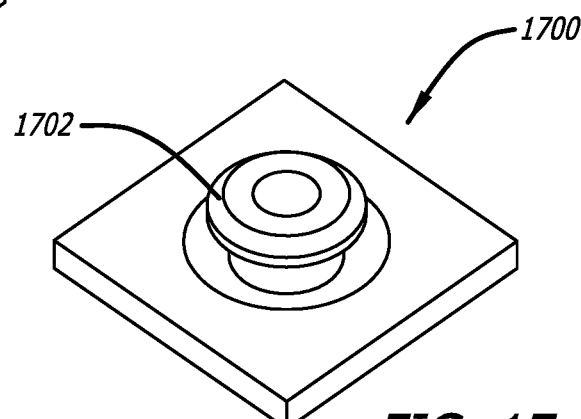
FIG. 17 illustrates a second example of a projection in accordance with the present disclosure.
Figure 18:
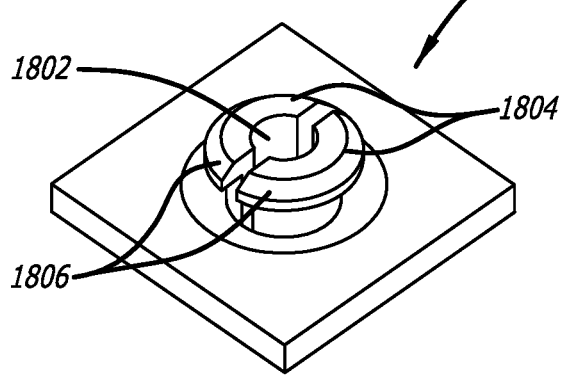
FIG. 18 illustrates a third example of a projection in accordance with the present disclosure.
Figure 19:
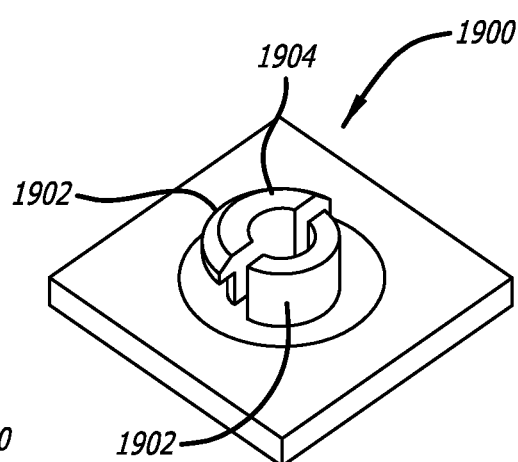
FIG. 19 illustrates a fourth example of a projection in accordance with the present disclosure.
Figure 20:
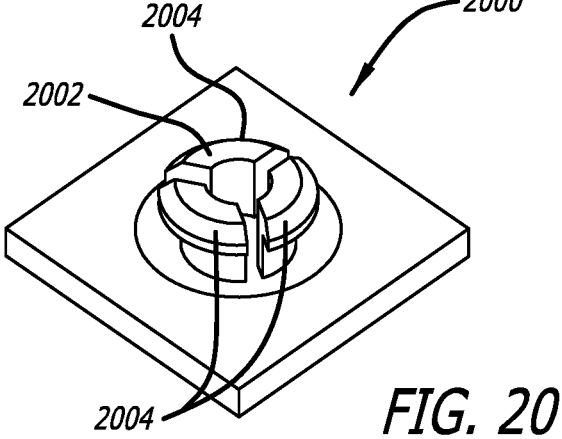
FIG. 20 illustrates a fifth example of a projection in accordance with the present technology.

As may be appreciated in FIG. 17, a projection 1700 may have an aperture 1702 formed in the center. As may be appreciated in FIG. 18, a projection 1800 may have two substantially equal portions 1804 each having a protrusion 1806 extending from the circumference and the center aperture 1802. The center aperture 1802 may allow displacement of substantially equal portions 1804 during securing and releasing of the projection with a receiver. As may be appreciated in FIG. 19, a projection 1900 may have two substantially semicircular portions 1902 and only one of two portions has a protrusion 1904 extending therefrom. As may be appreciated in FIG. 20, a projection 2000 may have three substantially equal portions 2004 each having a protrusion 2002 extending therefrom.

Figure 21:
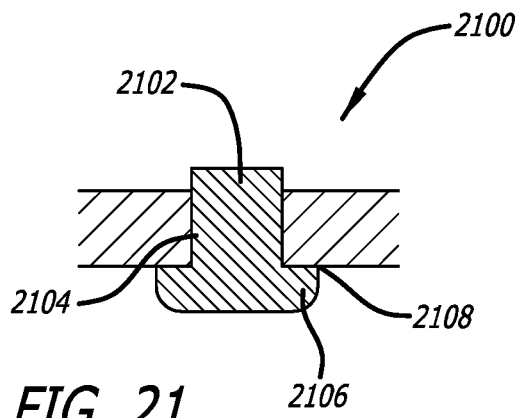
FIG. 21 illustrates a first example of an engagement between a projection and an engagement surface, according to some aspects of the disclosure.

FIG. 21 shows an example engagement 2100 of a projection 2102 disposed within a receiver 2104. The example engagement 2100 includes the projection 2102 engaged in the receiver 2104. A protrusion 2106 of the projection 2102 may engage the engagement surface 2108 of the receiver 2104. The projection 2102 may be engaged with a receiver with a different opening at a different end or engaged with a through hole receiver. The projection 2102 is compressed through the receiver 2104 and decompresses at the end of the receiver and engaged on the surface of the cover via an engagement surface 2108. The projection described above and below may be engaged to a different kind of receiver to form an engagement of the cover and the accessory.

Figure 22:
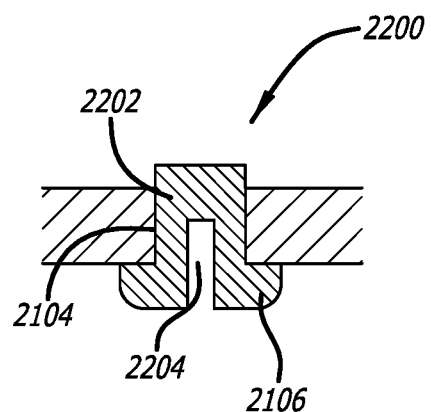
FIG. 22 illustrates a second example of an engagement between a projection and an engagement surface, according to some aspects of the disclosure.

FIG. 22 shows an example engagement 2200 of a projection 2202 disposed within a receiver 2104. The projection 2202 has an aperture 2204 formed substantially in the center. The aperture 2204 may provide flexibility and deflection of the projection 2202 during securing and releasing by allowing a protrusion 2106 to deflect inward toward aperture 2204.

Figure 23:
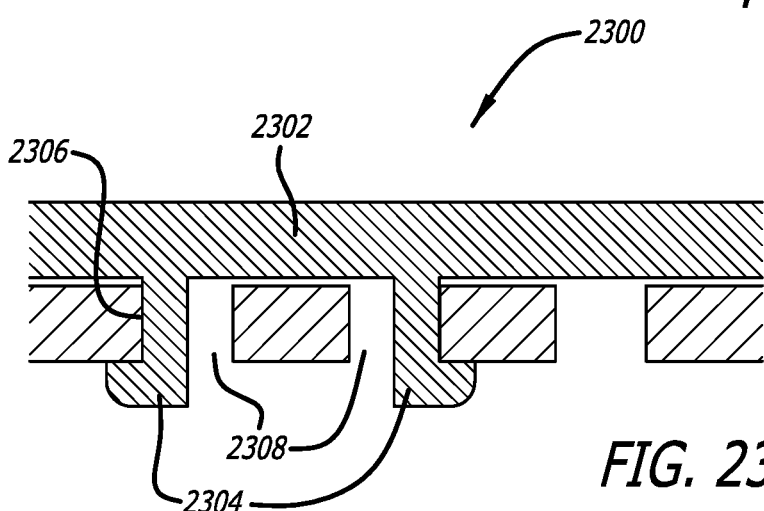
FIG. 23 illustrates a third example of an engagement between a projection and an engagement surface, according to some aspects of the disclosure.

FIG. 23 shows an example engagement 2300 of a projection 2302 engaged with two receivers 2308. The projection 2302 includes protrusions 2304 engaged in respective receivers 2308 (e.g., two adjacent receivers) of an engagement surface or the surface of the cover 2306. Another example of a projection may be having the projection with a protrusion along one side as one of the projection 2302 described in the FIG. 23. The projection may engage to only one side of the receiver and a second projection of the same shape with a different protrusion extends toward a different direction may be placed at a distance for engaging another receiver.

Figure 24:
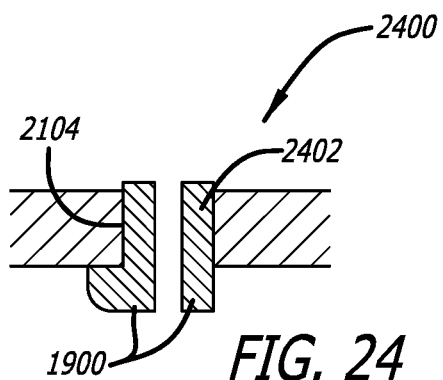
FIG. 24 illustrates a fourth example of an engagement between a projection and an engagement surface, according to some aspects of the disclosure.

FIG. 24 shows an example embodiment of a projection 2402 engaged with a receiver 2104. The example engagement 2400 includes the projection 2402 engaged in a space of the receiver 2104. The projection 2402 disposed in the receiver 2104 shown in FIG. 24 may be seen in FIG. 19 in uncoupled state.

Figure 25:
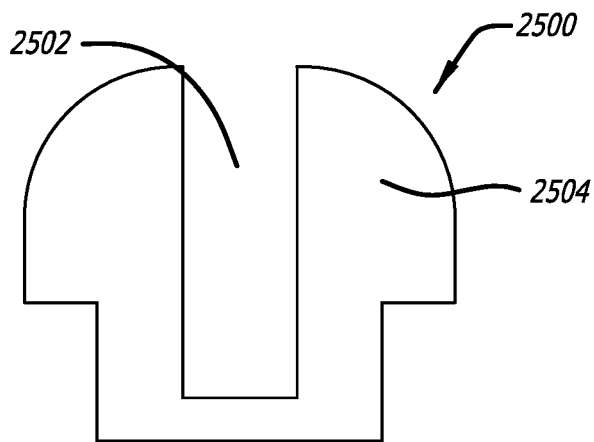
FIGS. 25-28 illustrate various examples of projections, in accordance with some aspects of the disclosure.

FIG. 25 to FIG. 28 shows a projection with various centers that makes out of a different material or a combination of materials. The center or core may be composed of different materials to account for the rigidity of the projection and ease of the projection to engage with a receiver. FIG. 25 shows a projection 2500 having rigid material 2504 with a substantially hollow center portion 2502. As the projection 2500 presses or engages to a receiver, the projection is compressed toward the center hollow portion 2502. The projection may be decompressed to engage to the receiver in a secure manner.

Figure 26:
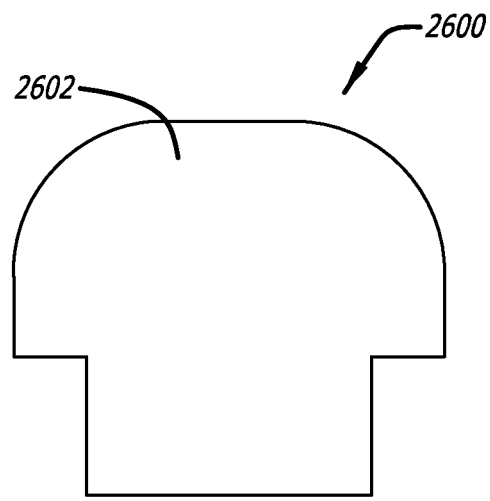
Figure 27:
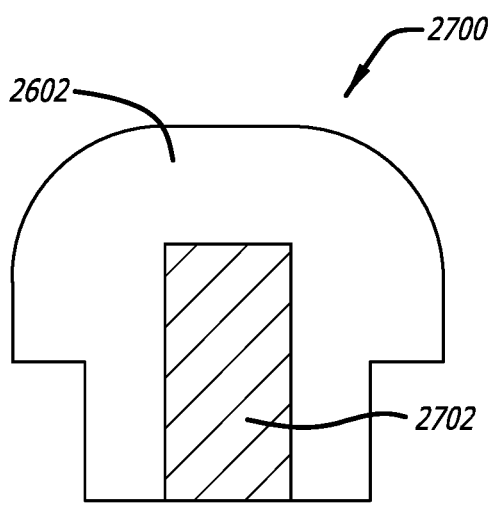
Figure 28:
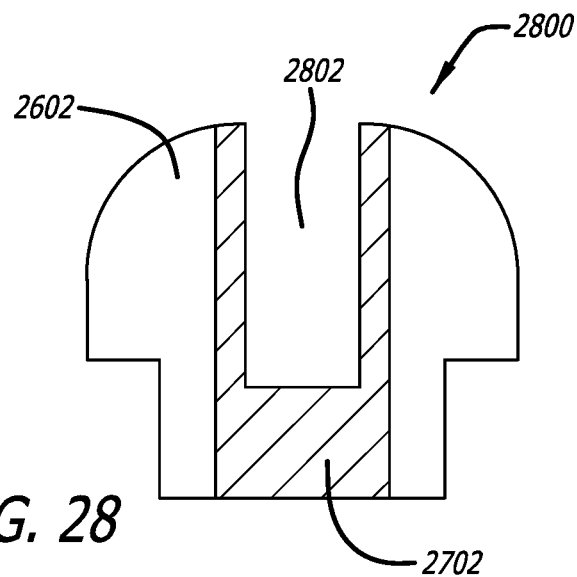

FIG. 26 shows a projection 2600 having elastically deformable material 2602. FIG. 27 shows projection 2700 formed from elastically deformable material 2602 disposed around rigid material core 2702. As the projection 2700 presses or engages to a receiver, the projection is compressed toward the rigid material core 2702. The projection may be decompressed to engage to the receiver in a secure manner. FIG. 28 shows projection 2800 formed from elastically deformable material 2602 with rigid material core 2702 having substantially hollow center 2802.

Figure 29:
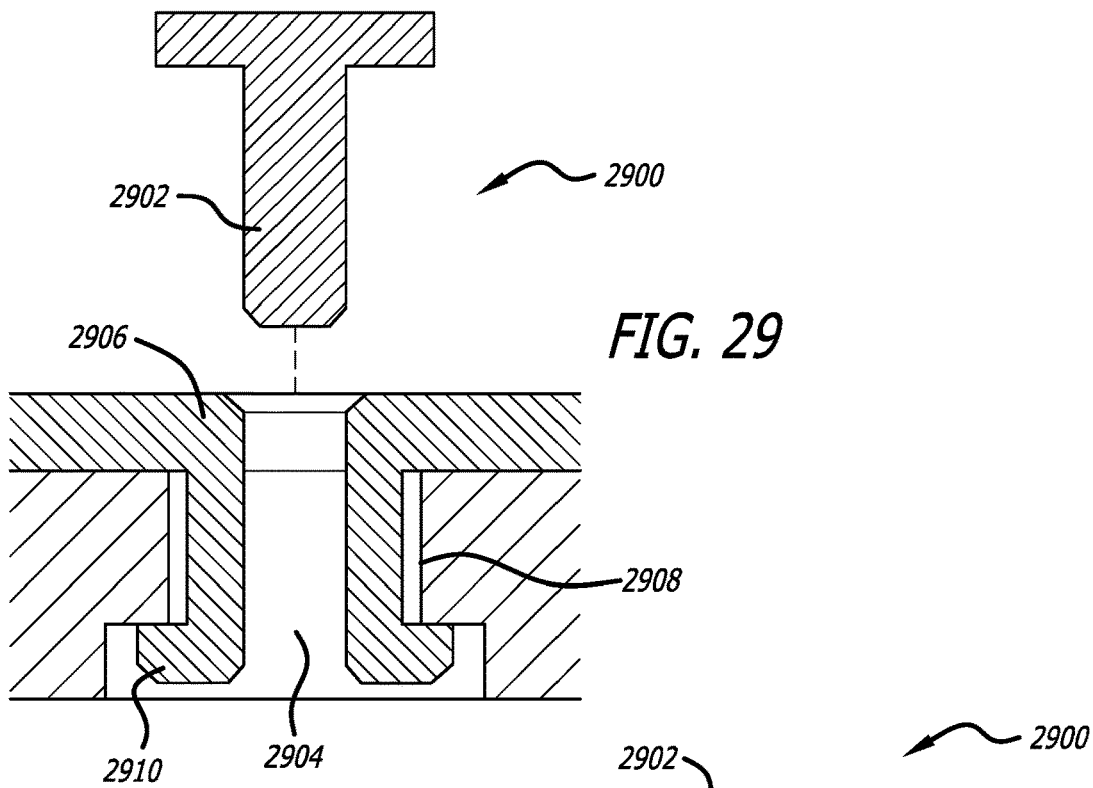
FIGS. 29 and 30 illustrate examples of a secure pin implementation, according to some aspects of the disclosure.
Figure 30:
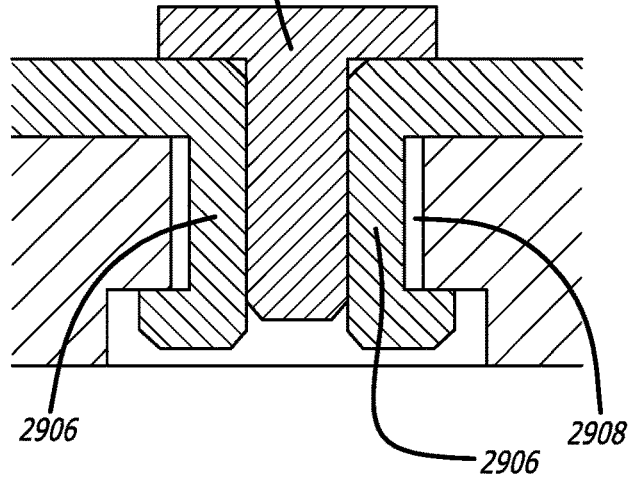

FIGS. 29 and 30 show a secure pin arrangement 2900. The secure pin arrangement 2900 includes a projection 2906 with a substantially hollow center 2904 adapted to receive a secure pin 2902. The secure pin 2902 may prevent inward deflection of protrusions 2910, thereby preventing removal of the projection 2906 from the receiver 2908.

Figure 31:
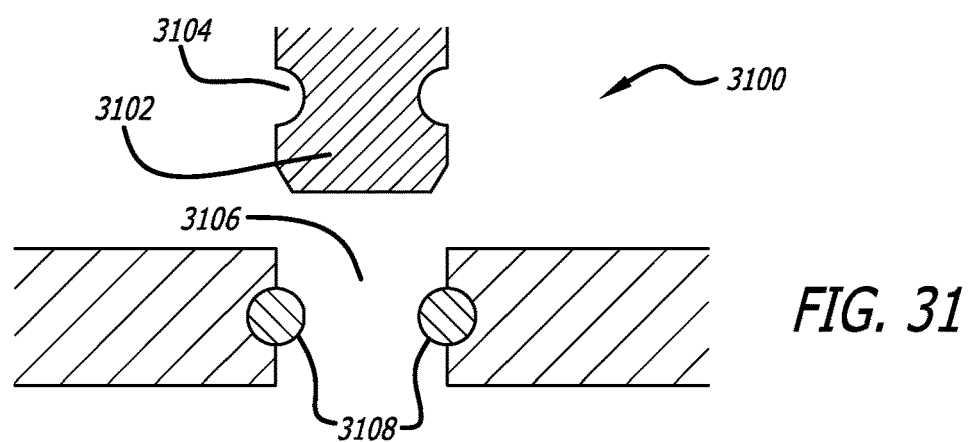
FIG. 31 illustrates an example of a projection configured for mechanical coupling with an engagement surface inside a receiver, according to some implementations of the disclosure.

FIG. 31 shows a catch arrangement 3100 including a projection 3102 having an engagement surface 3104 formed to engage with and a locking structure 3108 formed within a receiver 3106. The locking structure may be a ball bearing installed in the receiver or latch structure that may be coupled with the engagement surface 3104. The engagement surface 3104 may be a concave surface on the projection 3102. The ball bearing structure may be locked or coupled with the concave surface to secure the projection to the receiver. The engagement surface 3104 may be a locking structure such as a ball bearing or latch and the locking structure may be a concave surface. The receiver and the projection may be coupled to each other vice versa.

Figure 32:
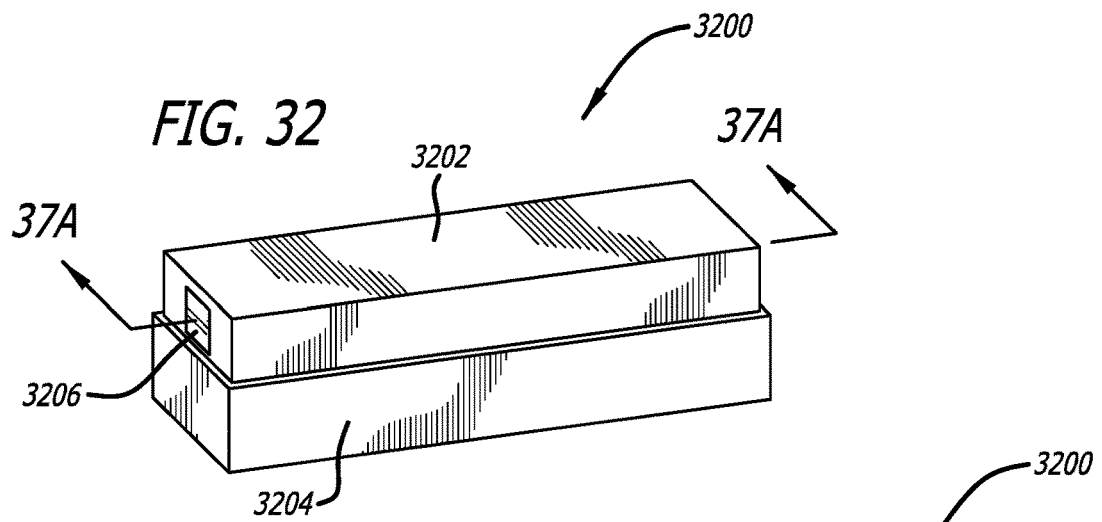
FIG. 32 conceptually illustrates an example of a release mechanism attaching one or more projections with corresponding receivers, according to some aspects of the disclosure.

FIG. 32 shows a releasable projection 3200 including an accessory 3202 configured for alignment with a cover body 3204. The accessory 3202 may have a release mechanism 3206 configured for releasable engagement between the accessory 3202 and the cover body 3204.

Figure 33:
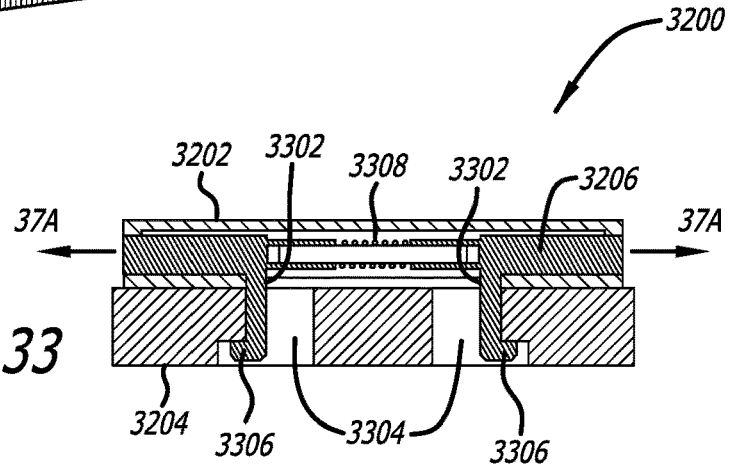
FIG. 33 is a cross-section view of an example of a release mechanism attaching one or more projections with corresponding receivers in a secured, coupled position.
Figure 34:
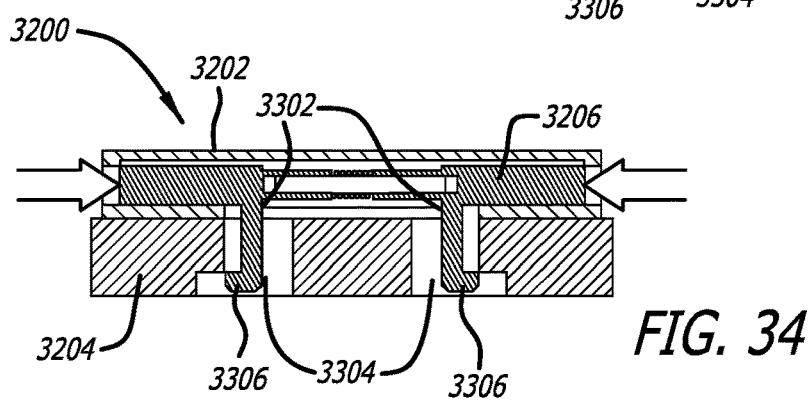
FIG. 34 is a cross-section view of an example of a release mechanism attaching one or more projections with corresponding receivers in an unsecured, coupled position.
Figure 35:
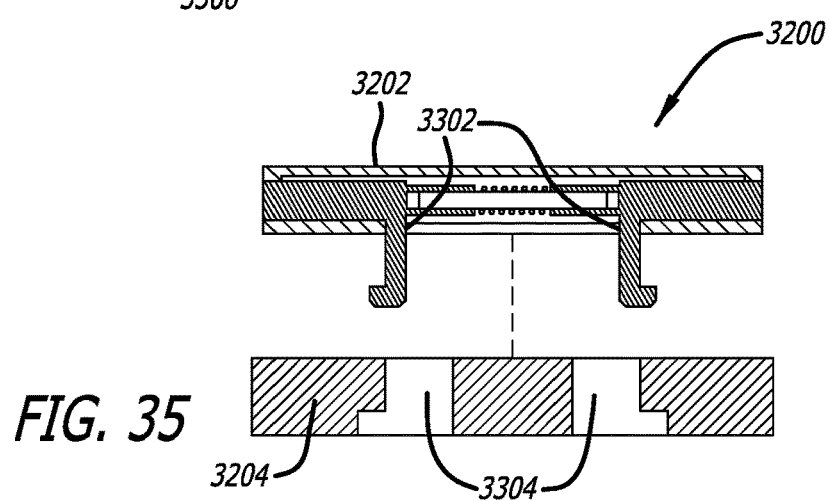
FIG. 35 is a cross-section view of an example of a release mechanism configured for attaching one or more projections with one or more corresponding receivers in an unsecured, decoupled position.
Figure 36:
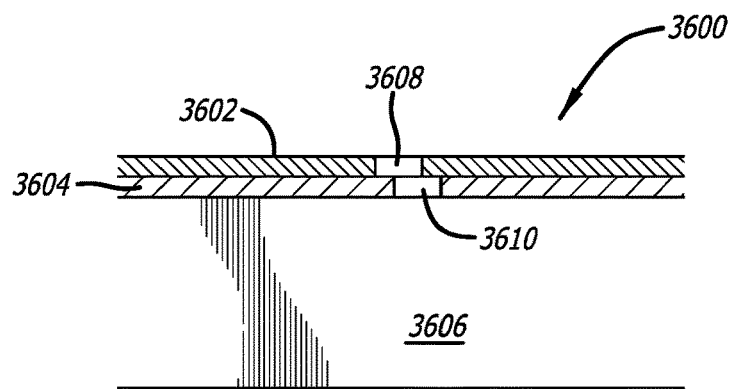
FIG. 36 conceptually illustrates an example sliding release mechanism in a secured position, according to some aspects of the disclosure.
Figure 37:
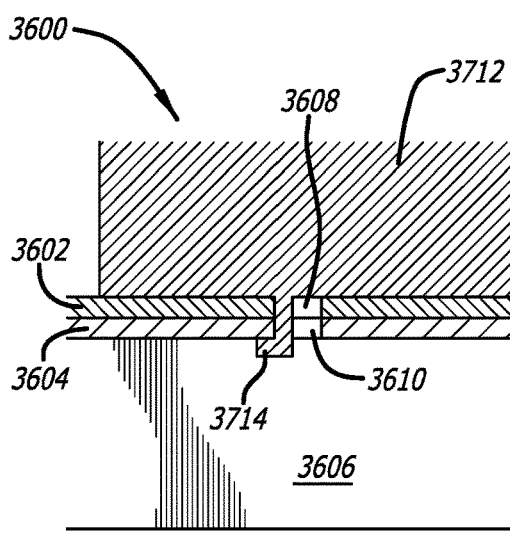
FIG. 37 conceptually illustrates an example sliding release mechanism in an unsecured position, according to some aspects of the disclosure.
Figure 38:
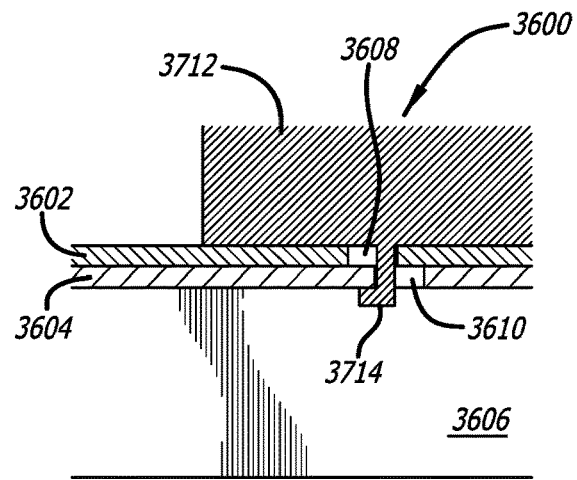
FIG. 38 conceptually illustrates an example sliding release mechanism in a secured position, according to some aspects of the disclosure.
Figure 39:
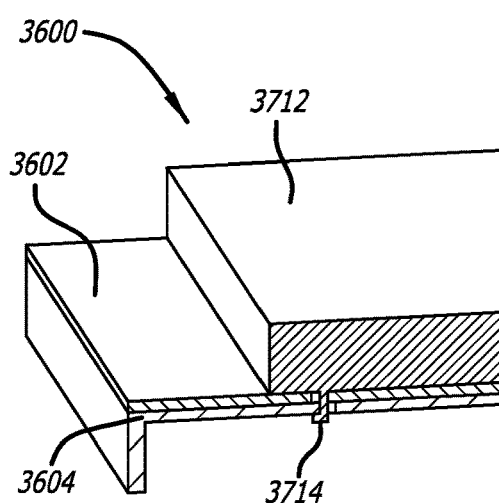
FIG. 39 is an isometric view of an example sliding release mechanism in a secured position, according to some aspects of the disclosure.

FIGS. 33-35 show actuation of a releasable projection 3200. The releasable projection 3200 includes a projections 3302 of the accessory 3202 configured for engagement with a receivers 3304 of the cover body 3204. The projections 3302 may be transitioned within the receivers 3304 by actuation of a release mechanism 3206. Compression of the release mechanism 3206 transitions the projections 3302 within the receivers 3304 from a secured position to an unsecured position (FIG. 34), thereby disengaging the protrusions 3306 from the cover body 3204.

The release mechanism 3206 may include a spring bias 3308 to bias a release mechanism 3206 to the secured position. In the unsecured position (FIG. 34), the accessory 3202 may be decoupled from the cover body 3204 (FIG. 35). While the biasing element is shown as a spring, it is within the scope of this disclosure to implement other biasing elements including, but not limited to, elastically deformable materials such as rubber.

FIGS. 36-39 show a slidable engagement 3600. The slidable engagement 3600 for use with a cover 3606 includes a first layer 3604 and a second layer 3602. The second layer 3602 includes apertures 3608 formed corresponding to the receivers 3610 of the first layer 3604. The second layer 3602 is slidable relative to the first layer 3604 providing alignment of the apertures 3608 with the corresponding receivers 3610. Transitioning the second layer 3602 to a receiving position (FIG. 37) allows receiving and engagement of one or more projection 3714 of the accessory 3712 with the receivers 3610.

After engagement, the second layer 3602 is biased toward partial alignment with the apertures 3608 and the receivers 3610 (FIGS. 38 and 39), thereby securing the accessory 3712 with the first layer 3604.

Figure 40:
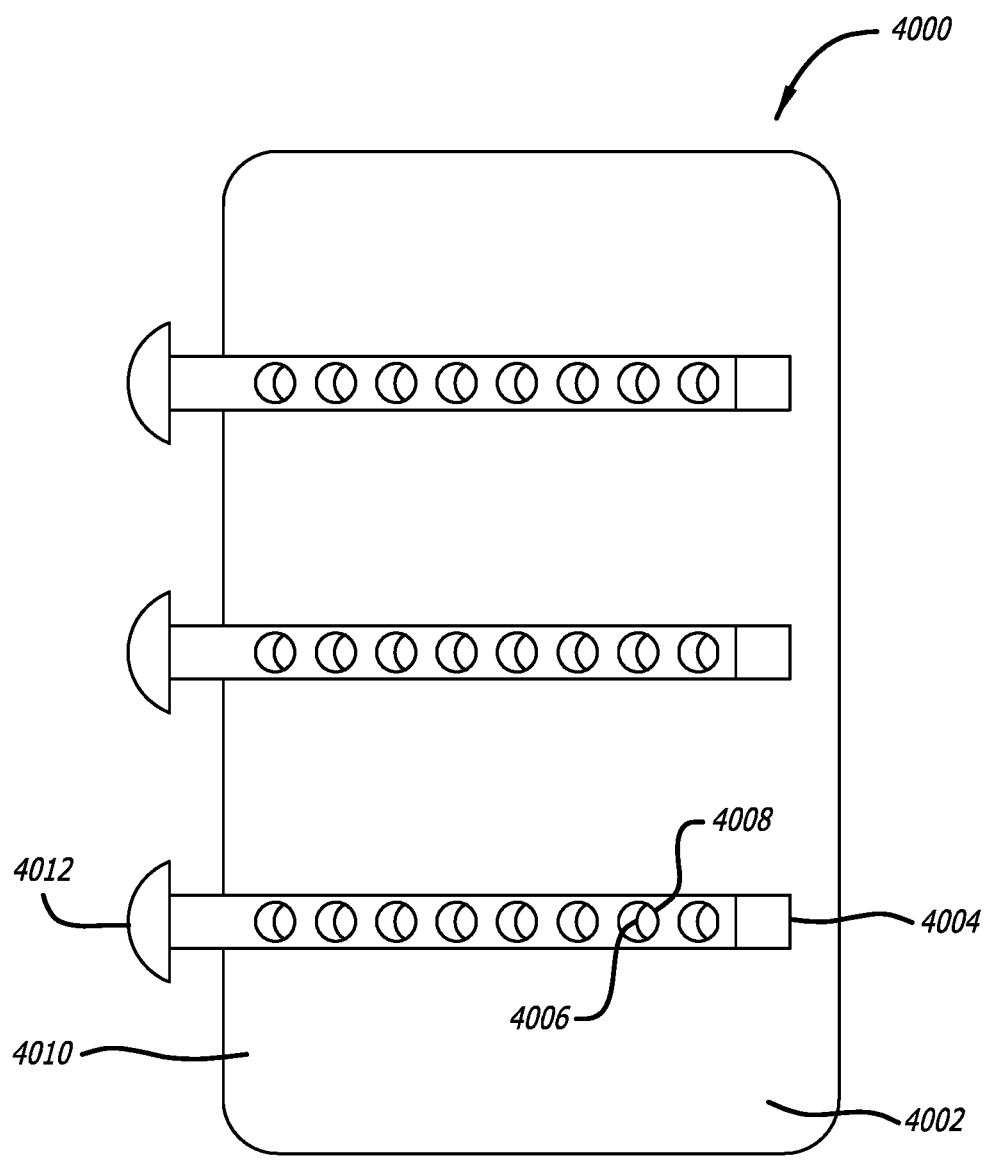
FIG. 40 illustrates a top down view of an example release mechanism having two or more second layers.

FIG. 40 shows a sliding arrangement 4000 having a first layer 4002 and two or more second layers 4004. The second layer 4004 may have apertures 4006 corresponding to a row or column within matrix of receivers 4008. The apertures 4006 may align with any configuration or pattern of the receivers beyond a row or column. Each second layer 4004 may be transitioned independent of the other second layer allowing one accessory to be coupled/decoupled from the cover 4010 without interrupting the coupling of other accessories in adjacent rows or columns of the cover 4010. The second layer 4004 may be operating by corresponding push buttons 4012 sliding the second layer 4004 relative to the first layer 4002.

Figure 41A:
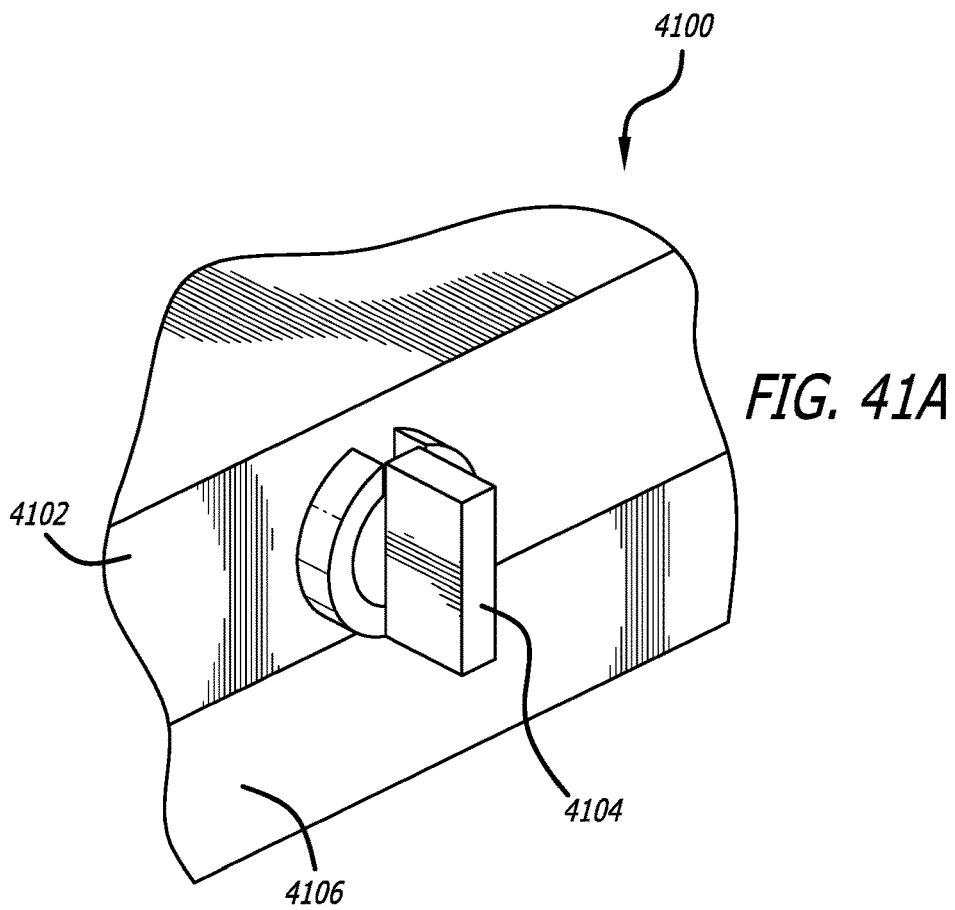
FIGS. 41A and 41B illustrate examples of a lock mechanism in an unsecured position, and a secured position, respectively.
Figure 41B:
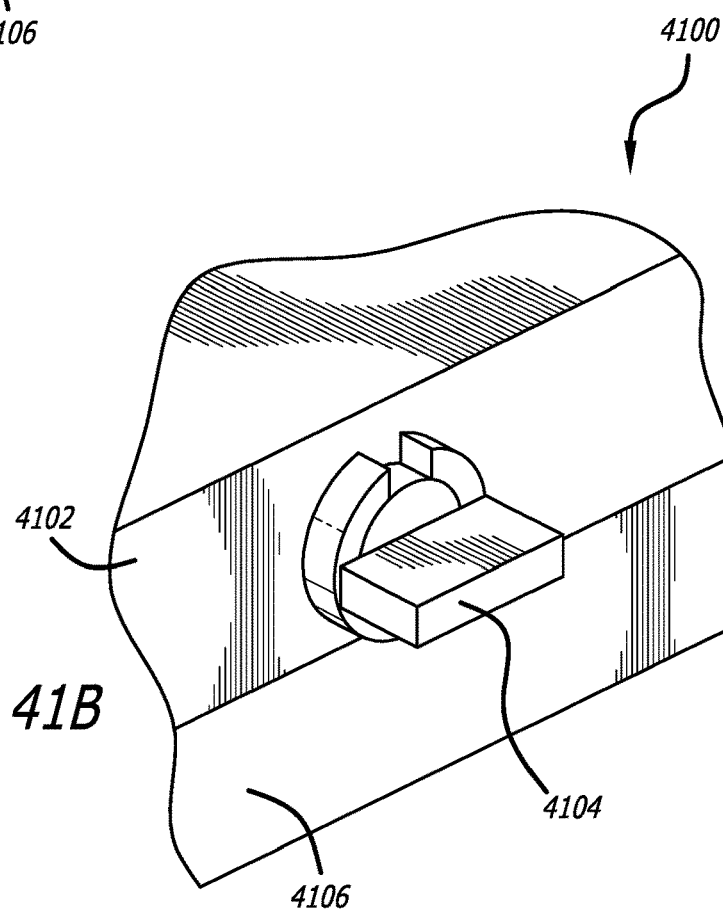
Figure 42:
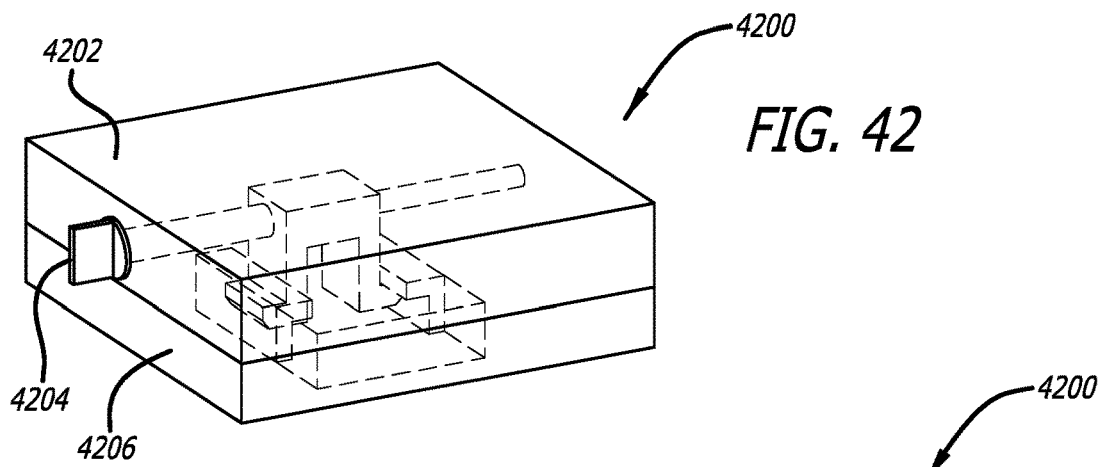
FIG. 42 illustrates a rotatable locking mechanism securing a projection within a receiver of a cover, according to some aspects of the disclosure.

FIGS. 41A and 41B show a lock arrangement 4100 of an accessory 4102 including a lock mechanism 4104. The lock mechanism 4104 may be rotatable between an unlocked (FIG. 41A) and a locked position (FIG. 41B). The unlocked position may allow compression of the lock mechanism 4104, thereby allowing the accessory 4102 to decouple from the cover body 4106. The locked position may prevent compression of the lock mechanism 4104, thereby preventing coupling or decoupling of the accessory 4102 from the cover body 4106.

Figure 43:
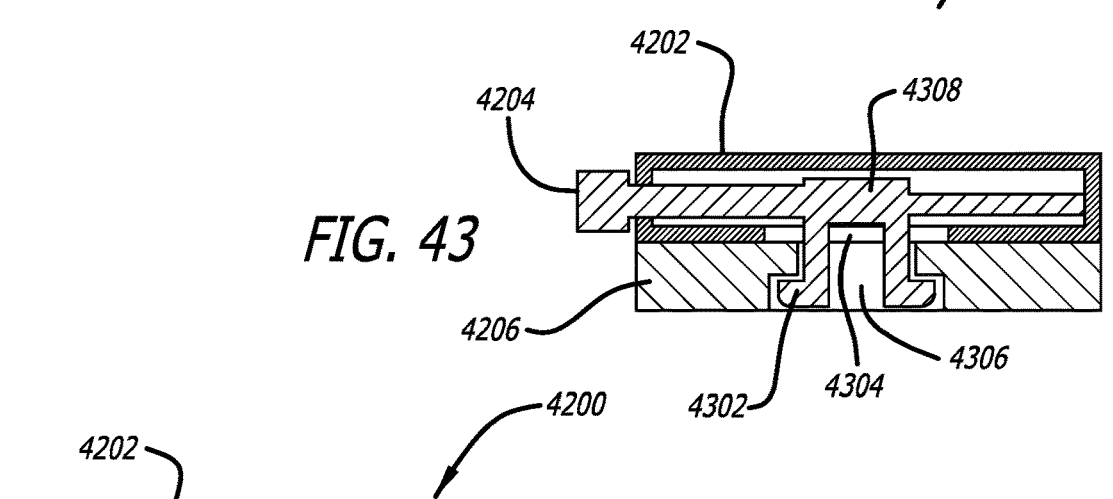
FIG. 43 is a cross-section view of a rotatable lock mechanism securing a projection within a receiver of a cover, according to some aspects of the present disclosure.
Figure 44:
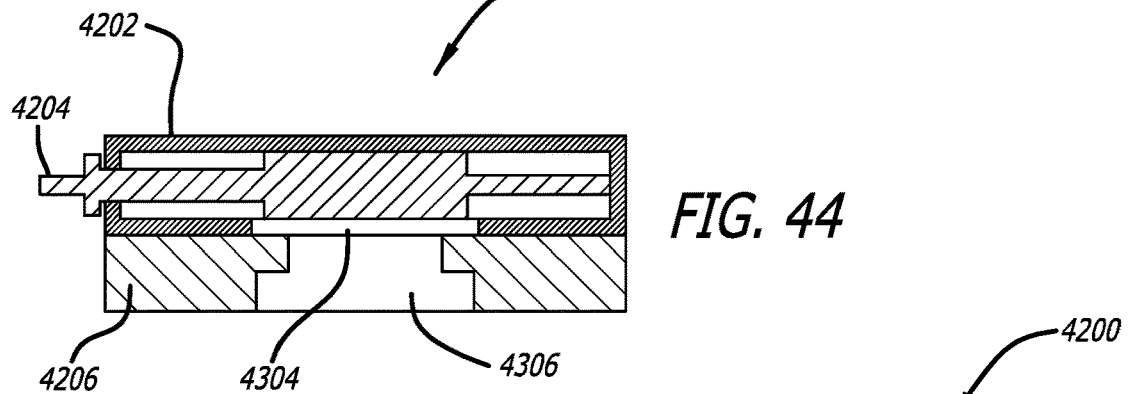
FIG. 44 is a cross-section view of a rotatable lock mechanism in an unsecured position, according to some aspects of the disclosure.
Figure 45:
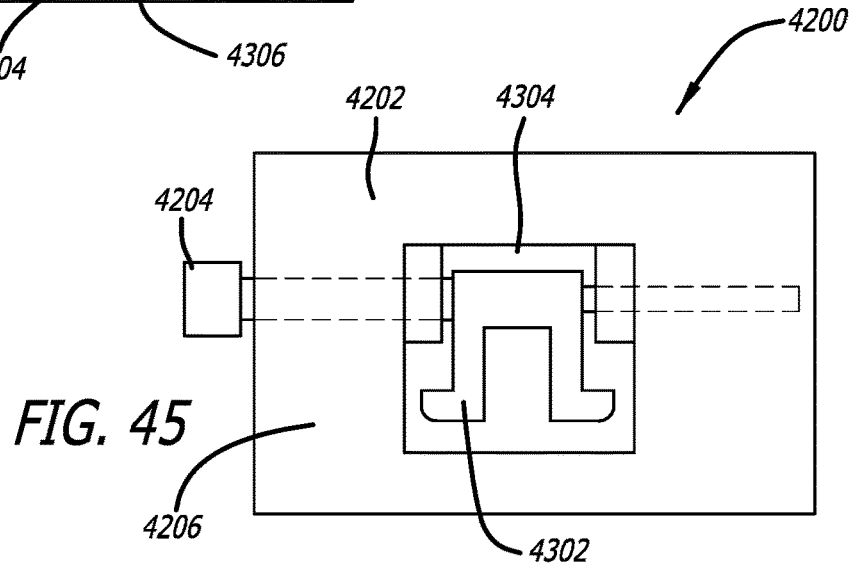
FIG. 45 is a top down view of an example rotatable lock mechanism in an unsecured position, according to some aspects of the disclosure.

FIGS. 42-45 show rotatable an engagement mechanism 4200 configured to engage an accessory 4202 with a cover body 4206. The rotatable engagement mechanism 4200 includes a rotatable lock mechanism 4204 transitionable between a secured position and a released position. As may be appreciated in FIG. 43, the rotatable engagement mechanism 4200 may have one or more apertures 4304 formed in the cover body 4206 and aligned with one or more receiver 4306. The receiver 4306 is configured to receive a protrusion 4302 of a projection 4308 in the secured position (FIG. 43). As may be appreciated in FIG. 44, the rotatable engagement mechanism 4200 may be transitioned to the unsecured position, thereby rotating the protrusion 4302 (shown in FIG. 43) away from the receiver 4306 and into the accessory 4202 (FIG. 45).

Figure 46:
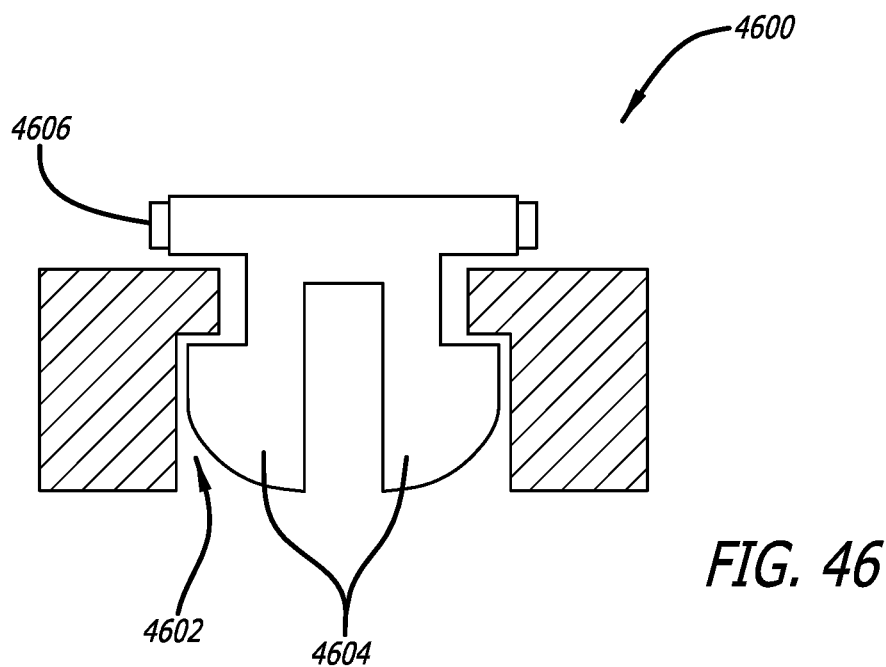
FIG. 46 illustrates a side perspective view of a lockable and releasable projection disposed within a receiver, according to some aspects of the disclosure.
Figure 47:
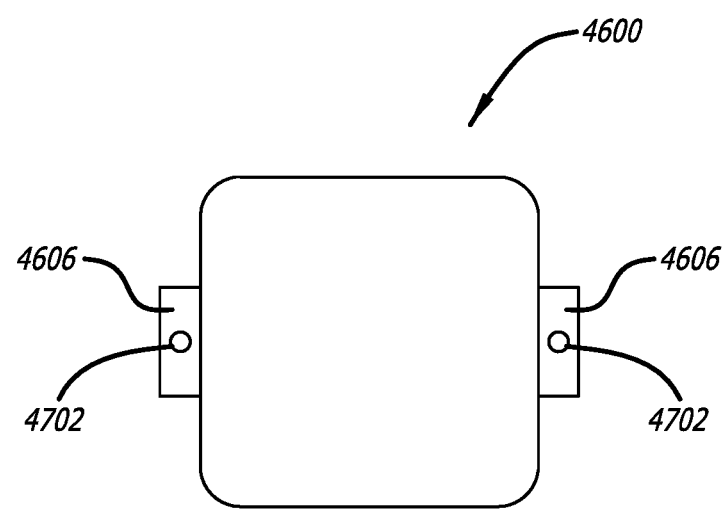
FIG. 47 illustrates a top perspective view of a lockable and releasable projection disposed within a receiver, according to some aspects of the disclosure.

FIGS. 46 and 47 show a projection 4600 for engaging a receiver 4602 including a protrusion 4604 and a depressible button 4606. The protrusion 4604 is secured within the receiver 4602 unless the depressible button 4606 is compressed. As may be appreciated in FIG. 47, a lock pin 4702 may be disposed within the depressible button 4606 to prevent compression of the depressible button 4606. In at least one embodiment, the lock pin 4702 has a non-standard shape (e.g., a pentalobe) to prevent removal except by a user.

Figure 48:
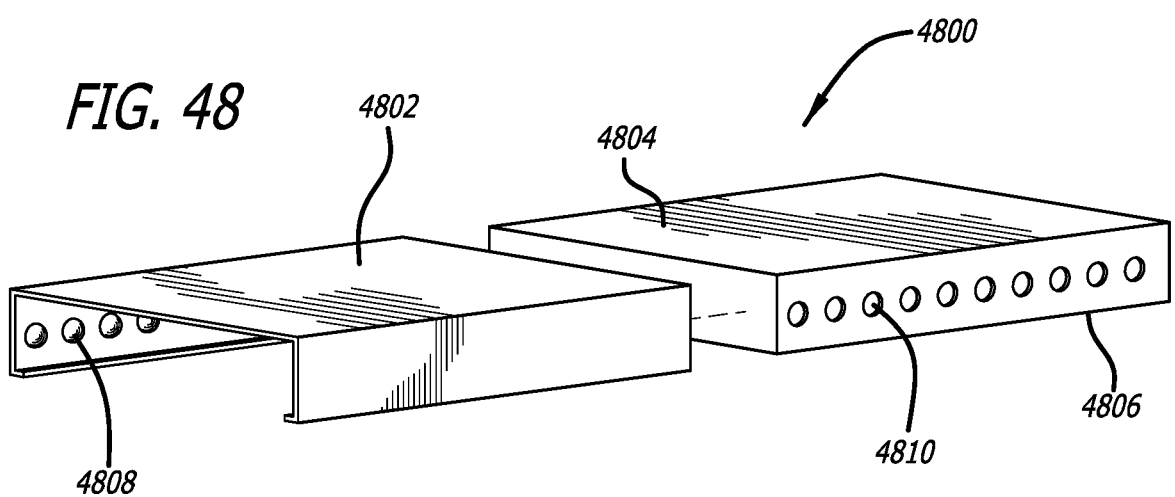
FIG. 48 is an exploded view of a slidable coupling between an accessory cover and a cover, according to some aspects of the disclosure.
Figure 49:
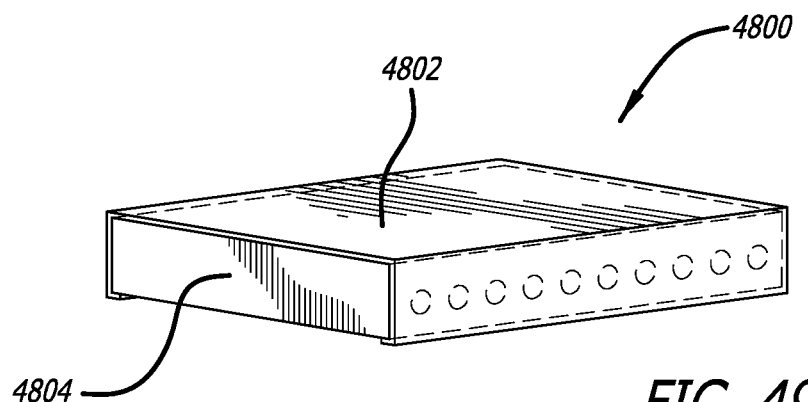
FIG. 49 is an assembled view of a slidable coupling between an accessory cover and a cover, according to some aspects of the disclosure.
Figure 50:
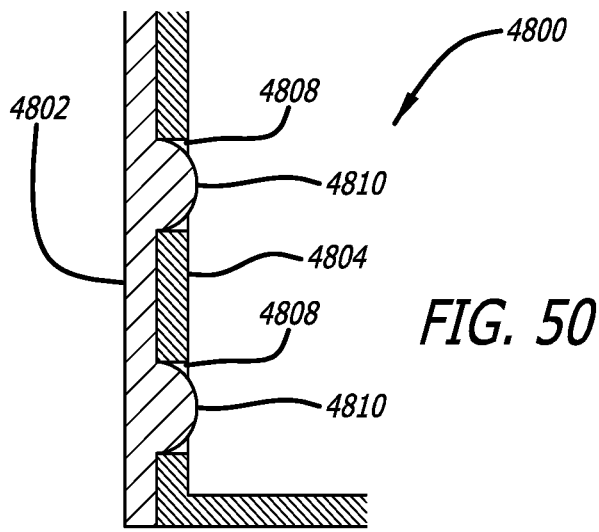
FIG. 50 is a cross-section view of the slidable coupling between an accessory cover and a cover, according to some aspects of the disclosure.

FIGS. 48-50 show an arrangement 4800 including a cover 4802 formed to engage each of receivers 4810 along a perimeter 4806 of a cover body 4804. The cover 4802 may have a plurality of protrusions 4808 disposed along edge and configured to be received in a plurality of receivers 4810 disposed along perimeter 4806 of the cover body 4804. Alternatively, the protrusions 4808 may be disposed along the perimeter 4806 of the cover body and the plurality of receivers 4810 may be disposed along an edge of the cover 4802.

Figure 51:
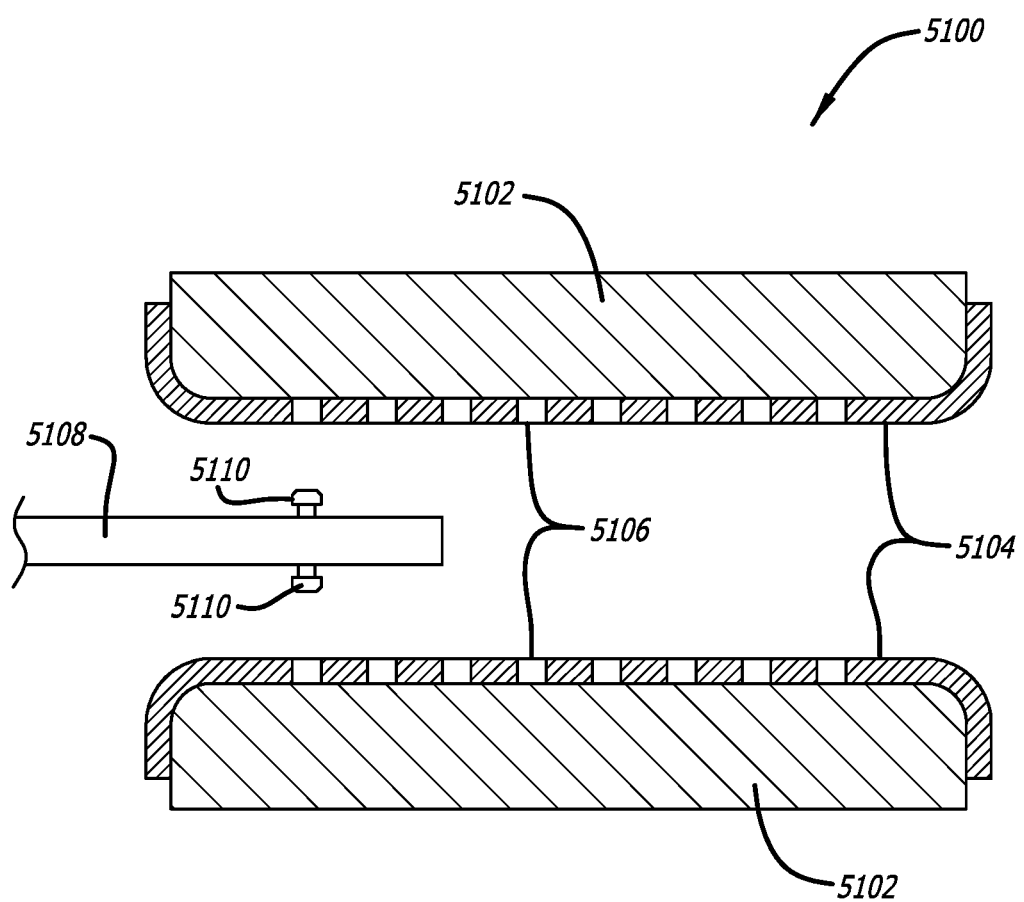
FIG. 51 illustrates an example projection, according to some aspects of the disclosure.

FIG. 51 shows an arrangement 5100 including at least one accessory 5102 having attach covers 5104. The attach covers 5104 include receivers 5106 to engage a plurality of projections 5110 of a latch 5108. The projections 5110 may couple two attach covers 5104, a cover 5104 and an accessory, or two device accessories. In another example, an accessory may include a plurality of receivers. A cover for an electronic device may also have a plurality of receivers. The cover and the accessory are coupled to each other by having a securement device such as a latch, a member or a bar with a plurality of projections on both side facing toward the accessory and cover. The accessory maybe attached or coupled to the securement device via the plurality of projections on the securement device and a plurality of receivers on the accessory. The combined accessory with the securement device may be coupled or attached to the cover via the plurality of receivers on the cover and the plurality of protrusions on the securement device.

Figure 52B:
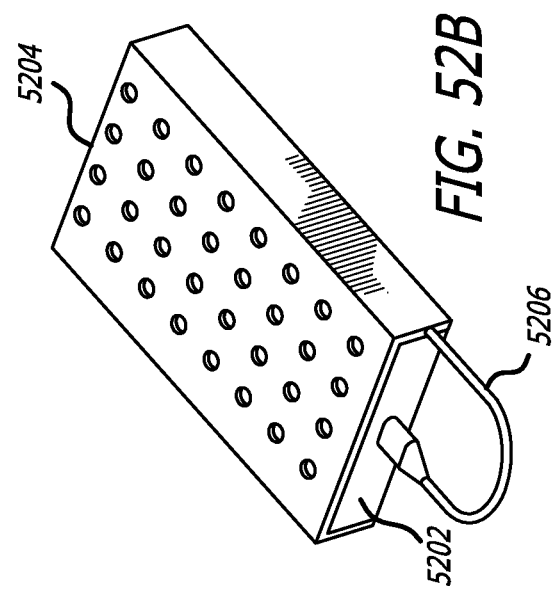
FIGS. 52A and 52B illustrate an example of a cover configured to be mechanically and electrically coupled to a handheld electronic device.
Figure 52A:
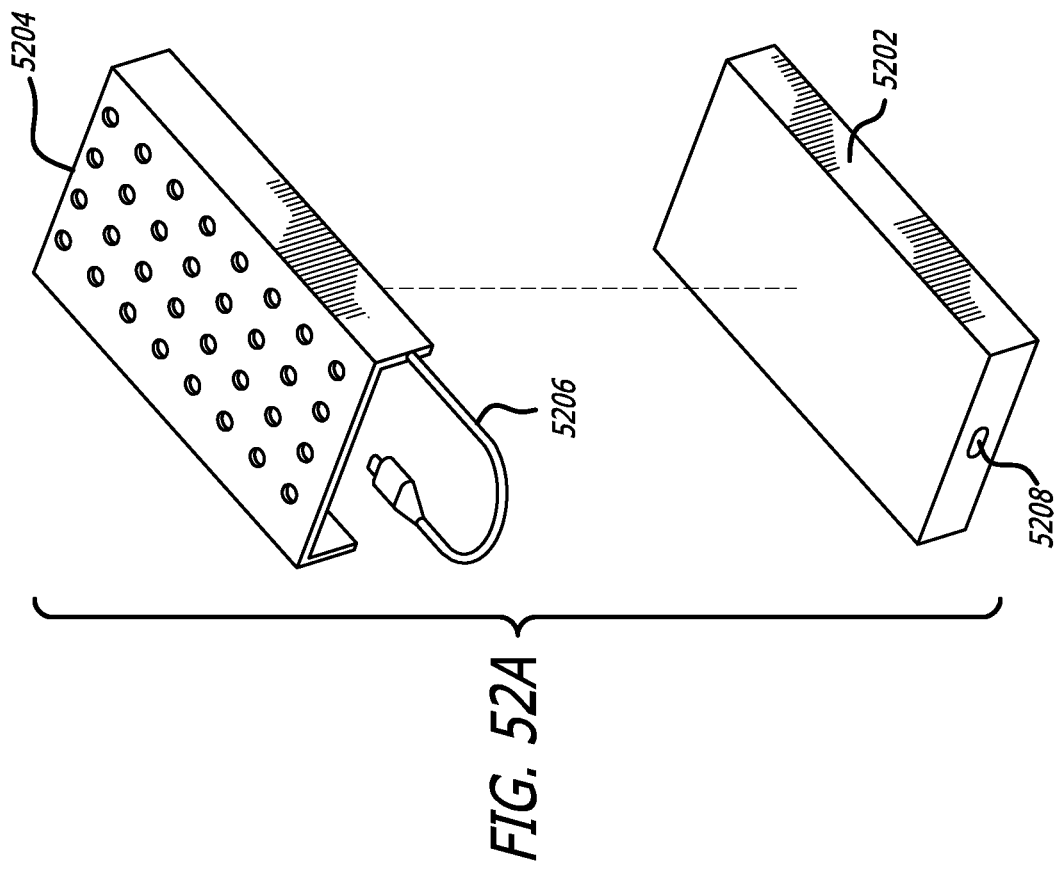

FIGS. 52A and 52B show an example of a cover configured to be mechanically and electrically coupled to a handheld electronic device. As shown in FIG. 52A, the cover 5204 may include cable 5206 that may be connected to a port 5208 such as a USB port or an interface or a bus or an earplug port of an electronic device 5202 to provide power and data to the cover 5204. The cover 5204 may include internal wires that connect to a cable 5206 to one or more receivers on the cover 5204. This may allow the cover 5204 to be electronically coupled to a handheld electronic device accessory that is mechanically coupled to the cover 5204. In turn, the electronic device may communicate with the accessory via the cable connecting the cover and the port on the electronic device 5202.

FIG. 52B shows the cover 5204 mechanically and electrically coupled to the electronic device 5202. As shown, the cable 5206 has been connected to the port 5208 of the handheld electronic device 5202 to provide power and data to the cover 5204.

FIGS. 53A-53C show another example of a cover configured to be mechanically and electrically coupled to a handheld electronic device. As shown in FIG. 53A, the cover 5302 is designed such that the handheld electronic device 5304 may be slid into the cover 5302 to mechanically couple the cover 5302 to the handheld electronic device 5204. Further, the cover 5302 may include a plug 5306 protruding from the inside of the cover 5302. The plug 5306 may be connected to a port 5308 of the handheld electronic device 5304 to electrically couple the cover 5302 to the handheld electronic device 5304. The plug 5306 may be positioned within the cover 5304 such that the plug 5306 is aligned with the port 5308 of the handheld electronic device 5304 when the handheld electronic device 5304 is mechanically coupled to the cover 5302.

FIG. 53B shows a handheld electronic device 5304 partially inserted into a cover 5302. As shown, a plug 5306 is aligned with a port 5308 of the handheld electronic device 5304. As a result, the plug 5306 will be inserted into a port 5308 when the handheld electronic device 5304 is fully inserted into the cover 5302.

FIG. 53C shows a cross section of a handheld electronic device 5304. As shown the handheld electronic device 5304 is partially inserted into a cover 5302. Further, a plug 5306 is aligned with a port 5208 of the handheld electronic device 5304. As a result, the plug 5306 will be inserted into the port 5308 when the handheld electronic device 5304 is fully inserted into the cover 5302.

FIGS. 54A-54C show another example of a cover 5402 configured to be mechanically and electrically coupled to a handheld electronic device 5404. As shown in FIG. 54A, the cover 5402 may include a pogo pin connector 5406. The pogo pin connector 5406 may be connected to a pogo pin port 5408 of the handheld electronic device 5404 to electronically couple the handheld electronic device 5404 to the cover 5402. As shown, the pogo pin connector 5406 may be positioned on the cover 5402 such that the pogo pin connector 5406 is aligned with and connects to the pogo pin port 5408 when the handheld electronic device 5404 is mechanically coupled to the cover 5402.

FIG. 54B shows a handheld electronic device 5404 mechanically and electronically coupled to a cover 5402. As shown, a pogo pin connector 5406 of the cover 5402 is attached to a pogo pin port 5408 of the handheld electronic device 5404, thereby electronically coupling the cover 5402 to the handheld electronic device 5404. This may allow power and data to be passed between the cover 5402 and the handheld electronic device 5404.

FIG. 54C shows a cross section of a handheld electronic device 5404 mechanically and electronically coupled to a cover 5402. As shown, a pogo pin connector 5406 of the cover 5402 is attached to a pogo pin port 5408 of the handheld electronic device 5404, thereby electronically coupling the cover 5402 to the handheld electronic device 5404. The pogo pin port 5408 may be electronically coupled to the receivers of the cover 5402 via the pogo pin connector 5406.

Figure 55B:
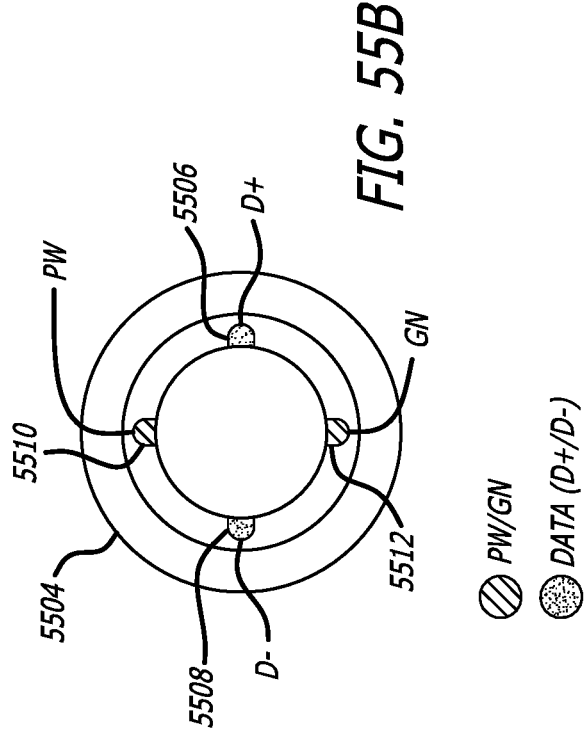
FIGS. 55A and 55B illustrate an example of a cover configured to be mechanically and electrically coupled to an accessory.
Figure 55A:
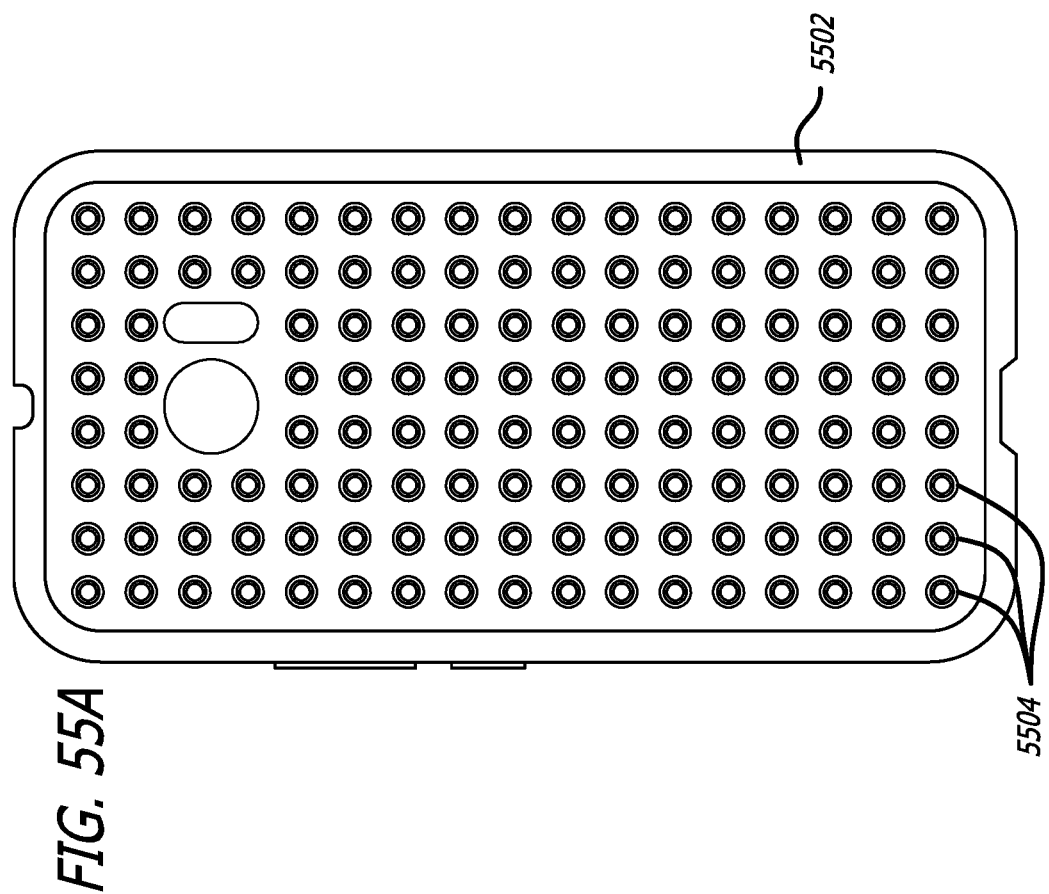

FIGS. 55A and 55B show an example of a cover configured to be mechanically and electrically coupled to an accessory. FIG. 55A shows a cover 5502 that includes a plurality of receivers 5504. Each receiver 5504 may be configured to receive a projection of an accessory, thereby enabling the cover 5502 to be mechanically coupled to the accessory.

Further, one or more of the receivers 5504 may be configured to share power and/or data with an accessory to electronically couple a cover 5502 to the accessory. For example, the cover 5502 may include internal wires that connect a cable or pogo pin connector (as shown in FIGS. 53-55) to one or more receivers 5504. The internal wires may transmit power and/or data received from a handheld electronic device that is electronically coupled to the cove 5502 to connect the receivers 5504. The receivers 5504 may include one or more connector pins that may align with the connector pins on a projection of an accessory. Consequently, the cover 5502 may facilitate the transfer of data and/or power between the accessory and the handheld electronic device, when the cover 5502 is electronically coupled to both the handheld electronic device and the accessory.

FIG. 55B shows one of receivers 5504 configured to be both electronically and mechanically coupled to an accessory. As shown, the receiver 5504 includes four connector pins 5506, 5508, 5510 and 5512. As shown, the connector pins 5506 and 5508 carry the differential data signal, with the connector pin 5506 carrying the data+ signal and the connector pin 5508 carrying the data– signal. The connector pins 5510 and 5512 carry the power current, with the connector pin 5510 carrying the power-supply and the connector pin 5512 providing a ground. The connector pins 5510 and 5512 may be positioned or placed on the recess wall 1004 or an engagement surface 1108 as in FIG. 10 and FIG. 11. The connector pins may be electrodes that may be used to conduct data signal or power. The projection as described in FIG. 11 or FIG. 10 may also have corresponding electrodes to connect to the connector pins 5510 and 5512. The electrode on the projection may be placed or positioned at the protrusion or an elongate part of the protrusion of the projection as described in FIG. 11 or 10.

A projection of an accessory may include corresponding connector pins that allow the accessory to be electronically coupled to a cover 5502. For example, a projection of the accessory may include connector pins positioned to connect with two or more of connector pins 5506, 5508, 5510 and 5512 when the accessory is mechanically coupled to the cover 5502. The projection of the accessory may include just two connector pins to carry either the power current or data differential signal. Alternatively, the projection of the accessory may include four pins to carry both the power current and the differential data signal.

Figure 56D:
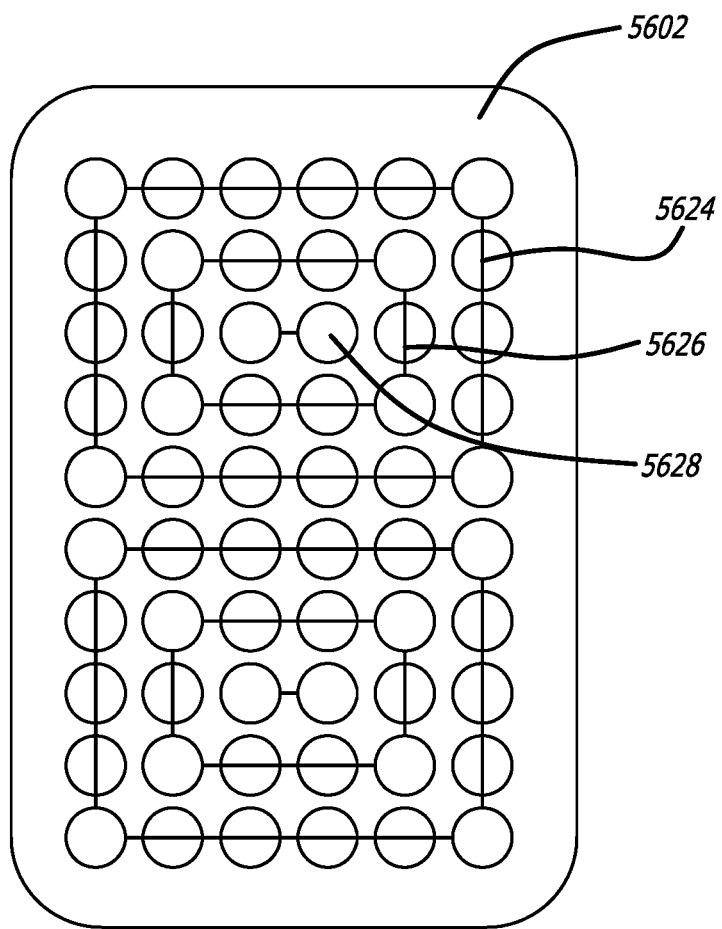

FIGS. 56A-56D show another example of a cover configured to be mechanically and electrically coupled to an accessory. FIG. 56A shows a cover 5602 that includes first receivers 5604 configured to carry a power current and second receivers 5606 configured to carry a differential data signal. Accordingly, an accessory must be electrically coupled to at least one of the first receivers 5604 and one of the second receives 5606 to share both power and data. An accessory may, however, be electrically coupled to only one of either the first receivers 5604 or the second receivers 5606 to share either power or data, respectively. Further, while a specific configuration of the first receivers 5604 and the second receivers 5606 is presented, this is only one example configuration and it should be readily apparent that any of a number of alternative configurations including the first receivers 5604 and/or the second receivers 5606 may be used.

FIG. 56B shows one of the first receivers 5604. As shown, the first receiver 5604 includes four connector pins 5608, 5610, 5612 and 5614. The connector pins 5608 and 5610 carry the power current and the connector pins 5612 and 5614 provide the ground. In this type of configuration, a projection of an accessory must include at least two connector pins to be electrically coupled to the cover 5602 via the first receiver 5604. For example, the accessory would have to have at least a first connector pin connected to one of the connector pins 5608 or 5610 and a second connector pin connected to one of the connector pins 5612 or 5614.

FIG. 56C shows one of the second receivers 5606. As shown, the second receiver 5606 includes four connector pins 5616, 5618, 5620 and 5622. The connector pins 5618 and 5620 may carry the data+ signal and the connector pins 5616 and 5622 may carry the data− signal. In this type of configuration, a projection of an accessory must include at least two connector pins to be electrically coupled to the cover 5602 via the second receiver 5606. For example, the accessory would have to have at least a first connector pin connected to one of the connector pins 5618 or 5620 and a second connector pin connected to one of the connector pins 5616 or 5622.

FIG. 56D shows another configuration of a cover 5602. The cover 5602 may include a configuration of receivers to each provide a different function. For example, the receivers 5624 may provide power, the receivers 5626 may provide data and receivers 5628 may provide a ground. As shown, the configuration may be mirrored between the bottom and top half of the cover 5602. This may allow two or more accessories to be easily electrically coupled to the cover 5602.

Figure 57A:
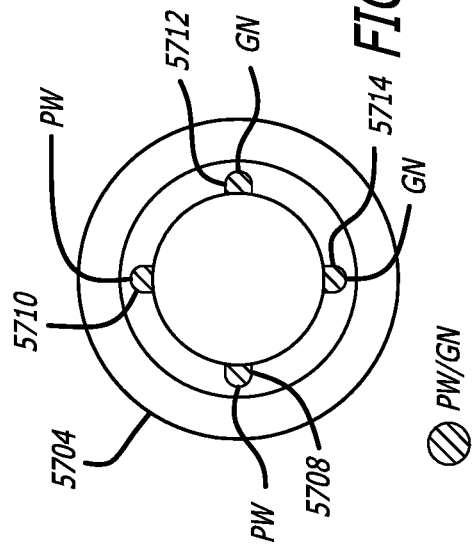
FIGS. 57A-57C illustrate another example of a cover configured to be mechanically and electrically coupled to an accessory.
Figure 57B:
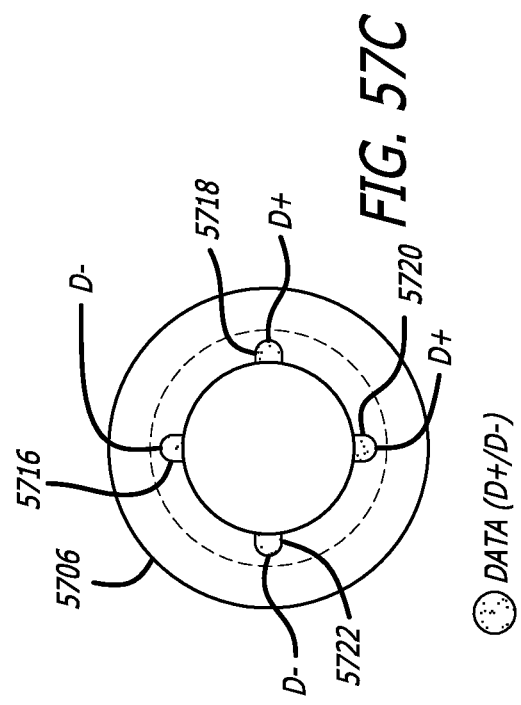
Figure 57C:
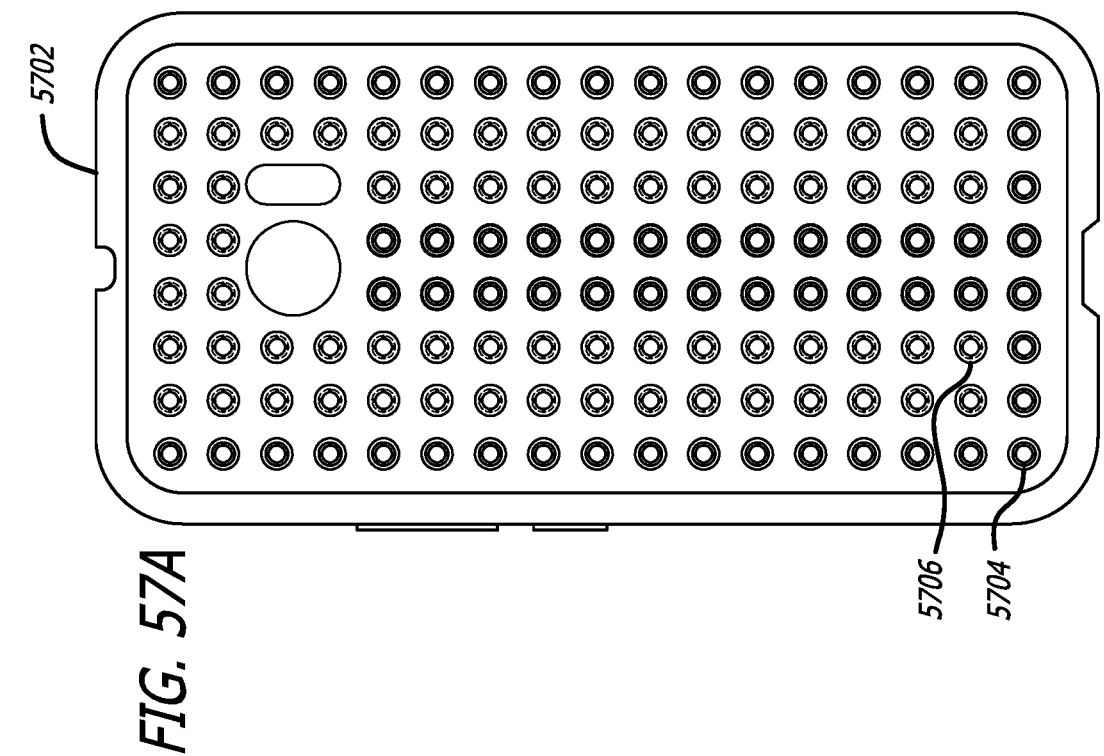

FIGS. 57A-57C show another example of a cover configured to be mechanically and electrically coupled to an accessory. As shown in FIG. 57A, the cover 5702 may include the first receivers 5704 configured to carry a power current and the second receivers 5706 configured to carry a differential data signal. Accordingly, an accessory must be electrically coupled to at least one of the first receivers 5704 and one of the second receives 5706 to share both power and data. An accessory can, however, be electrically coupled to only one of either the first receivers 5704 or the second receivers 5706 to share either power or data, respectively. Further, while a specific configuration of the first receivers 5704 and the second receivers 5706 is presented, this is only one example configuration and it should be readily apparent that any of a number of alternative configurations including the first receivers 5704 and/or the second receivers 5706 may be used without departing from the scope of the subject technology.

FIG. 57B shows one of the first receivers 5704. As shown, the first receiver 5704 includes four connector pins 5708, 5710, 5712 and 5714. The connector pins 5708 and 5710 carry the power current and connector pins 5712 and 5714 provide the ground. In this type of configuration, a projection of an accessory must include at least two connector pins to be electrically coupled to the cover 5702 via the first receiver 5704. For example, the accessory would have to have at least a first connector pin connected to one of the connector pins 5708 or 5710 and a second connector pin connected to one of the connector pins 5712 or 5714.

FIG. 57C shows one of receivers 5706. As shown, the second receiver 5706 includes four connector pins 5716, 5718, 5720 and 5722. The connector pins 5718 and 5720 may carry the data+ signal (e.g., D+), whereas the connector pins 5716 and 5722 may carry the data− signal (e.g., D−). In this type of configuration, a projection of an accessory must include at least two connector pins to be electrically coupled to the cover 5702 via the second receiver 5706. For example, the accessory would have to have at least a first connector pin connected to one of the connector pins 5718 or 5720 and a second connector pin connected to one of the connector pins 5716 or 5722.

Figure 58:
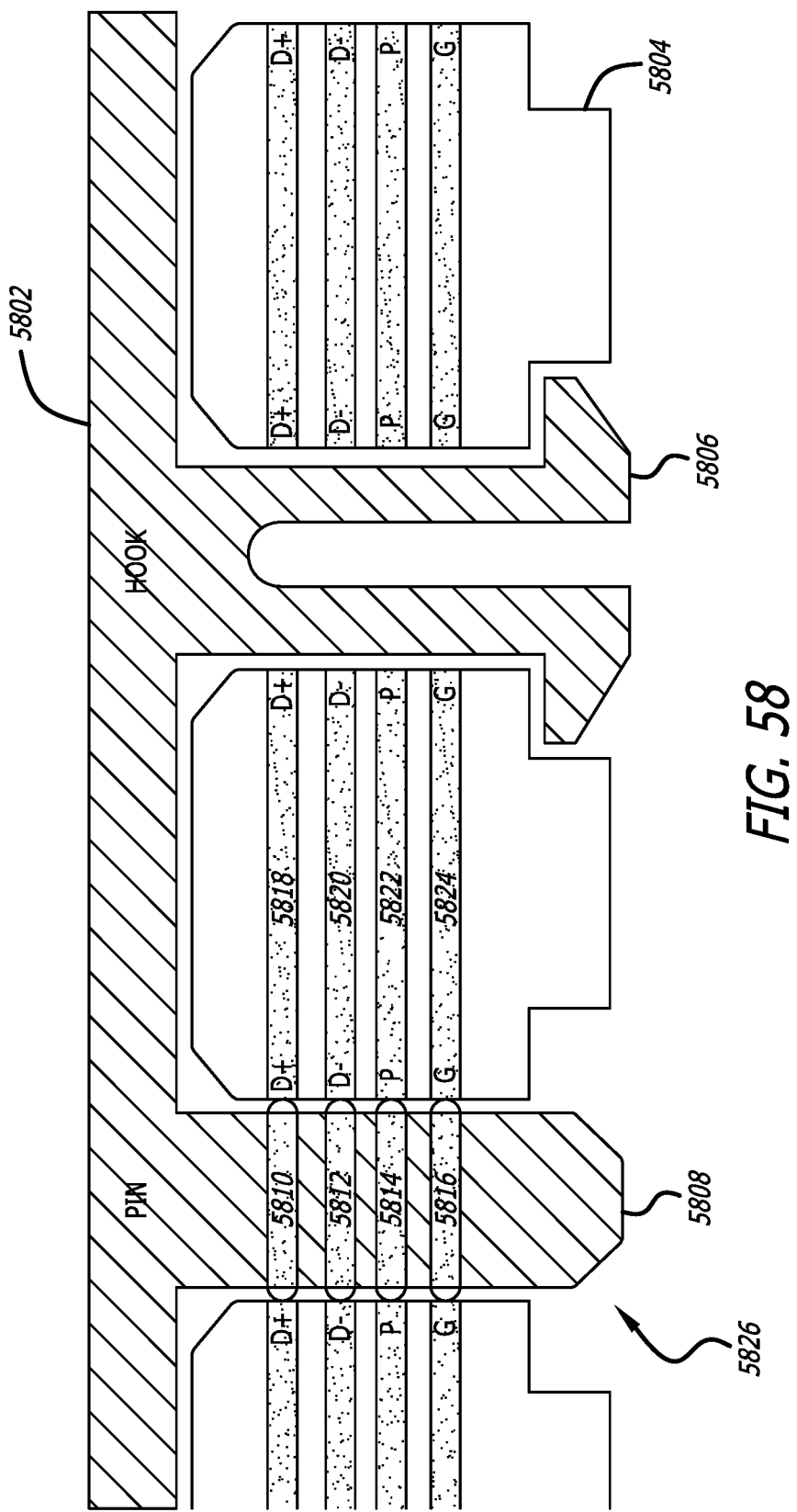
FIG. 58 illustrates a cross section of an accessory mechanically and electrically coupled to a cover.

FIG. 58 shows a cross section of an accessory mechanically and electrically coupled to a cover. As shown, the accessory 5802 includes a first projection 5808 and a second projection 5806. The second projection 5806 includes a hooked end to mechanically couple the accessory 5802 to the cover 5804. In contrast, the first projection 5808 does not include a hooked end, but does include connector pins 5810, 5812, 5814 and 5816 to electronically couple the accessory 5802 to the cover 5804. As shown, each of connector pins 5810, 5812, 5814 and 5816 align with one of the connector pins 5818, 5820, 5822 and 5824 of the cover 5804 when the first projection 5808 is fully inserted into a receiver 5826.

Figure 59:
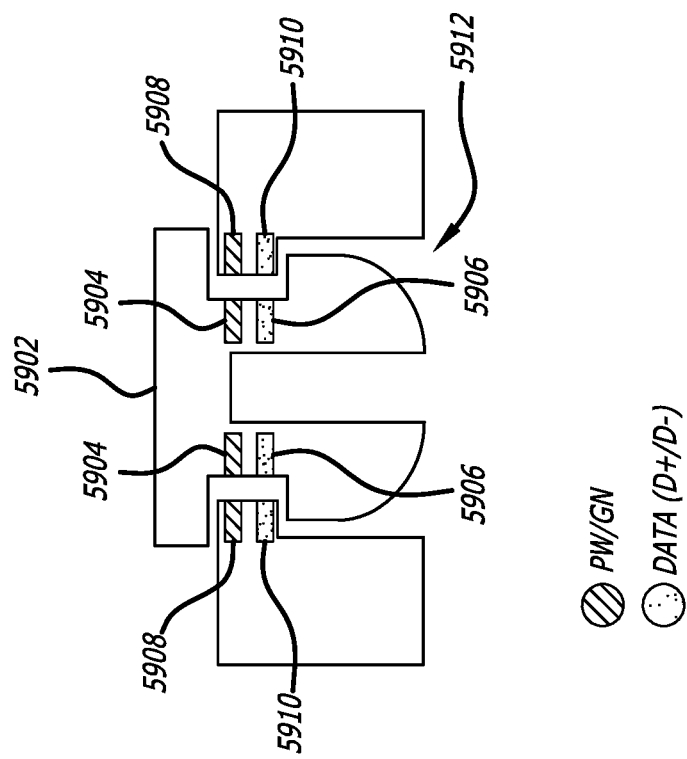
FIG. 59 illustrates a cross section of another example of an accessory mechanically and electronically coupled to a cover.

FIG. 59 shows a cross section of another example of an accessory mechanically and electronically coupled to a handheld electronic device cover. As show, a projection 5902 includes a hooked end to mechanically couple an accessory to a handheld electronic device cover. The projection 5902 further includes connector pins 5904 and 5906 to electrically couple the accessory to a handheld electronic device cover. As shown, the connector pins 5904 and 5906 align with the connector pins 5908 and 5910 when the projection 5902 is fully inserted into a receiver 5912.

Figure 60:
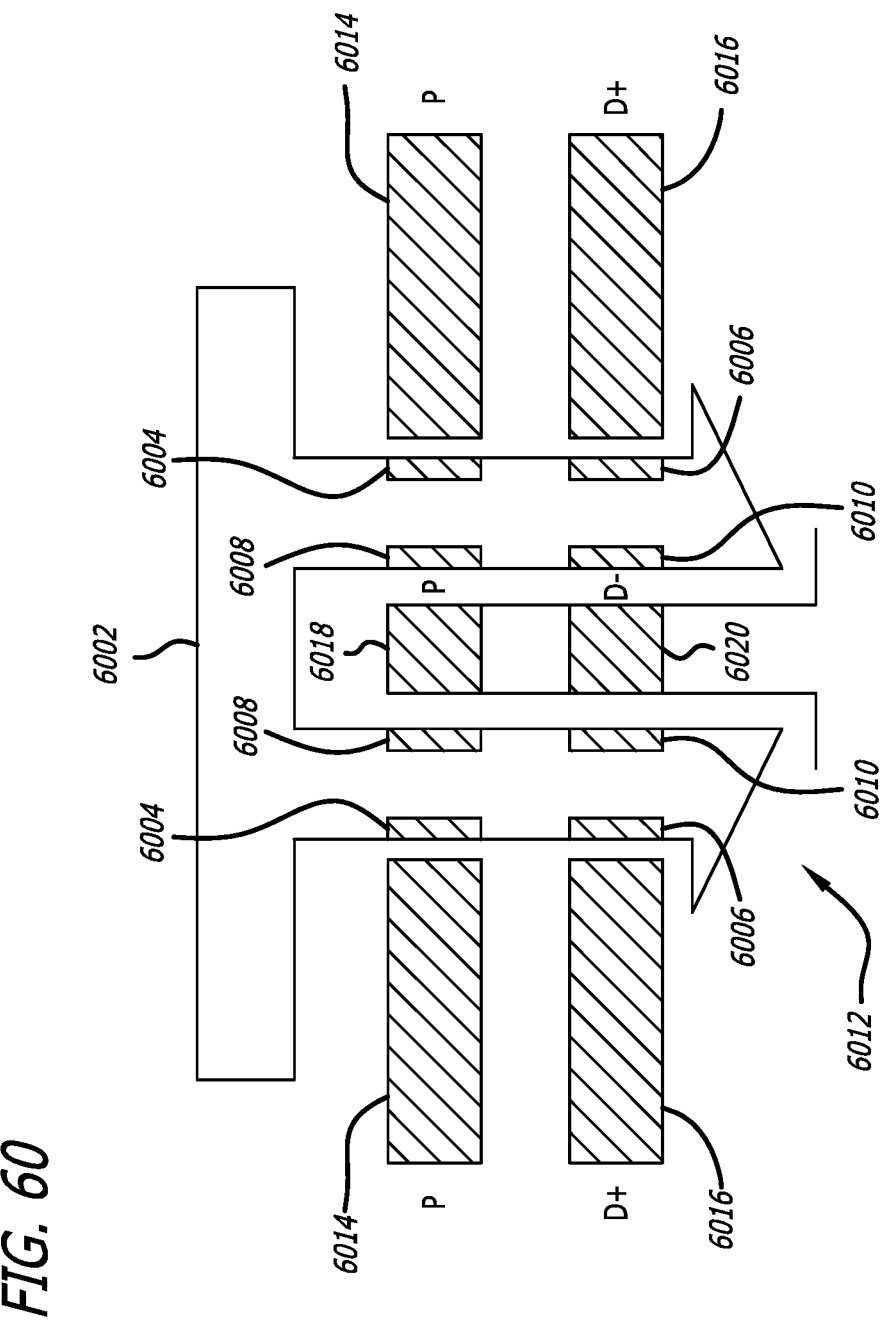
FIG. 60 illustrates a cross section of another example of an accessory mechanically and electronically coupled to a cover.

FIG. 60 shows a cross section of another example of an accessory mechanically and electronically coupled to a cover. As shown, a projection 6002 includes a hooked end to mechanically couple the accessory to the cover. The projection 6002 further includes connector pins 6004, 6006, 6008 and 6010 to electrically couple the accessory to the cover. As shown, the connector pins 6004 and 6006 are positioned on the outside of the projection 6002 and the connector pins 6008 and 6010 are positioned on the inside of the projection 6002. A receiver 6012 includes connector pins 6014 and 6016 positioned on an outer edge of the receiver 6012 to align with the connector pins 6004 and 6006, respectively, when the projection 6002 is fully inserted into the receiver 6012.

The receiver 6012 further includes connector pins 6018 and 6020 positioned on an inside post of the receiver 6012. The connector pins 6018 and 6020 may be positioned to align with the connector pins 6008 and 6010, respectively, when the projection 6002 is fully inserted into the receiver 6012.

Figure 61:
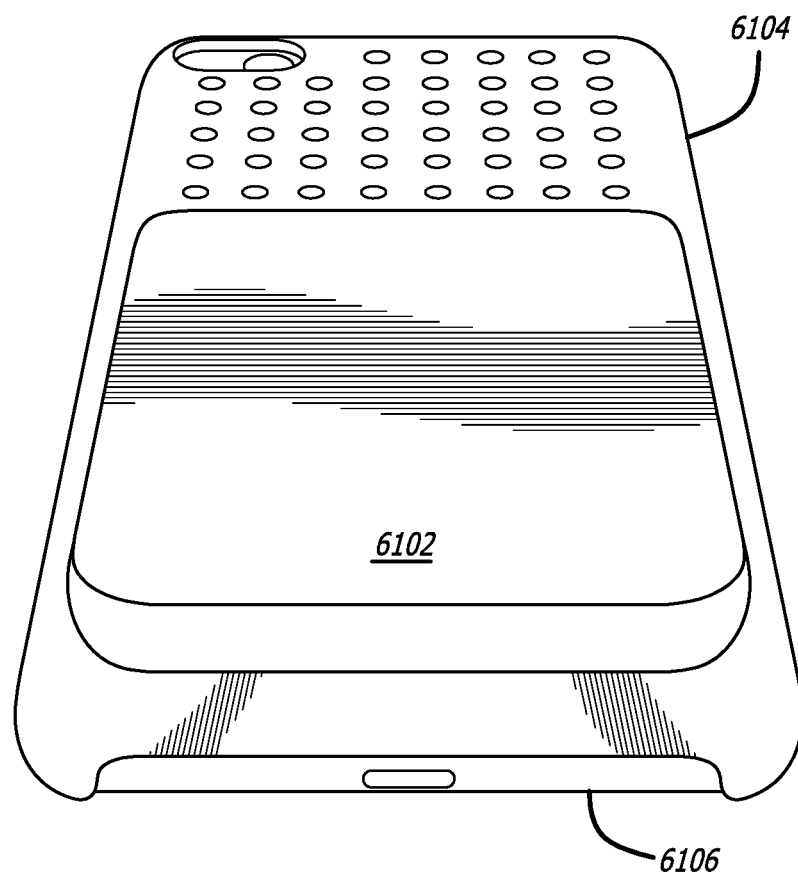
FIG. 61 illustrates an accessory mechanically and electrically coupled to a cover.

FIG. 61 shows an accessory mechanically and electrically coupled to a cover. As shown, the accessory 6102 is mechanically and electrically coupled to the cover 6104. The cover 6104 may also be mechanically and electrically coupled to the handheld electronic device 6106. Consequently, the cover 6104 may facilitate the transfer of data and/or power between the accessory 6102 and the handheld electronic device 6106. As shown, the cover 6104 is an external battery that may provide additional battery life to the handheld electronic device 6106.

Figure 62A:
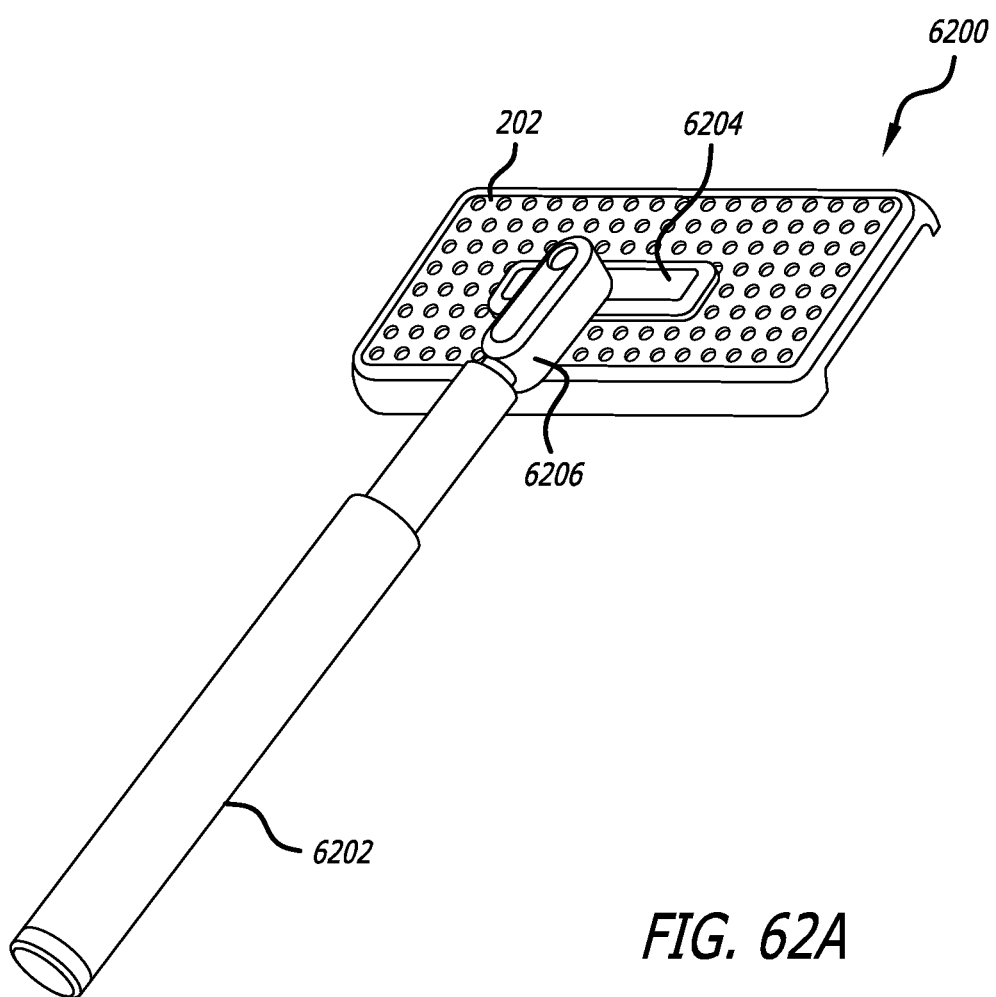
FIG. 62A-62C illustrate an example of a selfie stick accessory configured for coupling with a handheld electronic device cover, according to some aspects of the present disclosure.

FIG. 62A shows a selfie stick accessory assembly 6200. The selfie stick accessory assembly 6200 includes a selfie stick accessory 6202 mounted to a cover body 202. The selfie stick accessory 6202 may have a mounting portion 6204 configured to engage the cover. The mounting portion 6204 may include a pivotal joint 6206 configured to allow adjustment of the angle and orientation of the cover body 202 relative to the selfie stick accessory 6202.

Figure 62B:
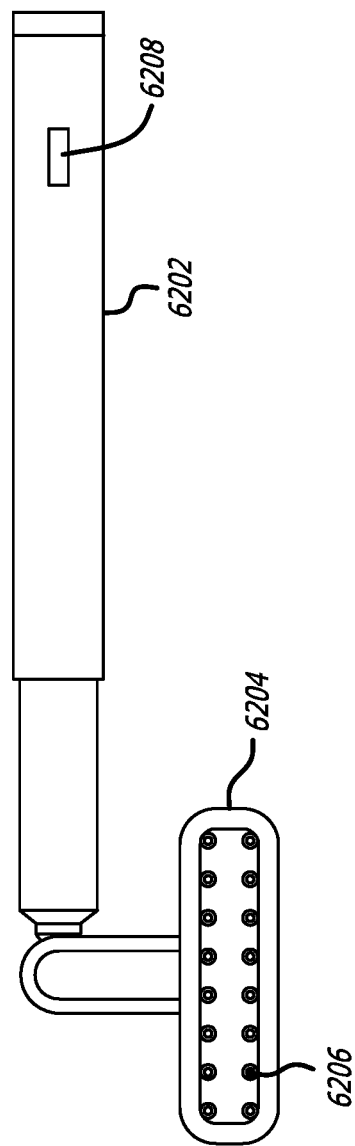

FIG. 62B shows a selfie stick accessory 6202. A mounting portion 6204 may include projections 6206 capable of coupling with and engaging a cover. The projections 6206 may be received in one or more receivers disposed on, a cover body thereby mechanically and electrically couple to the selfie stick accessory 6202 with the cover body. The selfie stick accessory 6202 may further include a button 6208 configured to operate one or more functions (e.g., camera) of an electronic device disposed within the cover body. In other embodiments, the selfie stick accessory 6202 may only mechanically couple with the cover body and implement wireless coupling (e.g., Bluetooth) to operate one or more functions of an electronic device.

Figure 62C:
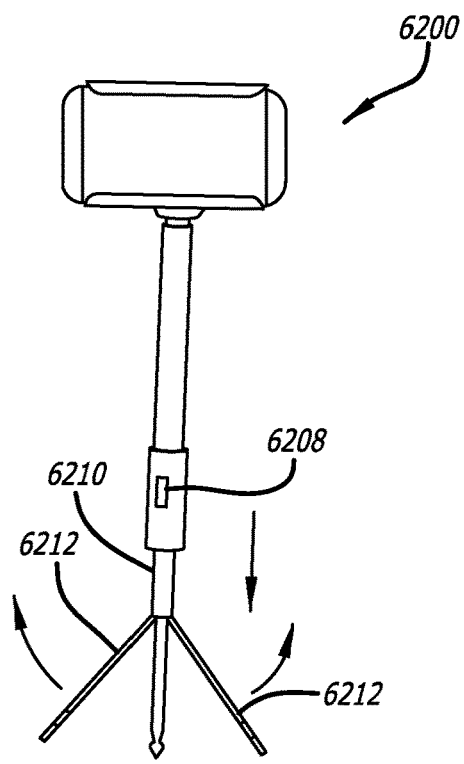

FIG. 62C shows a selfie stick accessory assembly 6200 having a sliding base 6210 having a tri-pod disposed therein. The tri-pod may have three base legs 6212 biased to expand upon transitioning of the sliding base 6210 toward a cover body. Transitioning sliding base 6210 away from the cover body retracts the base legs 6212, thus allowing the sliding base 6210 to be disposed over and/or around the base legs 6212 for storage.

Figure 63:
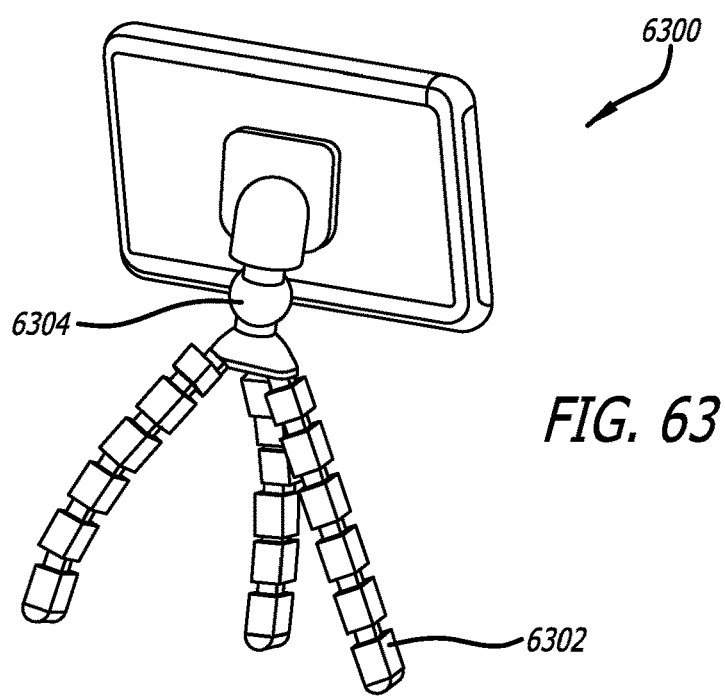
FIG. 63 illustrates an example cover coupled with an octopus grip, according to some aspects of the present disclosure.

FIG. 63 shows an octopus grip accessory 6300. The octopus grip accessory 6300 may provide three base legs 6302, each having individual adjustability. Base legs 6302 may be positioned as a traditional tri-pod, or used to couple the device accessory by wrapping around a beam or tubular support, hanging from a ceiling, or hook. The base legs 6302 may also be adjusted to adjust angle, orientation, or position of the cover body relative to a user. The octopus grip accessory 6300 may also include a ball joint 6304 to provide further adjustability with respect to the cover body.

Figure 64:
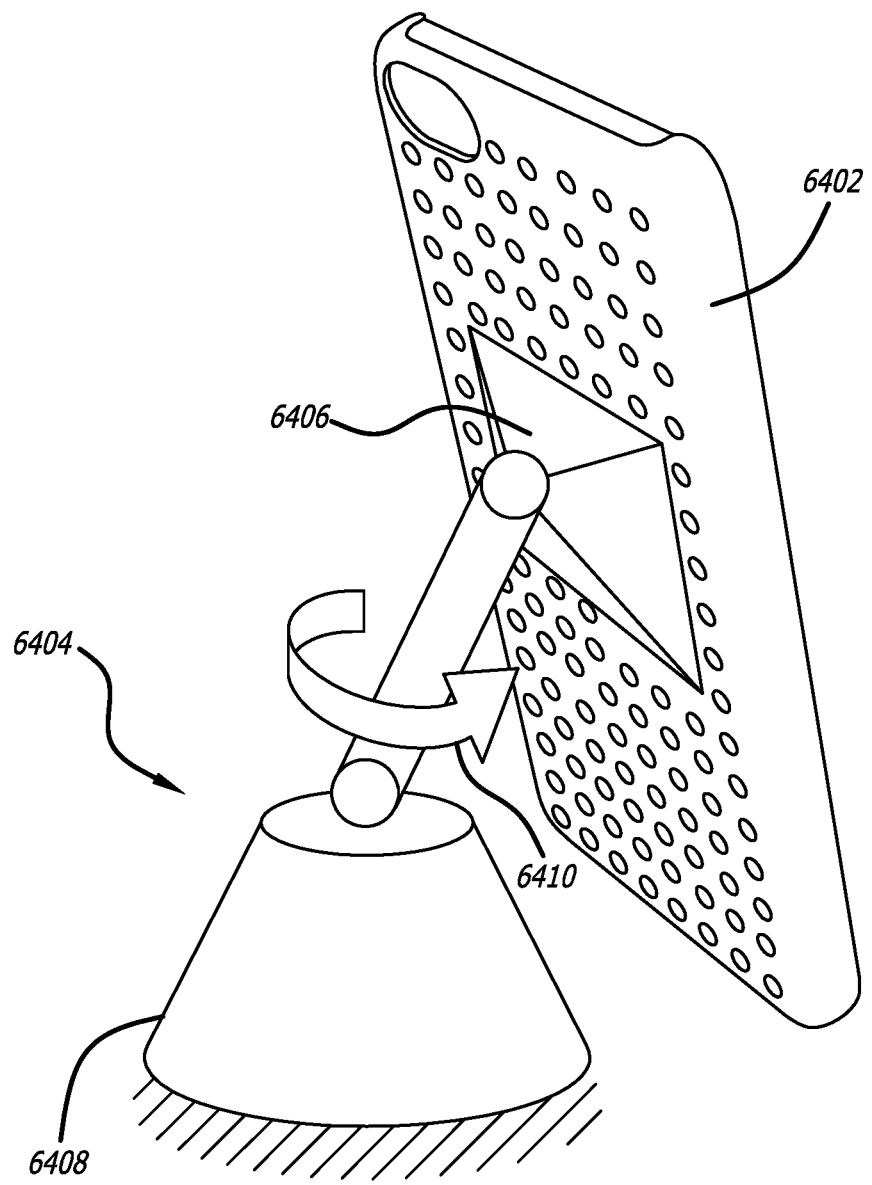
FIG. 64 illustrates an automobile attachment stand configured to be mechanically and electrically coupled to a cover.

FIG. 64 shows an automobile attachment stand configured to be mechanically and electrically coupled to a handheld electronic device cover. As shown, the cover 6402 is mechanically coupled to an automobile attachment stand 6404. The automobile attachment stand 6404 may include attachment element 6406, which may include one or more attachment members to mechanically and electrically couple to the receiver of the cover 6402.

The automobile attachment stand 6404 may connect the cover 6402 to the base 6408 via an arm 6410. As shown, the arm 6410 may allow the positioning of the cover 6402 to be adjusted. Further, the automobile attachment stand 6404 may be coupled to a user's automobile to share data and power with a handheld electronic device mechanically and electrically coupled to the automobile attachment stand 6404.

Figure 65A:
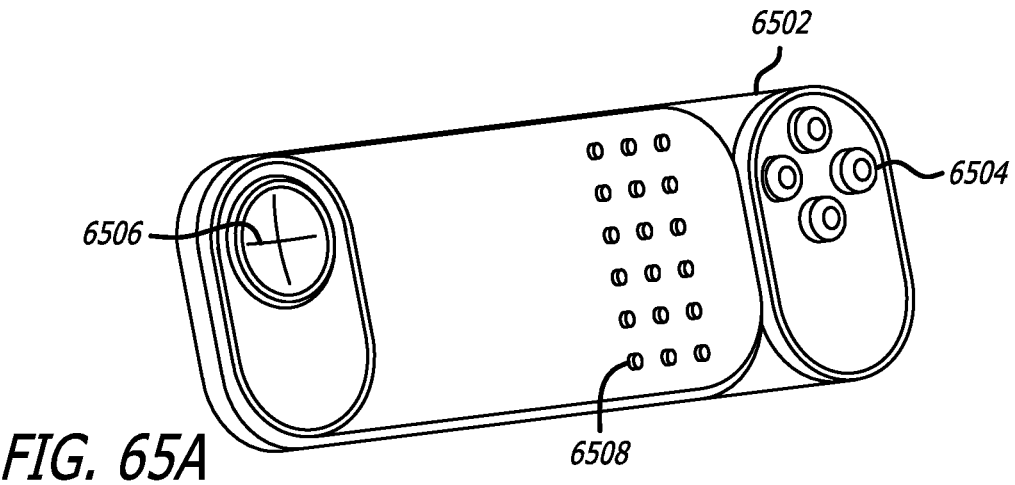
FIGS. 65A-65C illustrate an accessory controller configured to be mechanically and electrically coupled to a handheld electronic device cover.
Figure 65B:
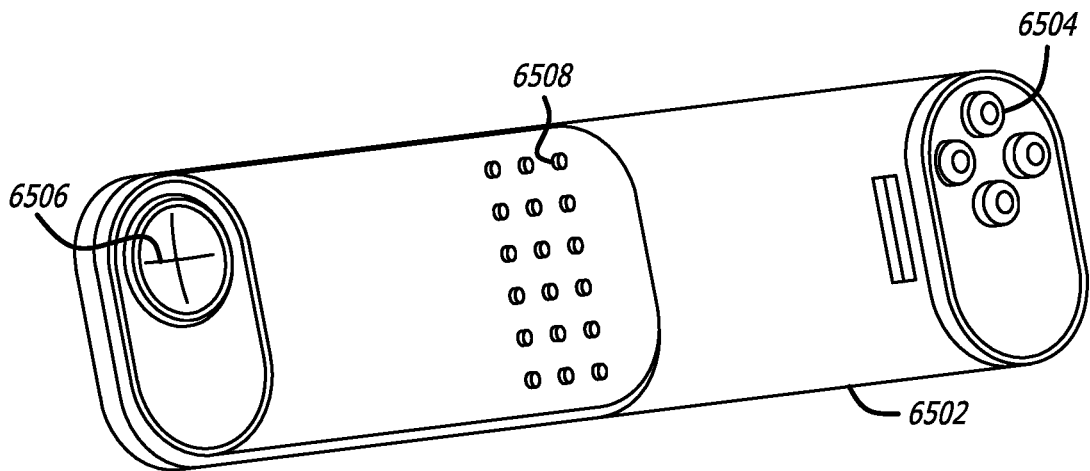
Figure 65C:
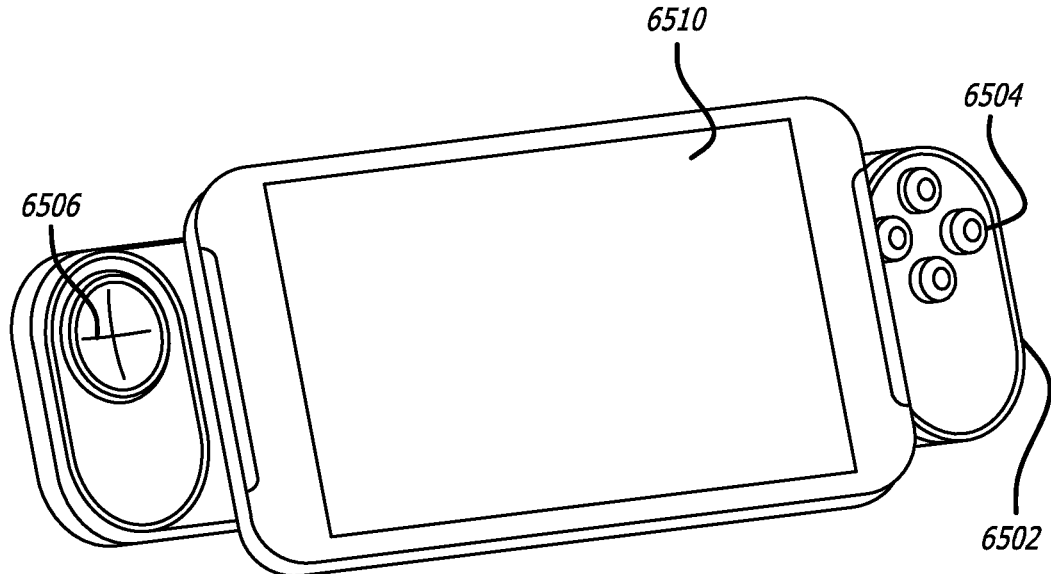

FIGS. 65A-65C show an accessory controller configured to be mechanically and/or electrically coupled to a handheld electronic device cover. As shown in FIG. 65A, the accessory controller 6502 (such as a game controller) may include a directional controller 6506 and buttons 6504. The controller 6506 and the buttons 6504 may be configured to cause or trigger specified commands to be performed on a handheld electronic device when electrically or wirelessly coupled to the handheld electronic device as described in FIG. 55A to FIG. 60. Further, the accessory controller 6502 may include attach members 6502 that enable the accessory controller 6502 to be mechanically and/or electrically coupled to a handheld electronic device cover. As shown in FIG. 65B, the accessory controller 6502 may be expandable. This may allow the accessory controller 6502 to be adjusted to properly fit a user's preference when using the buttons 6504 and the controller 6506, as well as to allow the accessory controller 6502 to work with varying sizes and models of the handheld electronic devices. The accessory controller may further include a wireless module/device to wirelessly communicate with a wireless module/device in the electronic device. The data and commands may be wirelessly transmitted from the controller to the electronic device.

Figure 66:
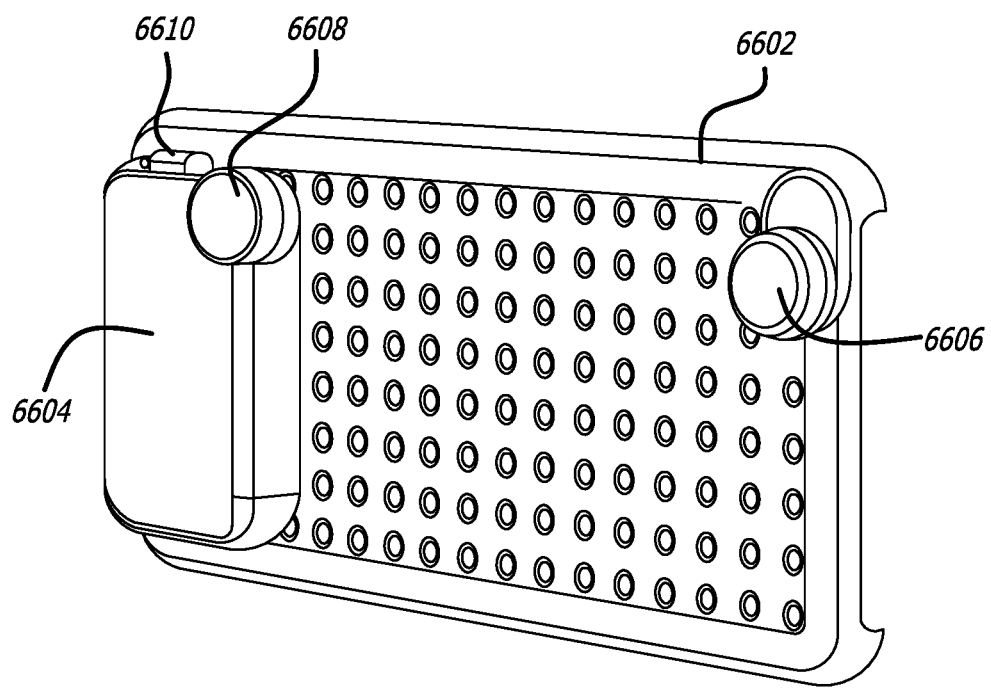
FIG. 66 illustrates an accessory camera controller mechanically and electrically coupled to a cover.

FIG. 66 shows a camera controller mechanically and/or electrically coupled to a handheld electronic device cover. As shown, the camera controller 6604 is mechanically and/or electronically coupled to the cover 6602. This may allow data and power to be shared between the camera controller 6604 and the handheld electronic device that is electrically coupled to the cover 6602 as described in FIG. 55A to FIG. 60. The camera controller 6604 may include scroll wheel 6608 that may be configured to control a zoom of the camera of a handheld electronic device. Further, the camera controller 6604 may include a button 6610 configured to cause a camera of the handheld electronic device to snap a picture. Finally, an external lens 6606 may be mechanically coupled to the cover 6602 to enhance the camera lens of a handheld electronic device. For example, external lens 6606 may be coupled to the cover 6602 to be aligned with the camera lens of the handheld electronic device. The camera controller 6604 may further include a wireless module/device to wirelessly communicate with a wireless module/device in the electronic device. The data and commands from a button, a roller, or a shutter controller may be wirelessly transmitted from the camera controller to the electronic device via the wireless module/device in the electronic device to the wireless module in the camera controller.

Figure 67A:
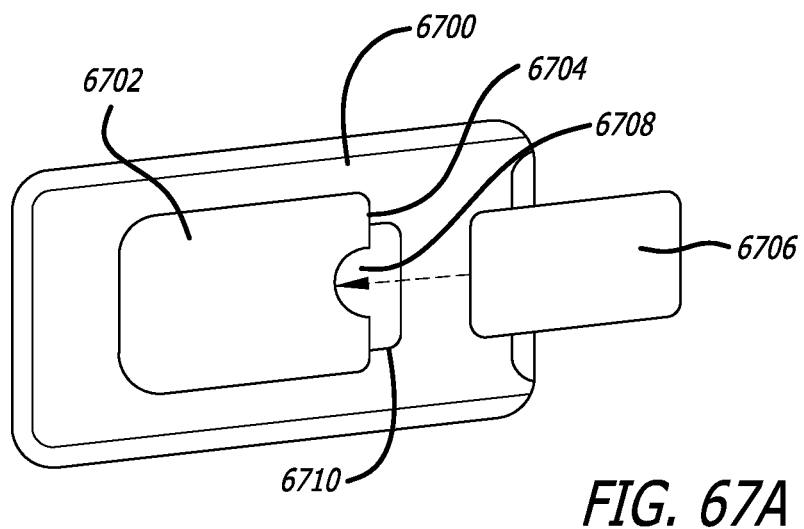
FIGS. 67A and 67B illustrate an accessory card keeper configured to be coupled with a cover.
Figure 67B:
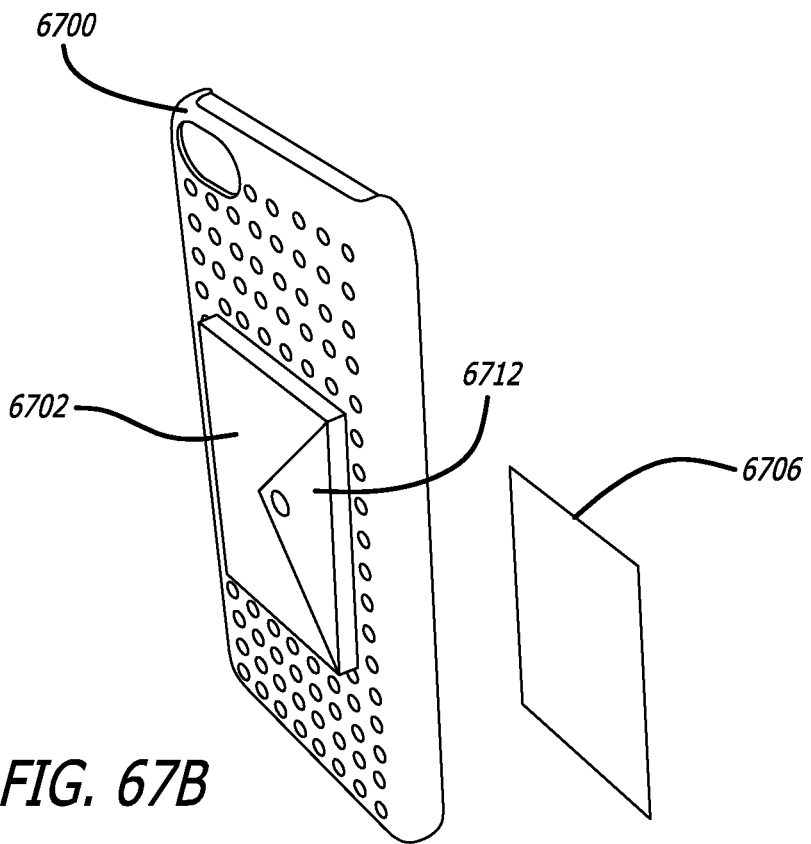

FIGS. 67A and 67B illustrate an example embodiment of a cover 6700 coupled with a card holder 6702. The card holder 6702 has an entry slot 6704 to receive the one or more cards 6706 into a receiving space 6708. The card holder 6702 may be configured to removably receive one or more objects (e.g., cards 6706) including, but not limited to, drivers licenses, identification cards, credit cards, and/or hotel keys, etc. The card holder 6702 may have a tension member 6710 disposed within the receiving space 6708 to secure the one or more cards 6706 within the card holder 6702. In at least one embodiment, the tension member 6710 may be a tongue configured to displace as cards 6706 are received within the receiving space 6708. In other embodiments, the tension member 6710 may be a spring biased element, a high friction surface, or any combination thereof. As may be appreciated in FIG. 67B, the card holder 6702 may have a tension lid 6712 configured to cover the entry slot 6704 and secure cards 6706 within the receiving space 6708. As may further be appreciated in FIG. 67B, the card holder 6702 may receive coins, jewelry, or any other article smaller than the receiving space 6708.

Figures 68A, 68B:
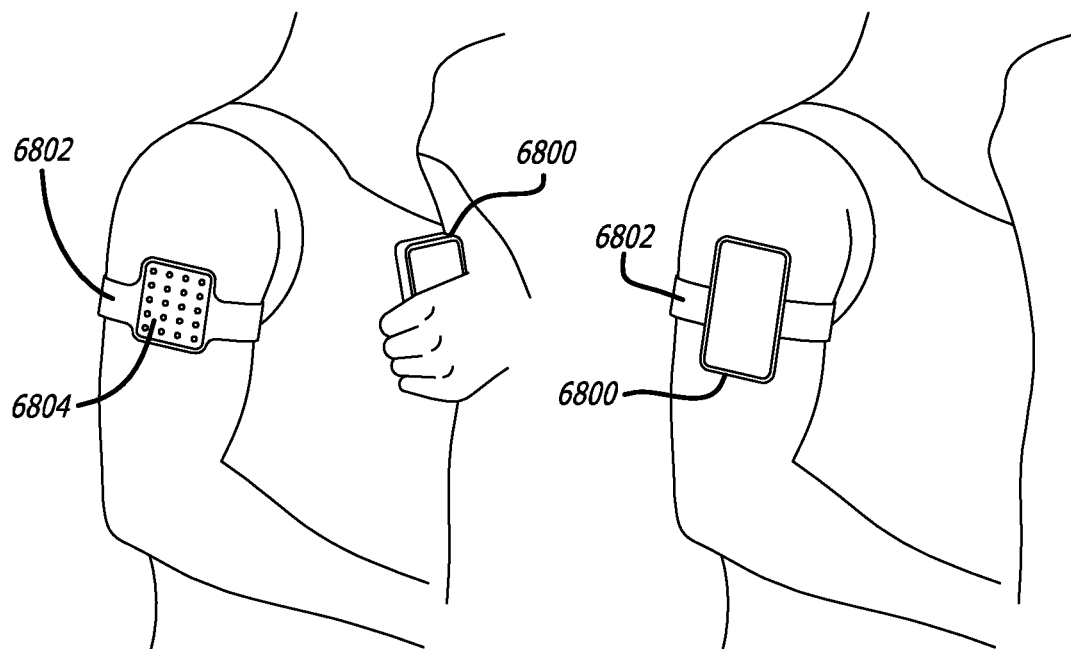
FIGS. 68A and 68B illustrate an accessory arm band configured to be coupled with a cover.

FIGS. 68A and 68B illustrates an example embodiment of a cover 6800 coupled with an arm strap 6802. The arm strap 6802 may have a coupling portion 6804 configured to receive and engage with the cover 6800. The arm strap 6802 may be an elastic material to provide compressive fit around a user's arm, or may include a hook and loop fastener strap to allow adjustment by an individual user. In other embodiments, the arm strap 6802 may have a slide tensioner configured to adjust the size to a predetermined size.

Figures 69A, 69B:
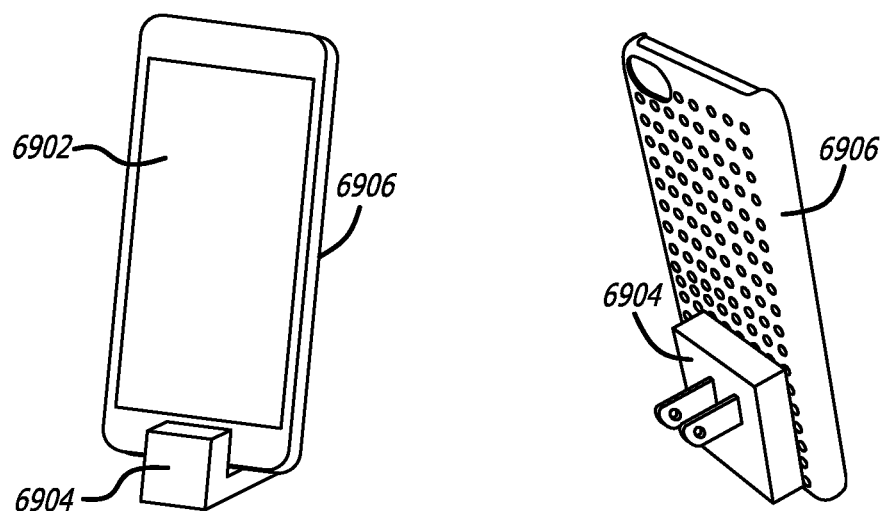
FIGS. 69A and 69B illustrate an accessory electrical charger mechanically and electrically coupled to a cover.

FIGS. 69A and 69B illustrate an accessory electrical charger mechanically and electrically coupled to a handheld electronic device cover. FIG. 69A shows a front view of a handheld electronic device 6902 mechanically and electrically coupled to an electrical charger 6904 via the cover 6906. FIG. 69B shows a back view of the handheld electronic device 6902 mechanically and electrically coupled to the electrical charger 6904 via the cover 6906. As shown, the electrical charger 6904 includes electrical prongs to enable the electrical charger 6904 to be plugged directly into a power outlet to charge the handheld electronic device 6902.

Figure 70:
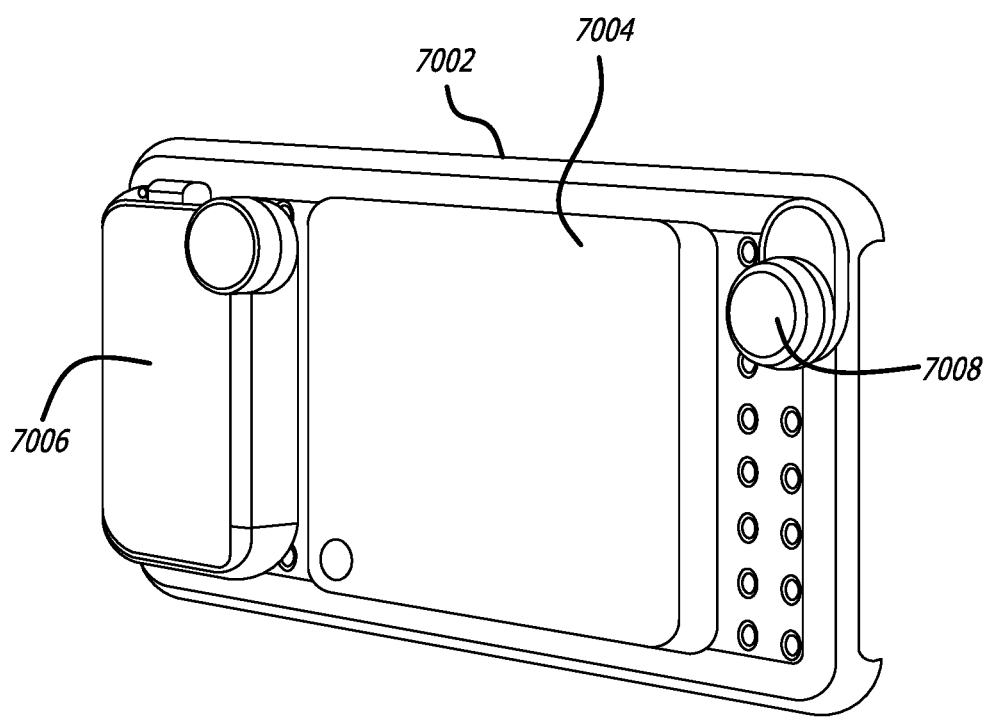
FIG. 70 illustrates multiple accessories electrically and mechanically coupled to a cover.

FIG. 70 illustrates multiple accessories electrically and mechanically coupled to a cover. As shown, the cover 7002 is mechanically and/or electrically coupled to an external battery 7004, a camera controller 7006 and an external lens 7008.

Figure 71:
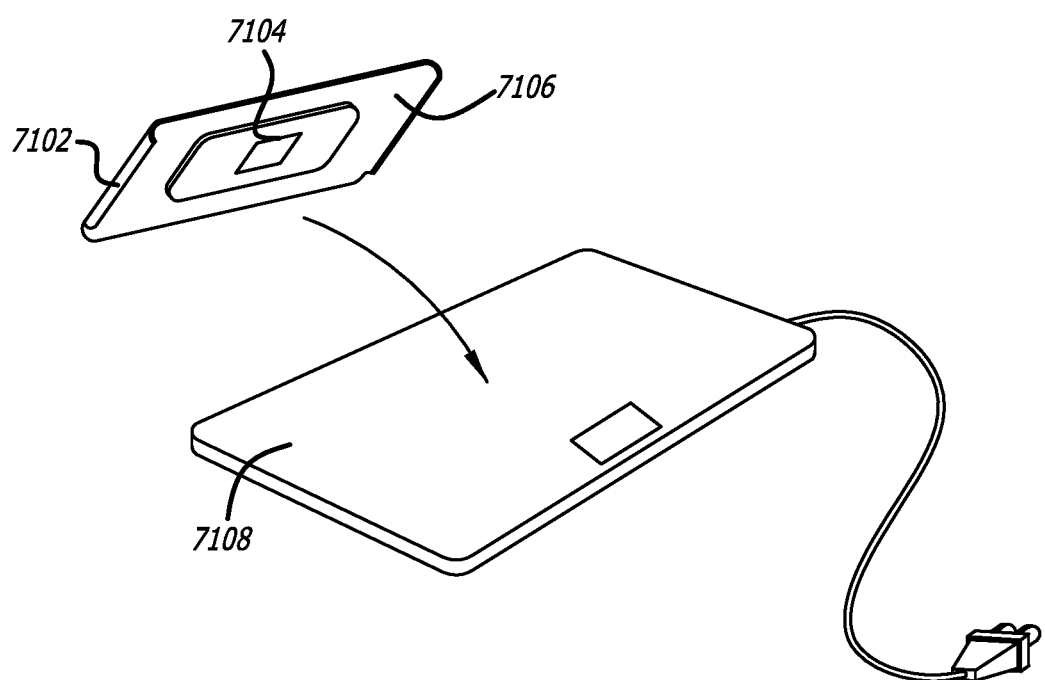
FIG. 71 illustrates a handheld electronic device mechanically and electrically coupled to a wireless charging accessory.

FIG. 71 illustrates a handheld electronic device mechanically and electrically coupled to a wireless charging accessory. As shown, the handheld electronic device 7102 may be mechanically and electrically coupled to a wireless charging accessory 7104 via a cover 7106. The wireless charging accessory 7104 may be placed on or near charging pad 7108 to charge the handheld electronic device 7102.

Figure 72:
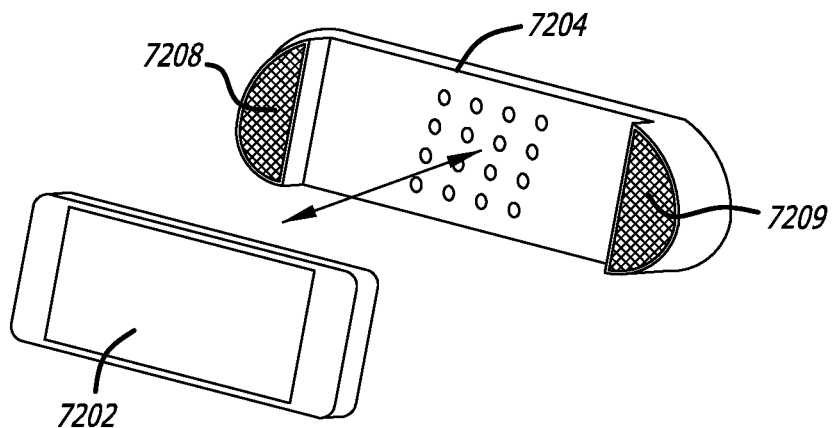
FIG. 72 illustrates a handheld electronic device mechanically and electrically coupled to a speaker accessory.

FIG. 72 illustrates a handheld electronic device mechanically and electrically coupled to a speaker accessory. As shown, the handheld electronic device 7202 may be electrically coupled to a speaker accessory 7204. The speaker accessory 7204 may include a first speaker 7209 and a second speaker 7208, which are positioned on opposite sides of the handheld electronic device 7202 to provide stereo sound.

Figure 73:
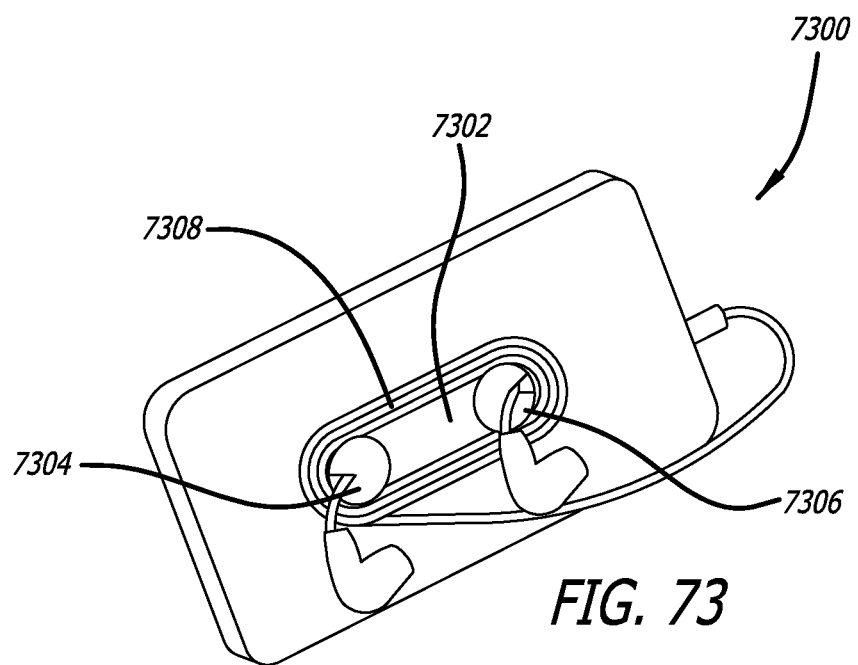
FIG. 73 illustrates an example ear bud holder accessory configured for coupling with a cover, according to some aspects of the present disclosure.

FIG. 73 illustrates an example embodiment of a cover 7300 coupled with an ear bud holder 7302. The ear bud holder 7302 may have opposing ends 7304, 7306 around which a headphone cord 7308 may be wrapped. The Ear bud holder 7302 may also be configured to receive a power cord, or any other cable desired to be stored with the handheld electronic device cover.

FIGS. 74A and 74B illustrate a handheld electronic device mechanically and electrically coupled to a keyboard accessory. FIG. 74A shows a rear view of the keyboard accessory 7402. As show, the keyboard accessory 7402 may be mechanically and electrically coupled to the cover 7404. Further, the keyboard accessory 7402 may include an adjustable keyboard tray that may be pulled out from a body portion of the keyboard accessory 7402. FIG. 74B shows a front view of the keyboard accessory 7402. As shown, the adjustable keyboard tray includes a keyboard that becomes available when the adjustable keyboard tray is pulled away from the body portion of the keyboard accessory 7402.

FIG. 75 illustrates an example embodiment of a cover 7500 with a lanyard 7502. The lanyard 7502 may have a latch mechanism 7504 configured to engage with a corresponding latch mechanism 7506 disposed on the cover. The latch mechanism 7504 and a corresponding latch mechanism 7506 may be a male-female arrangement, tongue and groove arrangement, or any coupleable arrangement providing secure detachable coupling of the lanyard 7502 with the handheld electronic device cover.

Figure 76A:
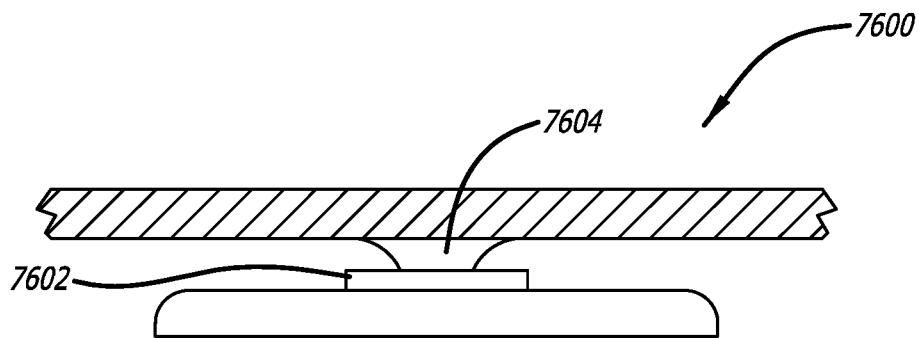
FIGS. 76A and 76B illustrate an example suction cup arrangement accessory configured for coupling with a cover, according to some aspects of the present disclosure.
Figure 76B:
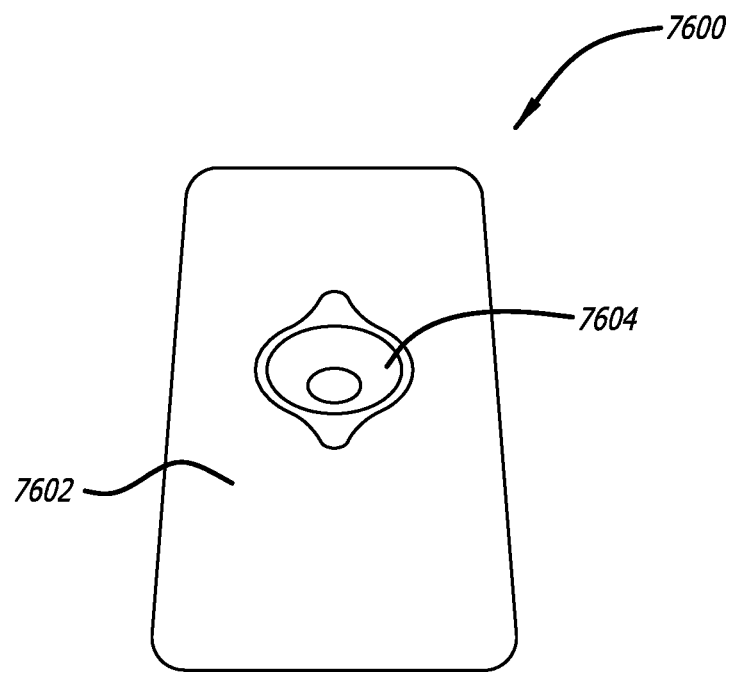

FIGS. 76A and 76B illustrate an example embodiment of a cover 7600 having a suction cup attachment 7602. The suction cup attachment 7602 may have a suction cup 7604 facing opposite of the cover 7600 and configured to engage surfaces such as walls, windows, glass, or other smooth surfaces. Suction cup 7604 releasably secures the cover 7600 to any smooth surface.

Figure 77A:
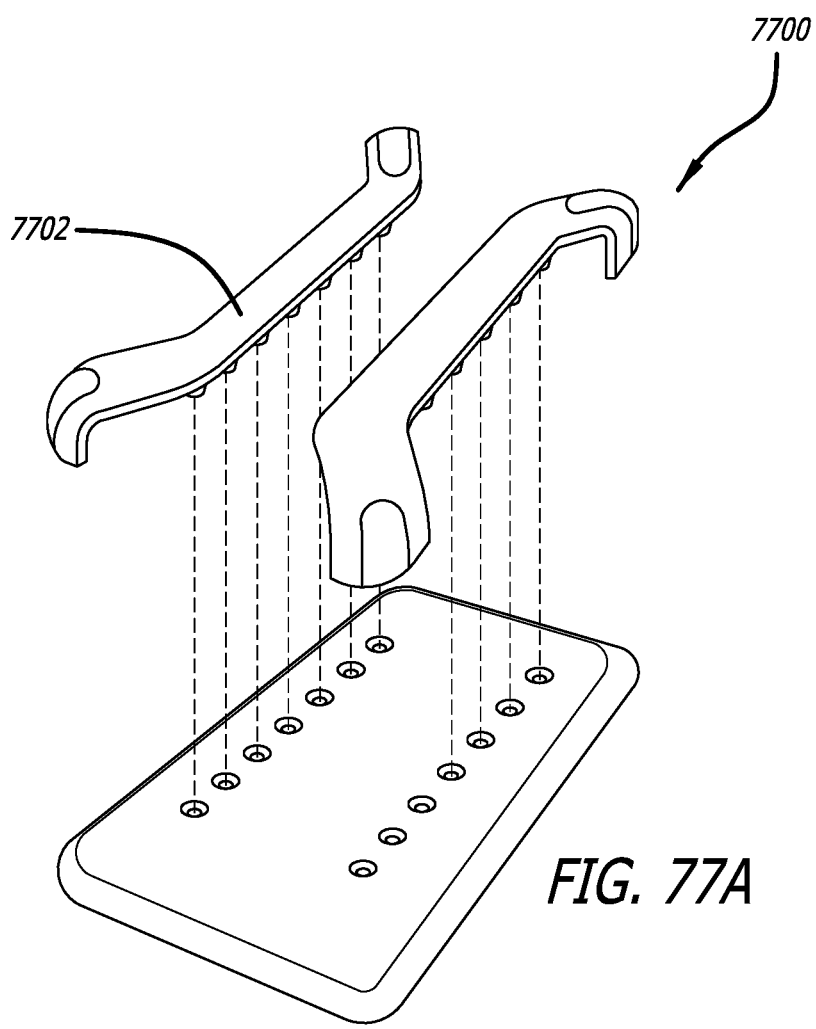
FIGS. 77A and 77B illustrate an example shock protection accessory configured for coupling with a cover, according to some aspects of the present disclosure.
Figure 77B:
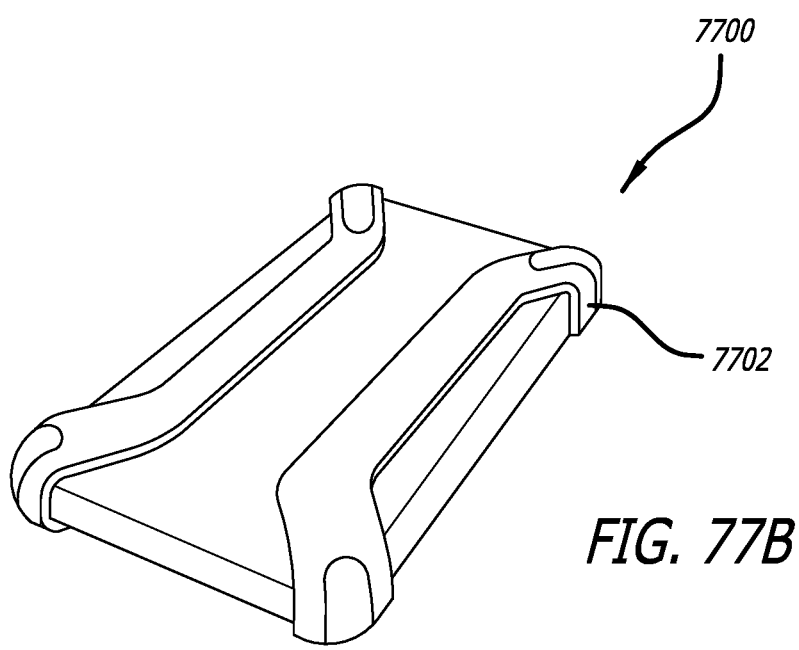

FIGS. 77A and 77B illustrate an example embodiment of a cover 7700 having a shock protection arrangement 7702. The shock protection arrangement 7702 may be disposed around the edges of the cover 7700 to prevent damage to the cover and the handheld electronic device received therein. The shock protection arrangement 7702 may be two separate portions each coupled with the cover 7700 and disposed around each corner of the cover 7700. In other embodiment, the shock protection arrangement 7702 may be one, three, four or more pieces configured to provide the cover 7700 with shock protection from environmental dangers such as dropping. The shock protection arrangement 7702 may be formed from a shock absorbing material such as a rubber, a latex, and polymers.

Figure 78:
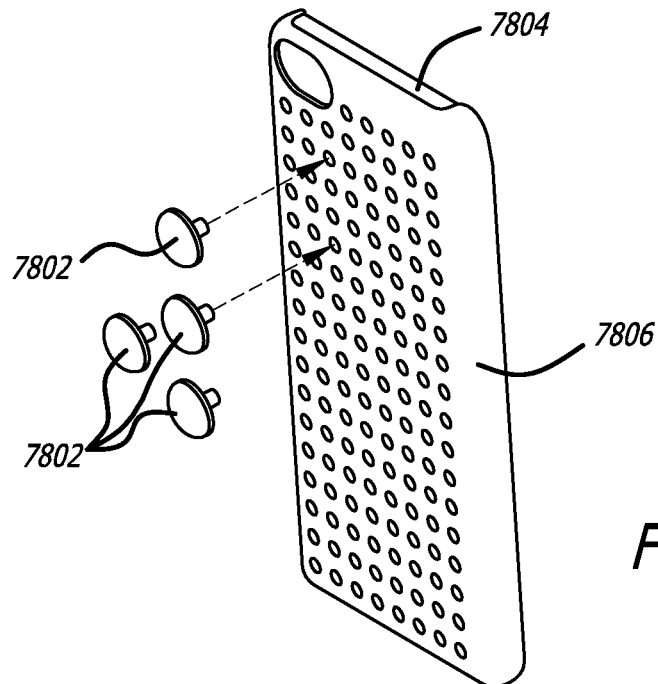
FIG. 78 illustrates functional buttons mechanically and electrically coupled to a cover.

FIG. 78 illustrates functional buttons mechanically and electrically coupled to a handheld electronic device cover. The functional buttons 7802 may be physical buttons that may be configured to perform a specified function when actuated, such as by being pressed, selected, tapped, etc. For example, the functional button 7802 may be configured to toggle BLUETOOTH® on/off, toggle WiFi on/off, lock/unlock a screen, etc. The functional buttons 7802 may be electrically coupled with a handheld electronic device 7804 via a cover 7806 to power the functional buttons 7802 and/or communicate with the handheld electronic device to configure the functional buttons 7802 and notify the handheld electronic device 7804 that a functional button 7802 has been actuated. In some embodiments, the functional buttons 7802 may be configured to communicate with the handheld electronic device 7804 via a wireless communication module or device, such as through use of BLUETOOTH®.

Figure 79:
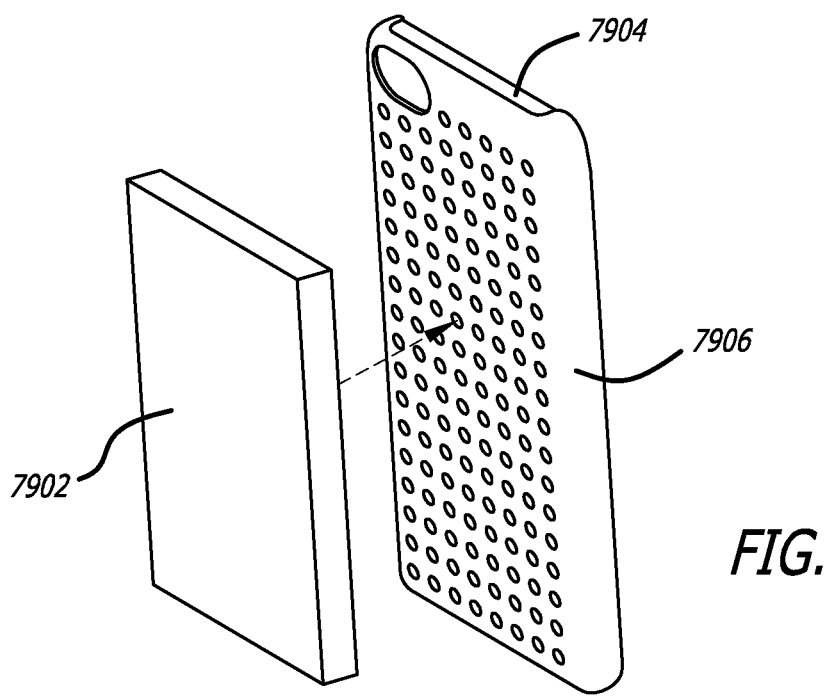
FIG. 79 illustrates a secondary display accessory mechanically and electronically coupled to a handheld electronic device.

FIG. 79 illustrates a secondary display accessory 7902 mechanically and/or electronically coupled to a handheld electronic device 7904. As shown, the secondary display accessory 7902 may be mechanically and electronically coupled to a handheld electronic device 7904 via a cover 7906. The secondary display accessory 7902 may provide a user with a varying size or type of the display, such as an e-ink display or a larger display to view movie or other videos.

Figure 80:
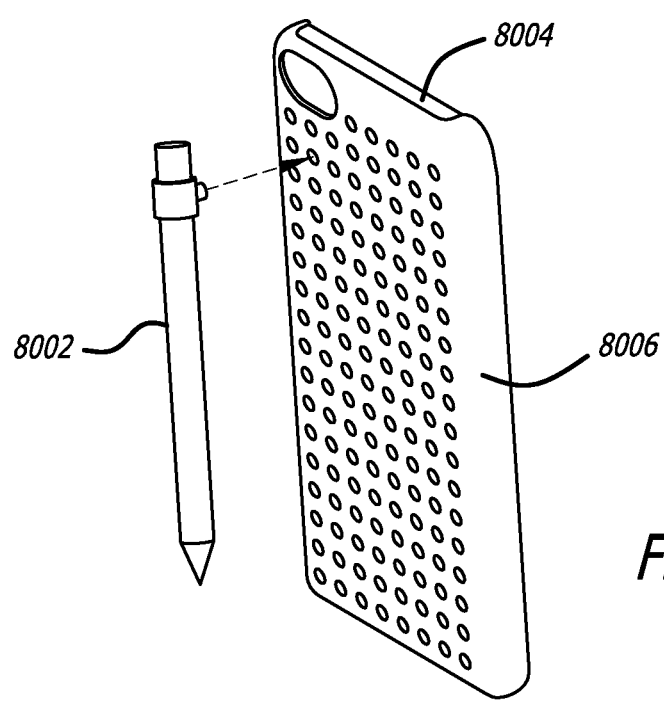
FIG. 80 illustrates a stylus mechanically and electrically coupled to a handheld electronic device.

FIG. 80 illustrates a stylus 8002 mechanically and/or electrically coupled to a handheld electronic device. As shown, the stylus 8002 may be mechanically and/or electronically coupled to a handheld electronic device 8004 via a cover 8006. The stylus 8002 may provide a user with a tool to interact with a touch screen of the handheld electronic device 8004. In some embodiments, the stylus 8002 may be only mechanically coupled to the handheld electronic device 8004. Alternatively, the stylus 8002 may be mechanically and electrically coupled to the handheld electronic device 8004 to share data and/or provide the stylus 8002 with power.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A cover for a handheld electronic device configured to couple with an accessory for the handheld electronic device, the cover comprising:
   a slidable engagement, comprising:
      a first layer comprising a plurality of receivers; and
      at least one second layer slidable relative to the first layer and comprising a plurality of apertures formed corresponding to the receivers of the first layer, wherein the at least one second layer is slidable relative to the first layer so as to provide alignment of the apertures with the corresponding receivers.

2. The cover of claim 1, wherein the plurality of receivers is arranged in one of: (i) a matrix of rows and columns, and (ii) a lattice pattern.

3. The cover of claim 1, wherein the accessory comprises a plurality of projections, when the at least one second layer is transitioned to a receiving position, the apertures are aligned with the corresponding receivers so as to allow receiving and engagement of the projections of the accessory with the receivers.

4. The cover of claim 3, wherein after the projections of the accessory are received by the receivers, the at least one second layer is biased toward partial alignment with the apertures and the receivers, thereby securing the accessory with the first layer.

5. The cover of claim 3, wherein each of the projections comprises a hook, a dimension of the hook is smaller than a dimension of the corresponding aperture and a dimension of the corresponding receiver, when the at least one second layer is transitioned to the receiving position, the hook is adapted to pass through the corresponding aperture and the corresponding receiver, when the at least one second layer is biased toward partial alignment with the apertures and the receivers, the hook is positioned by a surface of the first layer away from the at least one second layer.

6. The cover of claim 1, wherein when the at least one second layer is biased toward partial alignment with the apertures and the receivers, a side of each of the protrusions is adjoined with an inner surface of the corresponding aperture, and an opposite side of each of the protrusions is adjoined with an inner surface of the corresponding receiver.

7. The cover of claim 1, wherein the slidable engagement further comprises at least one push button connected to the at least one second layer, the at least one second layer is slid relative to the first layer by operating the at least one push button.

8. The cover of claim 1, wherein when the at least one second layer comprises a plurality of second layers, each of the second layers is transitioned independent of another one of the second layers.

9. The cover of claim 1, wherein at least one of the receivers each further comprises a plurality of electrodes coupled with at least one of the projections of the accessory.

10. The cover of claim 9, wherein the cover further comprises at least one circuit coupled with the plurality of electrodes, wherein the at least one circuit is configured to be electrically coupled with the handheld electronic device.

11. A cover assembly for a handheld electronic device, the cover assembly comprising:
    a cover comprising
       a slidable engagement, comprising:
          a first layer comprising a plurality of receivers; and
          at least one second layer slidable relative to the first layer and comprising a plurality of apertures formed corresponding to the receivers of the first layer, wherein the at least one second layer is slidable relative to the first layer so as to provide alignment of the apertures with the corresponding receivers; and an accessory configured to be coupled to the cover and comprising a plurality of projections, wherein when the at least one second layer is transitioned to a receiving position, the apertures are aligned with the corresponding receivers so as to allow receiving and engagement of the projections of the accessory with the receivers.

12. The cover assembly of claim 11, wherein the plurality of receivers is arranged in one of: a matrix of rows and columns, or a lattice pattern; and wherein the plurality of projections is arranged in one of: a matrix of rows and columns, or a lattice pattern corresponding with the plurality of receivers.

13. The cover assembly of claim 11, wherein each of the projections comprises a hook, a dimension of the hook is smaller than a dimension of the corresponding aperture and a dimension of the corresponding receiver, when the at least one second layer is transitioned to the receiving position, the hook is adapted to pass through the corresponding aperture and the corresponding receiver, when the at least one second layer is biased toward partial alignment with the apertures and the receivers, the hook is positioned by a surface of the first layer away from the at least one second layer.

14. The cover assembly of claim 11, wherein when the at least one second layer is biased toward partial alignment with the apertures and the receivers, a side of each of the protrusions is adjoined with an inner surface of the corresponding aperture, and an opposite side of each of the protrusions is adjoined with an inner surface of the corresponding receiver.

15. The cover assembly of claim 11, wherein the slidable engagement further comprises at least one push button connected to the at least one second layer, the at least one second layer is slid relative to the first layer by operating the at least one push button.

16. The cover assembly of claim 11, wherein when the at least one second layer comprises a plurality of second layers, each of the second layers is transitioned independent of another one of the second layers.

17. The cover assembly of claim 11, wherein at least one projection of the plurality of projections each further comprises a plurality of first electrodes, and at least one receiver of the plurality of receivers each further comprises a plurality of second electrodes for contacting with the plurality of first electrodes.

18. The cover assembly of claim 17, wherein the accessory further comprises a power source coupled with the plurality of first electrodes, and wherein the cover further comprises at least one circuit configured for connecting with the plurality of second electrodes, the accessory providing power via the plurality of first electrodes, the plurality of second electrodes, and the at least one circuit.

19. A cover system comprising:
a handheld electronic device;
a cover configured to be attached to a handheld electronic device, the cover comprising a slidable engagement, comprising:
a first layer comprising a plurality of receivers; and
at least one second layer slidable relative to the first layer and comprising a plurality of apertures formed corresponding to the receivers of the first layer, wherein the at least one second layer is slidable relative to the first layer so as to provide alignment of the apertures with the corresponding receivers; and
an accessory configured to be coupled to the cover and comprising a plurality of projections, wherein when the at least one second layer is transitioned to a receiving position, the apertures are aligned with the corresponding receivers so as to allow receiving and engagement of the projections of the accessory with the receivers.

20. The cover system of claim 19, wherein the handheld electronic device has a first wireless module, the accessory further comprises a second wireless module and a controller, and
wherein the first wireless module and the second wireless module are configured to be wirelessly connected to facilitate a transfer of data between the handheld electronic device and the accessory.

21. The cover system of claim 19, wherein the accessory further comprises a connector for connecting the accessory with the handheld electronic device for facilitating data or power transfer between the handheld electronic device and the accessory.

22. The cover system of claim 19, wherein the cover further comprises a connector for connecting the cover with the handheld electronic device for facilitating data or power transfer between the handheld electronic device and the cover.

23. The cover system of claim 19, wherein at least one respective receiver of the plurality of receivers further comprises a plurality of first electrodes and at least one circuitry for connecting the plurality of first electrodes in the cover body to the handheld electronic device, wherein at least one respective projection of the plurality of projections of the accessory further comprises a plurality of second electrodes, the accessory configured for being connected with the handheld electronic device via the contact of the first electrode, the second electrode and the circuitry to facilitate a data transfer between the accessory and the handheld electronic device.

* * * * *